(12) United States Patent
Corbett et al.

(10) Patent No.: US 10,005,222 B2
(45) Date of Patent: *Jun. 26, 2018

(54) PROCESS AND MACHINERY FOR INTEGRATION OF DISCRETE PARTS INTO COMPOSITE CONTAINERS

(71) Applicant: ECO.LOGIC BRANDS INC., Manteca, CA (US)

(72) Inventors: Julie Corbett, Oakland, CA (US); Romeo Graham, Chelsea (CA); Robert Watters, Ottawa (CA); Michael Sirois, Ottawa (CA); Ken Klippenstein, Dinuba, CA (US); Dennis E. Schramm, Fresno, CA (US); Luc Boucher, Ottawa (CA)

(73) Assignee: ECO.LOGIC BRANDS INC., Manteca, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/436,459

(22) Filed: Feb. 17, 2017

(65) Prior Publication Data

US 2017/0225381 A1  Aug. 10, 2017

Related U.S. Application Data

(63) Continuation of application No. 14/439,136, filed as application No. PCT/US2012/067331 on Nov. 30, 2012, now Pat. No. 9,574,307.

(Continued)

(51) Int. Cl.
*B29C 49/20* (2006.01)
*D21J 3/10* (2006.01)
(Continued)

(52) U.S. Cl.
CPC .......... *B29C 49/24* (2013.01); *B29C 49/0047* (2013.01); *B29C 49/20* (2013.01);
(Continued)

(58) Field of Classification Search
CPC ......... D21J 3/10; D21J 7/00; Y10T 428/1303; Y10T 156/10; B29C 65/4815;
(Continued)

(56) References Cited

U.S. PATENT DOCUMENTS 3,816,578 A * 6/1974 Fuller .................. A47J 41/022
156/244.14
4,330,066 A * 5/1982 Berliner ................. B65D 23/00
215/12.1
(Continued)

FOREIGN PATENT DOCUMENTS

WO  2009133355 A1  11/2009
WO  2013082450 A1  6/2013
(Continued)

OTHER PUBLICATIONS

European Patent Office, European Search Opinion, issued in Application No. EP12852571.4, dated Nov. 7, 2016 4 pages.
(Continued)

*Primary Examiner* — Jose A Fortuna
(74) *Attorney, Agent, or Firm* — Loeb & Loeb LLP

(57) ABSTRACT

A process of manual, semi-automatic and fully-automated integration of discrete components into a container that results in fast, reliable, cost-effective, and scalable production of composite containers is disclosed. The process can be embodied in manufacturing equipment that has a series of stations and may be called an assembly device. The equipment can produce containers, tubs, canisters, cartridges, etc.
(Continued)

which are easily separated into different bio-degradable or compostable parts. Other container types are possible and are contemplated.

17 Claims, 55 Drawing Sheets

Related U.S. Application Data

(60) Provisional application No. 61/565,204, filed on Nov. 30, 2011.

(51) Int. Cl.
| | | |
|---|---|---|
| B29C 49/24 | (2006.01) | |
| B65D 1/02 | (2006.01) | |
| B65D 65/46 | (2006.01) | |
| B29C 49/00 | (2006.01) | |
| B29C 51/12 | (2006.01) | |
| B29K 1/00 | (2006.01) | |
| B29L 31/00 | (2006.01) | |
| B29K 105/00 | (2006.01) | |

(52) U.S. Cl.
CPC .......... *B29C 51/12* (2013.01); *B65D 1/0207* (2013.01); *B65D 65/466* (2013.01); *D21J 3/10* (2013.01); *B29C 2049/2008* (2013.01); *B29C 2049/2404* (2013.01); *B29C 2049/2412* (2013.01); *B29C 2049/2422* (2013.01); *B29C 2049/2491* (2013.01); *B29K 2001/00* (2013.01); *B29K 2105/256* (2013.01); *B29L 2031/7158* (2013.01)

(58) Field of Classification Search
CPC .............. B29C 65/4825; B29C 65/483; B29C 65/7841; B29C 66/8324; B29C 2049/2008; B29C 2049/2017; B29C 2049/2026; B29C 49/0047; B29C 49/20; B29C 51/12; B29L 2031/7158; B65D 25/14
See application file for complete search history.

(56) References Cited

U.S. PATENT DOCUMENTS

| | | | | |
|---|---|---|---|---|
| 4,417,667 | A * | 11/1983 | Roth | B65D 7/38 |
| | | | | 220/612 |
| 5,203,470 | A * | 4/1993 | Brown | B65D 5/5405 |
| | | | | 222/105 |
| 5,511,648 | A | 4/1996 | Kaminski et al. | |
| 5,569,473 | A | 10/1996 | Bright | |
| 6,830,658 | B2 | 12/2004 | Kumamoto et al. | |
| 6,841,041 | B2 | 1/2005 | Kumamoto et al. | |
| D645,754 | S * | 9/2011 | Corbett | D9/452 |
| D645,755 | S * | 9/2011 | Corbett | D9/517 |
| 8,430,262 | B2 | 4/2013 | Corbett et al. | |
| D692,768 | S * | 11/2013 | Corbett | D9/531 |
| D692,769 | S * | 11/2013 | Corbett | D9/531 |
| D694,635 | S * | 12/2013 | Corbett | D9/531 |
| 8,663,419 | B2 * | 3/2014 | Corbett | D21J 3/10 |
| | | | | 156/242 |
| 8,807,377 | B2 | 8/2014 | Corbett et al. | |
| D720,227 | S * | 12/2014 | Corbett | D9/529 |
| 9,090,372 | B2 * | 7/2015 | Warner | B65D 1/0215 |
| 9,126,719 | B2 * | 9/2015 | Corbett | D21J 3/10 |
| 9,574,307 | B2 * | 2/2017 | Corbett | B29C 49/0047 |
| 2001/0040016 | A1 | 11/2001 | Kumamoto et al. | |
| 2002/0189776 | A1 * | 12/2002 | Kumamoto | B65H 18/02 |
| | | | | 162/198 |
| 2003/0121635 | A1 | 7/2003 | Kumamoto et al. | |
| 2003/0145968 | A1 * | 8/2003 | Kumamoto | B65D 1/0207 |
| | | | | 162/218 |
| 2009/0302510 | A1 * | 12/2009 | Castellari | B29C 49/66 |
| | | | | 264/528 |
| 2011/0036846 | A1 * | 2/2011 | Corbett | B65D 77/06 |
| | | | | 220/495.03 |
| 2011/0220652 | A1 | 9/2011 | Corbett et al. | |
| 2012/0132361 | A1 * | 5/2012 | Corbett | D21J 3/10 |
| | | | | 156/287 |
| 2014/0174634 | A1 * | 6/2014 | Corbett | D21J 3/10 |
| | | | | 156/91 |
| 2014/0252032 | A1 | 9/2014 | Corbett et al. | |
| 2014/0291273 | A1 * | 10/2014 | Warner | B65D 1/0215 |
| | | | | 215/12.2 |
| 2015/0034588 | A1 | 2/2015 | Corbett et al. | |
| 2015/0308050 | A1 | 10/2015 | Corbett et al. | |
| 2016/0145811 | A1 * | 5/2016 | Socci | D21J 3/10 |
| | | | | 162/217 |
| 2017/0021995 | A1 * | 1/2017 | Corbett | B65D 11/02 |
| 2017/0225381 | A1 * | 8/2017 | Corbett | B29C 49/24 |

FOREIGN PATENT DOCUMENTS

| | | | | |
|---|---|---|---|---|
| WO | WO 2013082450 A1 * | 6/2013 | | D21J 3/10 |
| WO | 2013192260 A1 | 12/2013 | | |
| WO | WO 2013192260 A1 * | 12/2013 | | D21J 3/10 |
| WO | WO 2016081614 A1 * | 5/2016 | | D21J 3/10 |

OTHER PUBLICATIONS

European Patent Office, Supplementary European Search Report, issued in Application No. EP12852571.4, dated Oct. 27, 2016, 2 pages.

International Searching Authority, International Search Report and Written Opinion, issued in Application No. PCT/US2012/067331, dated Feb. 15, 2013, 6 pages.

* cited by examiner

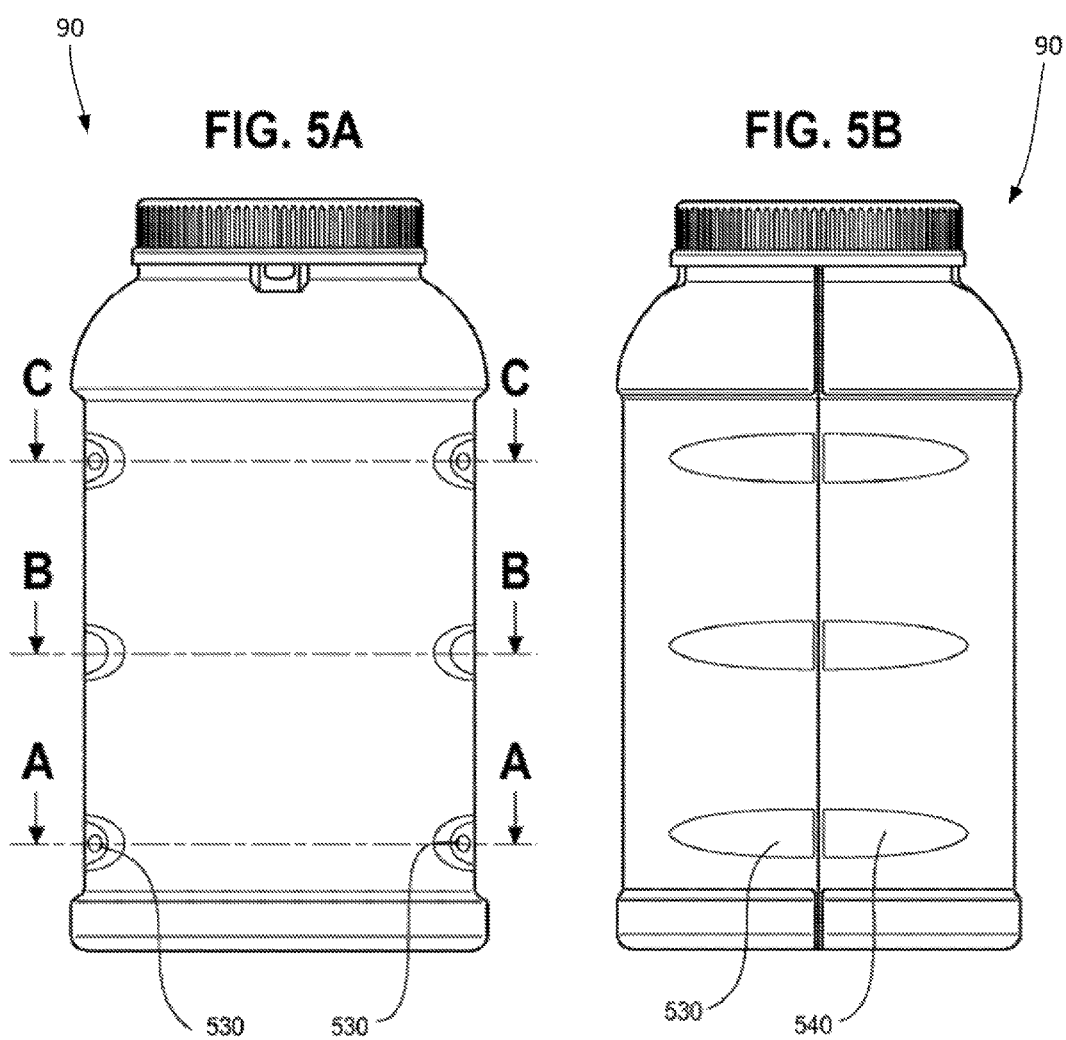

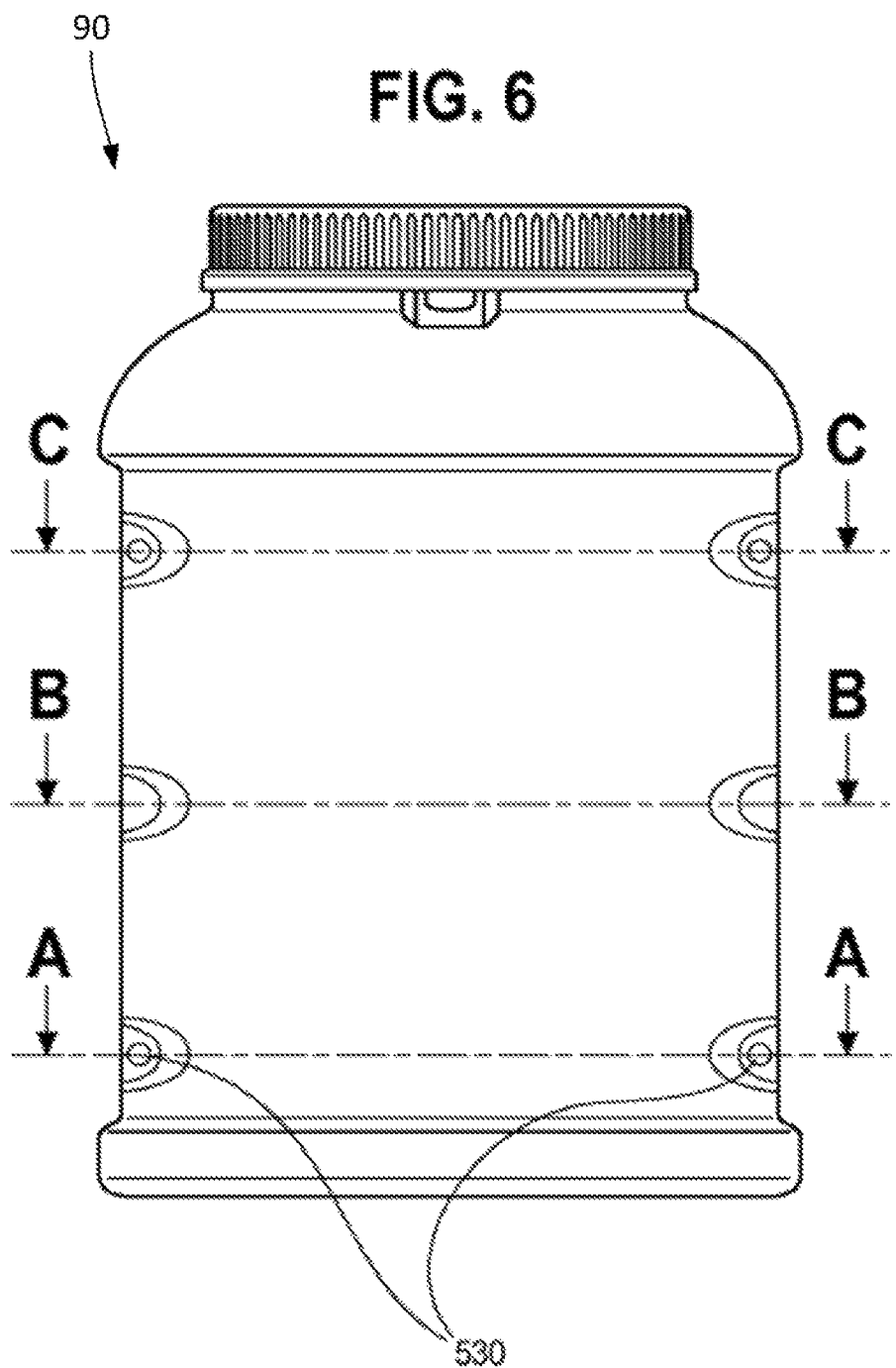

FIG. 7A
FIG. 7B
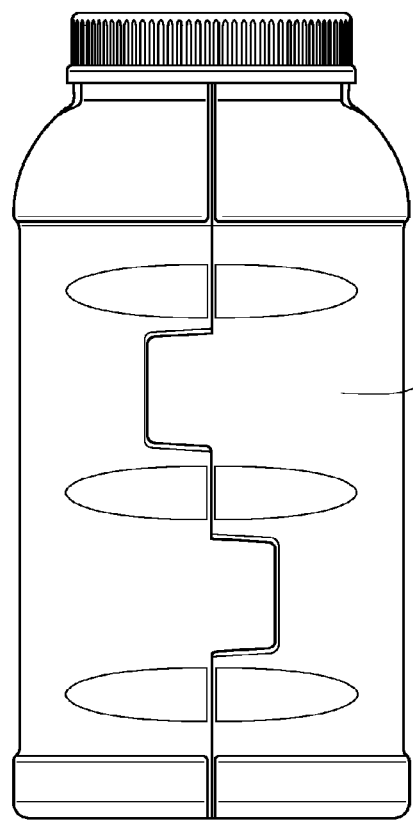
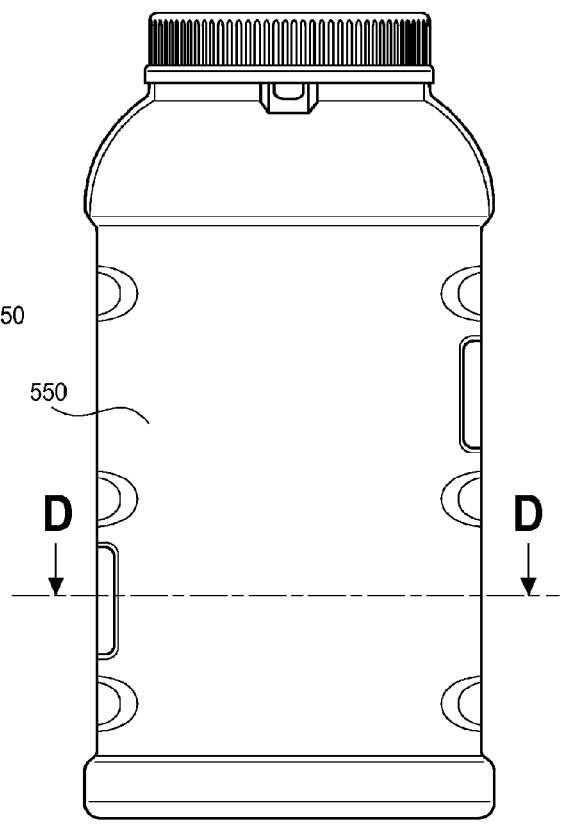

FIG. 8A
FIG. 8B
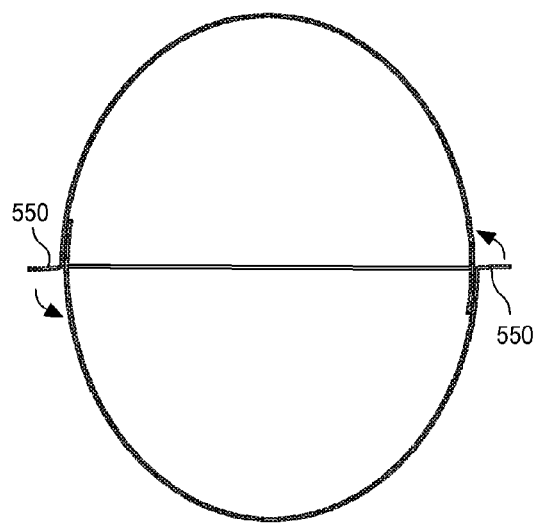
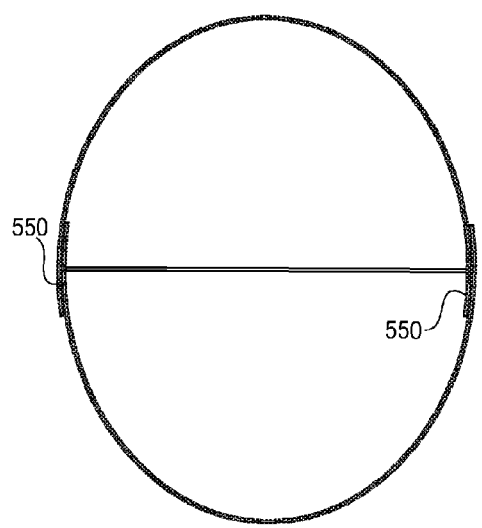

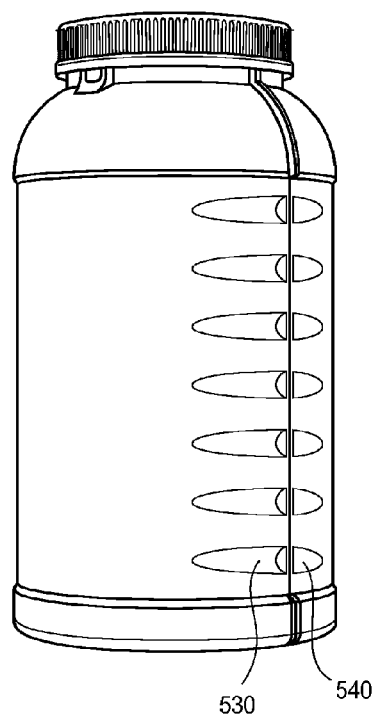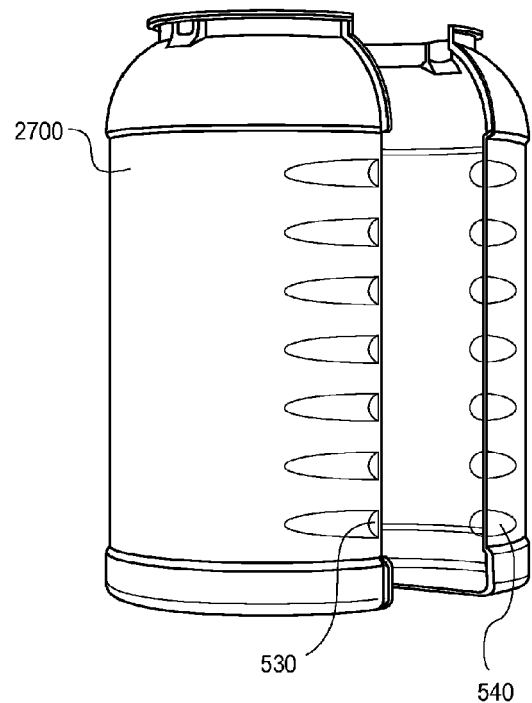

FIG. 12A
FIG. 12B
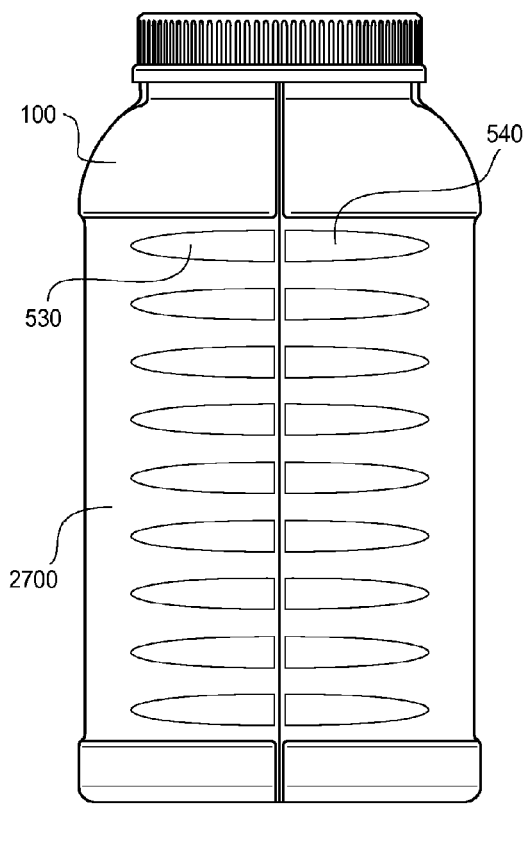
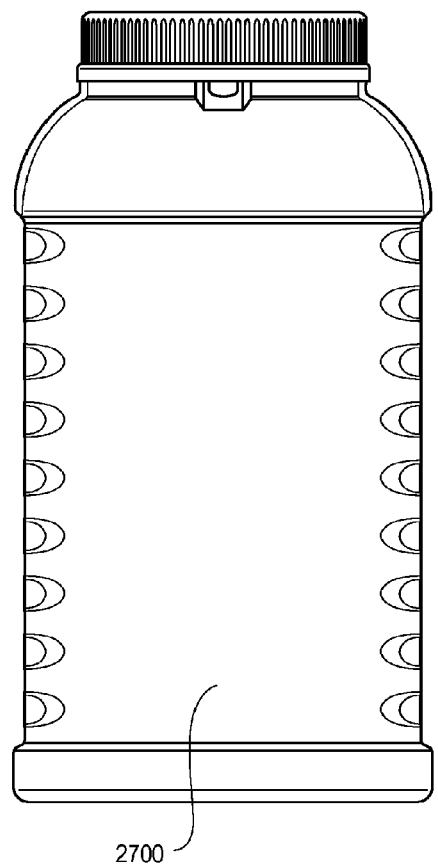

550  550

2850  120

PROCESS AND MACHINERY FOR INTEGRATION OF DISCRETE PARTS INTO COMPOSITE CONTAINERS

CROSS-REFERENCE TO RELATED APPLICATIONS

This application is a continuation and claims priority to U.S. application Ser. No. 14/439,136, filed Apr. 28, 2015, now U.S. Pat. No. 9,547,307, titled "PROCESS AND MACHINERY FOR INTEGRATION OF DISCRETE PARTS INTO COMPOSITE CONTAINERS," which is a national stage entry of International Application No. PCT/US12/67331, filed Nov. 30, 2012, titled "PROCESS AND MACHINERY FOR INTEGRATION OF DISCRETE PARTS INTO COMPOSITE CONTAINERS, which claims the benefit of U.S. Provisional Application No. 61/565,204, filed Nov. 30, 2011, titled "PROCESS AND MACHINERY FOR INTEGRATION OF DISCRETE PARTS INTO COMPOSITE CONTAINERS," all of which are incorporated herein by reference.

BACKGROUND

Packaging used for containing liquids can generate large amounts of waste. In some cases, packaging used for containing liquids can be recycled. Packaging used for containing liquids has been described in PCT publication No. WO 2007/0066090, which is herein incorporated by reference in its entirety. Efforts towards creating an environmentally efficient container/package system that is cost effective and readily recyclable while being very usable for dispensing liquids, aggregates or powders and performing Typical bottles are made of a unified volumetric structure, such as blown glass bottles and blow molded plastic bottles. These bottle are created seamless and with an opening for transmission of fluids/powders. For proper function of packages, it is often necessary for different types of materials to be used in a single package. Often, the different materials are attached together in ways to enhance the performance of the container. However, this reduces the ability of the package to be recycled, since most recycling facilities cannot utilize materials that are not separated into their basic material groups. A solution for this problem is to utilize optimum materials for required performance but to restrict the use of non-separable material types.

To promote widespread recycling of materials and to support many producer's and user's desire for more sustainable packaging options, it is necessary to provide a packaging system that is uniquely optimized for end-of-life separation and recycling. This would result in a package in which, at end-of-use, can be easily separated by a user into discrete components comprising only one material type or group (as defined by generally-accepted recycling standards). The resulting package could be considered to be a composite container or package. Composite packages can be created through a process of integrating two or more components into one package that provides required functionality.

Trying to reliably and repeatedly manufacture a composite container such as a two part pulp molded shell that is biodegradable and that holds an inner liner has proven to be a challenge. Molded pulp can be molded into many shapes and the tolerances are improving but the tolerances are not as tight as with other materials. Pulp formed parts can be made in a matched tool process to achieve a certain degree of dimensional part tolerance. Much of the final dimensions of a given part are dependent on the processing. These include processing temperatures, additives to the pulp slurry, the type of fiber used, etc. Hence, there is a need to bring these parts together permanently to achieve an enclosed volume, and to permanently capture the fitment.

Once the outer shells are produced, the shells are typically stacked and moved to the point of assembly. The stacking can deform the parts out of specification and desired tolerances. Parts from the bottom of a shipping stack may be splayed out from top loading, and upper parts can be squeezed together and be smaller than the molded condition. There is a need to control the process where these parts come together. There is a need ensure correct tolerances are met during the bottle assembly process. There is a need to make this assembly process efficient and reliable in order to minimize the cost of assembly and the cost of the final bottle.

Manufacturing the container shell and liner and integrating them together in an efficient and economical manner has proven to be a challenge. In addition, the fact that the shell and liner are biodegradable or compostable further complicates the integration tasks as the shell and liner are not as resilient and tough as previous non recyclable or non compostable shells and/or liners. Thus, different approaches to efficiently and economically integrate biodegradable or compostable shell and liners will be disclosed.

SUMMARY

In response to demand for more environmentally friendly packaging, a container system has been developed that has a biodegradable or compostable outer shell or shell and a recyclable or biodegradable inner liner that has an exit device that protrudes through the container shell. The exit device may assist in supporting the liner inside the container shell by registering or otherwise being connected to the container shell. The liner may be separated from the shell when the container is empty such that the shell may be recycled or composted with like materials and the liner may be recycled or composted with like materials.

Described herein is a process of manual, semi-automatic and fully-automated integration of discrete components into a container that results in fast, reliable, cost-effective, and scalable production of composite containers. The process can be embodied in manufacturing equipment that has a series of stations and may be called an assembly device. The equipment can produce containers, tubs, canisters, cartridges, etc. Other container types are possible and are contemplated.

BRIEF DESCRIPTION OF THE DRAWINGS

FIGS. 5a and 5b are illustrations of a container with registration dimples and a smooth surface;
FIG. 6 is illustration of a container with registration features and a smooth surface;
FIGS. 7a and 7b are illustrations of a smooth container with registration features and flaps;
FIGS. 8a and 8b are overhead illustrations of using flaps to create a container with a smooth surface.

FIGS. 11a and 11b are side views of a container with multiple registration dimples and a smooth surface;

FIGS. 12a and 12b are illustrations of a container with a plurality of registration features;

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
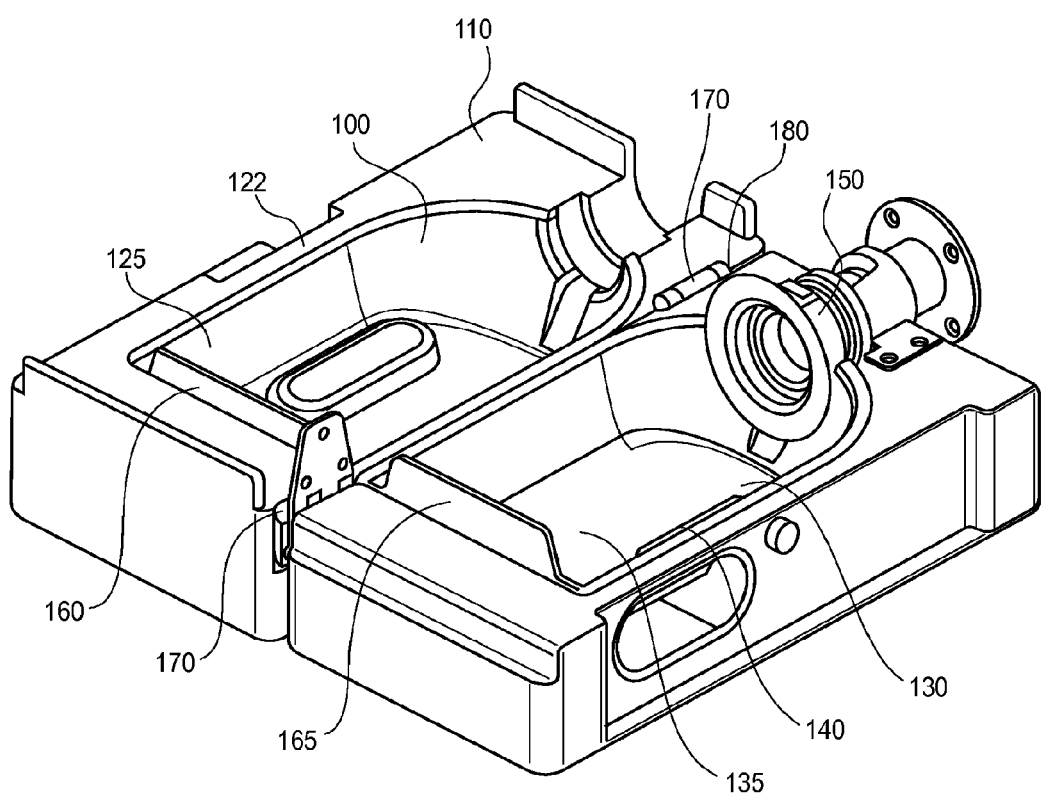
FIG. 1 is an illustration of an assembly unit and container.

The described method, process and assembly device 1200 (e.g., FIGS. 13-18 and 33-34) have been conceived as to aid in the forming and assembling of parts into a container 90 that has an outside shell 100 (e.g., FIG. 1) and is designed to hold a liner 120 (e.g., FIGS. 28B, 42 and 53) that is filled with a pourable substance such as a liquid, a gel, a lotion, small crystals, etc. With some adjustments, the method, process and device 1200 (e.g., FIGS. 13-18 and 33-34) may also be used for the assembly of already filled liners 120 with fitments 150 (e.g., FIG. 42) and/or caps into a formed pulp shell 100 of the container 90. An assembly unit 110 (e.g., FIG. 1) or assembly units 110 may assist in ensuring that the container shell 100 parts such as halves line up in a precise manner to ensure that the container shell 100 (or skeleton) has structural rigidity to hold liquids but still be able to be separated by user such that the container shell 100 and liner 120 may be separated and recycled and/or composted.

The word 'container' 90 is not meant to be limiting, as there are many package configurations that the system 1200 could satisfy including cartridges, containers, jars, dispensers for towels, tissues, wipes, etc. Contents, as always, could include liquid, particulates, powders, lotions, items, etc.

A physical machine 1200, such as the machine shown in the embodiments illustrated in FIGS. 13-17 and 33-34, may be used to enable the methods described herein. Individual parts may be staged and brought together bit by bit at the correct time. Each machine 1200 may have parts which may be changed to allow the machine 1200 to produce a different container 90 with generally similar but different components and with a similar but different number of steps.

All or some of the steps in the process may be present in any specific embodiment of assembly equipment 1200. All or some of the steps may be performed in a single, discrete location in the equipment 1200, or may be performed in one or more locations in the equipment 1200. In some embodiments, there are distinct and unique stations in which specialized fixtures, guides, actuators, vision systems, measurement devices, etc., perform a single step of the process on the shell, liner, fitment, collar, label or closure (etc.) as it is presented to the station. In other embodiments, one or more operation may be performed on the components in a single station. The operations may be performed in any logical order.

Parts to be handled by the equipment 1200 include: molded pulp shells 100, fitments 150, liners 120 (e.g., FIG. 42), locking collars, thin wall vessel with the fitment integral to the body of vessel, labels, shrink sleeves, coupons, seed packets, promotional items, adhesives, fasteners, closures, temporary closures. Parts may be transported between stations in cartridges, cassettes 110 (e.g., FIG. 1), pucks, on belts, by robotic means, etc. The motion of the equipment may be intermittent or continuous. The arrangement of the assembly units 110 may be a rotary arrangement with a turntable-like configuration which may be horizontal or vertical. Other means of handling and conveyance are possible and are contemplated. There may be a manual component (i.e. some transfer operations may be performed by operators rather than automated equipment). However, the same processes can be performed by automated means.

The described method, process and assembly device 1200 have been conceived to aid in the forming and assembly of parts into an empty container 90, and embodiment of which is shown in FIGS. 5A, 5B, and 6, that is designed to hold a liner 120 (e.g., FIG. 42) that is filled with a liquid or other dispensable form, such as a gel or pourable powder. In general, the device 1200 may be used to place a liner 120 into a container shell 100 (e.g., FIG. 1) and close the container shell 100 such that the liner 120 and container shell 100 form a container 90 (e.g., FIGS. 5A, 5B, and 6) that is ready for sale.

The container shell 100 may be biodegradable and may be separable by the end user. The container shell 100 is an example of a new use for molded pulp, of which there are few examples on the market. The molded pulp container shell 100 with separable liner 120 is offered as primary packaging (in contrast to secondary packaging, such as is found in shock protection for shipping fragile goods), and requires a higher level of finish and apparent quality for consumer acceptance. The consistency and predictability of pulp created products is less than other materials, making creating consistent and reliable products of pulp even more challenging. Thus, new methods and apparatus are needed to create consistent products molded from pulp than remain biodegradable.

Figure 45:
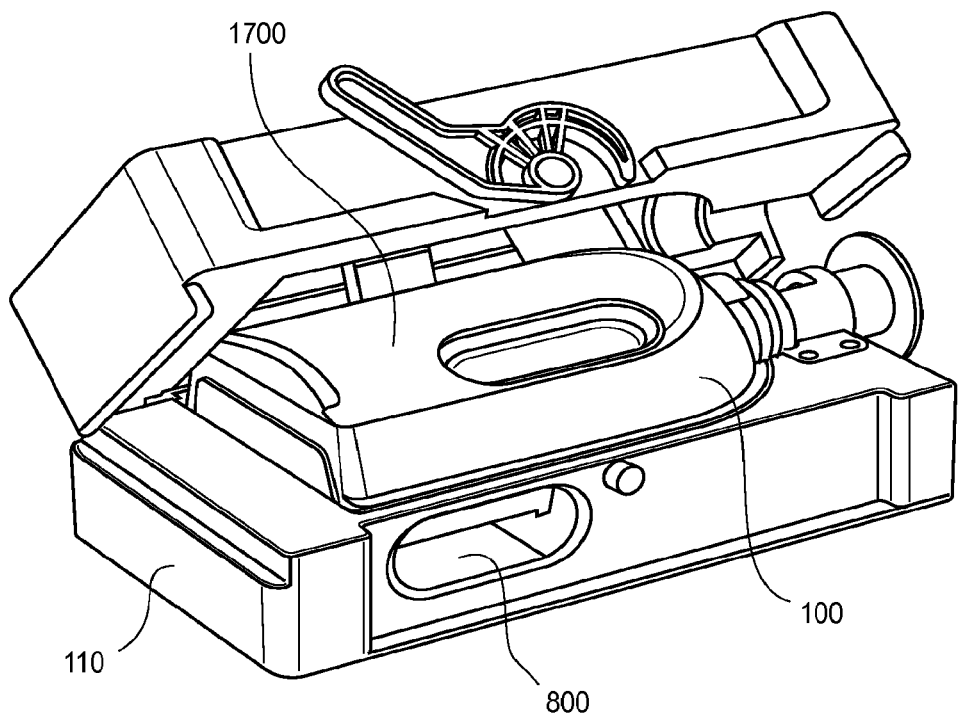
FIG. 45 is an illustration of a completed container being removed from the assembly unit.

While placing a liner 120 (e.g., FIG. 42) into a container shell 100 (e.g., FIGS. 1 and 45) may sound simple, the nature of the materials and shapes provides additional challenges. For example, past biodegradable or compostable materials have been unable to have a pleasing appearance and be able to support the weight of a liquid liner 120. Further, registering an exit device such as a screw top or spout or fitment 150 with the container shell 100 also is a problem as the biodegradable or compostable materials are often not as strong or resilient as plastic materials. Avoiding pinching the liner 120 in the container shell 100 which may cause leaks is another challenge. In addition, the materials and liners 120 need to be brought together at an efficient rate while maintaining an appealing look and useful functionality. An approach to minimize the likelihood of pinching is to use a formed inner liner that is shaped to match the interior volume of the shell. Process for creating shaped liners include the extrusion blow molding, infection blow molding, stretch blow molding, thermo forming, post assembly thermoforming of assembled film pouches.

The container shells 100 (e.g., FIGS. 1 and 45) may be produced on-site or may be produced remotely. The container shell 100 may be provided to the system individually or in a stacked state. In yet another embodiment, the shells 100 may be connected bandoleer style and may be disconnected manually or by a mechanical device. At block 200 (FIG. 2), a container shell 100 may be selected to be used. In each embodiment, the container shells 100 may be obtained individually in a variety of manners. In some embodiments, a selection device such as a vacuum picker may be used to individually select a container shell 100. In other embodiment, a mechanical pinching device may be the selection device and may be used to pinch and handle a container shell 100. In yet another embodiment, the container shell 100 may have a hole or grabbing portion which is used to handle the container shell 100 and is trimmed off when the container 90 is complete. In yet a further embodiment, the container shell 100 may be individually selected by hand. In a further embodiment, the container shells 100 may flow through an assembly line individually which may make obtaining the individual container shells 100 even easier. The container shells 100 may be produced individually or may be selected from a stack individually. Of course, other manners of selecting and separating the container shells 100 are possible and are contemplated.

Figure 2:
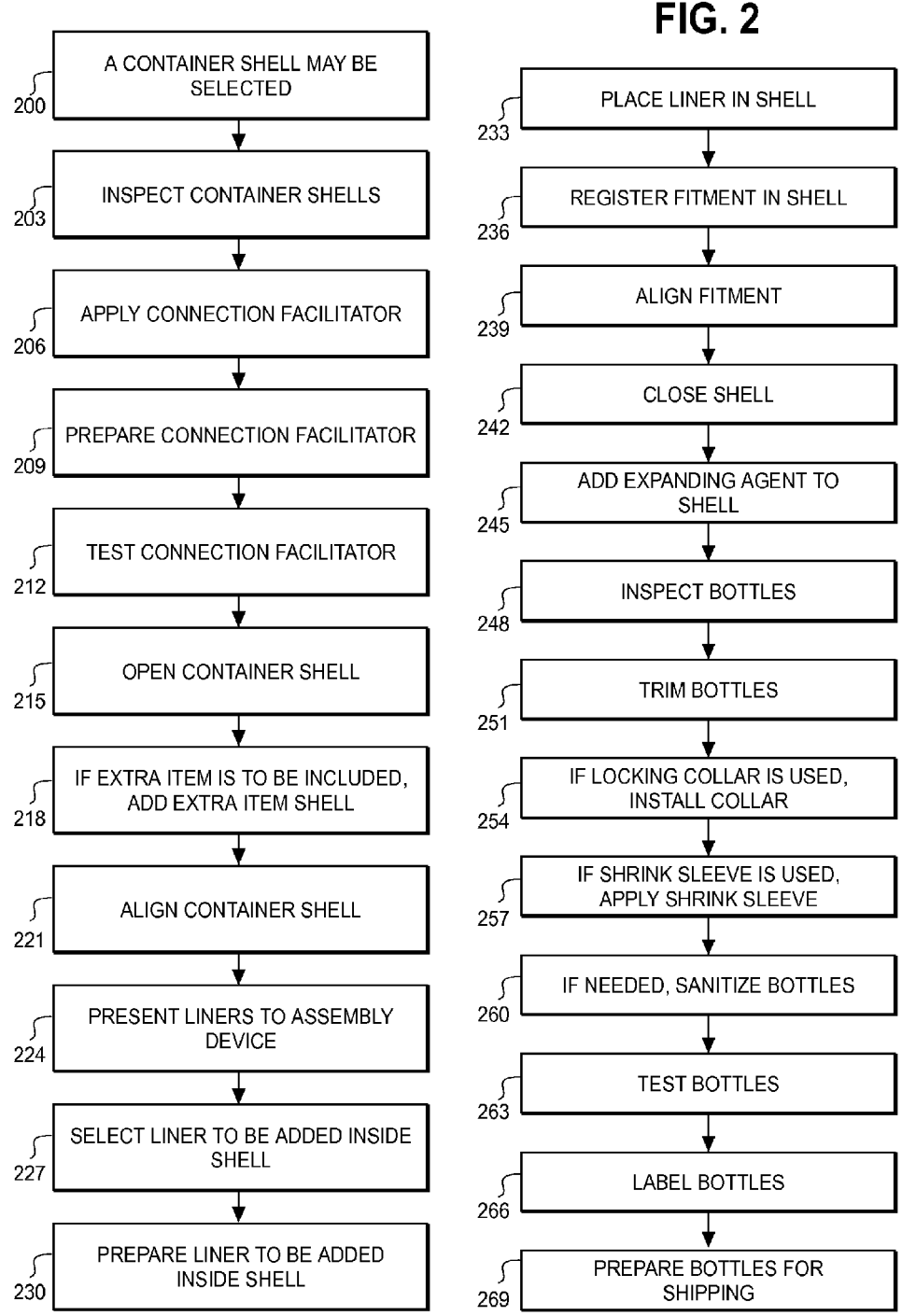
FIG. 2 is an illustration of a method of using the assembly unit to create a container.

Once the container shells 100 are separated, at block 203 of FIG. 2, the container shells 100 may be inspected. The equipment or machinery 1200 may include various specialized or general inspection stations or inspection steps performed during other functions. Characteristics identified could include shell weight, shell thickness, shell cosmetic state, shell dimensional acceptability, connection facilitator readiness, etc.

At any or all of the inspection steps, the inspection could result in the acceptance of the characteristic under study (conforming result), or could result in rejection of the characteristic under study (non-conforming result). In the case of a non-conforming result, the part or assembly may be rejected. If the part or assembly is rejected, it may be physically removed from the line. The rejected part could be pushed into a receiving container or conveyance device to remove rejects from the working area. Other methods of inspection, rejection and subsequent removal of the rejected parts are possible and are contemplated. Of course, inspection may be made of other parts and facets of the container at the various stages of the process.

In some embodiments, the assembly device 1200 manufactures the container shells 100 and the liners 120. In other embodiments, the liners 120 are manufactured separately and the container shells 100 are manufactured separately and the liners 120 and shells 100 are brought together by the assembly device 1200. In one embodiment, the container shells 100 are already prepared.

At block 206 in FIG. 2, a first surface 122 (e.g., FIG. 1) of a first part and a second surface 130 of a second part of a container shell 100 may receive a connection facilitator 140. In some embodiments, the connection facilitator 140 is a mechanical connection. In other embodiments, the connection facilitator 140 is a physical connection. In some additional embodiments, the connection facilitator is an adhesive 140 that, when dry, forms a permanent bond if the first surface 122 and second surfaces 130 coated with the adhesive 140 are brought together with some degree of pressure (commonly known as contact cement). In some embodiments, only the first surface 122 or second surface 130 receives the application of adhesive 140.

The flanges or surfaces 122 130 to receive the connection facilitator could be a non planar surface. There could also be differing amounts or types of connection facilitator at different locations. The fitment receiving area could receive no adhesive in some instances. In other instances it could have some adhesive applied. The fitment receiving area in the shell is a non-planar surface. Adhesive could be applied in certain exact areas only, as an example and not a limitation, adhesive could be targeted to only an area where only one of the fitment's flanges mates with the shell(s). Or, only a portion of surface 122, for example could have intermittent application of a connection facilitator in order to provide the user with a starting point for easier separation for the container prior to recycling. In another embodiment that is conceived, only intermittent internal flanges make contact between the shells and as such the connection facilitator would only be applied where the shells mate.

As an example, one embodiment of the container 90 may be a cylindrical container and may be created in a variety of ways. Referring to FIG. 5*a*, a cylindrical container 90 may have a plurality of connection dimples 540 and dimple receivers 540 and the connection facilitator may be applied to the connection dimples and features. As a result, the shell 100 may be smooth on the outside but may have the necessary strength to withstand handling and transportation but still be capable of being compostable and/or biodegradable. FIG. 6 may be another view which illustrates that only the connection dimples 530 may need to receive the connection facilitator.

Figure 9A:
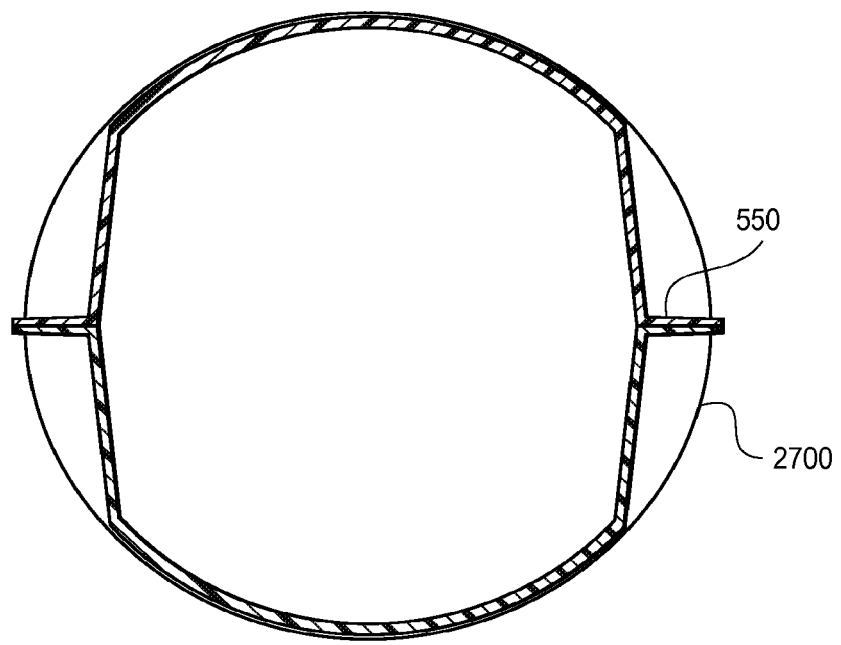
FIGS. 9a and 9b are illustrations of a flange arrangement on a smooth container.
Figure 9B:
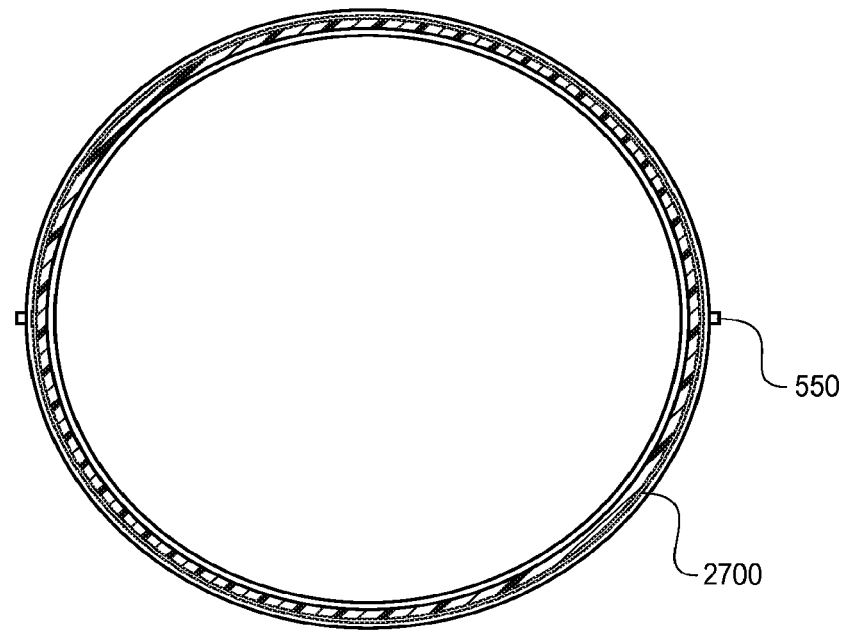

Similarly, FIGS. 7*a* and 7*b* illustrate another embodiment where flaps 550 of the shell 100 are used to hold two or more parts of the container together. The connection facilitator 140 may be applied to parts of the flaps 550. As illustrated in FIGS. 7*a* and 7*b*, the flaps 550 may only cover a portion of the outside surface and only the flaps 550 may receive the connection facilitator. The flaps 550 may be used only or in combination with connection dimples as illustrated in FIG. 7*b*. FIGS. 8*a* and 8*b* may illustrate an embodiment where the connection facilitator 140 is applied to the flaps 550 and the flaps 550 are folded over onto the shell 100 to create a smooth surface. FIG. 9*a* may illustrate another embodiment where the connection facilitator 140 is applied solely to the flanges or flaps 550 and the flanges 550 may be used to support an outsider sleeve 2700 or may be pushed through the sleeve 2700 and folded over onto the sleeve 2700.

Figure 10:
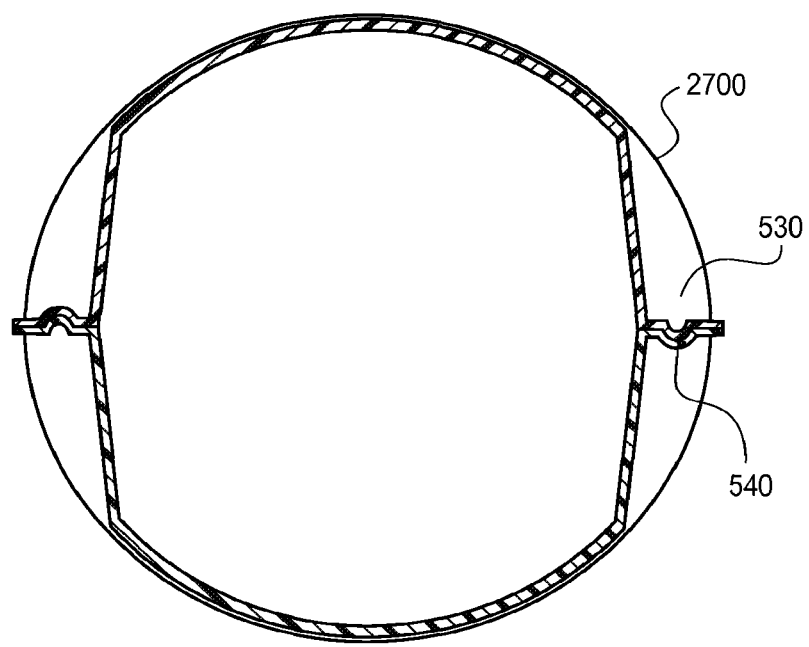
FIG. 10 is an illustration of registrations features on a smooth container.

Further, as illustrated in FIG. 10, the registration dimples 530 and receiving features 540 may have crimps or recesses to further aid in the effectiveness of the connection facilitator 140. FIGS. 11 and 12 illustrate yet another embodiment where there are even more dimples 530 or lugs that connect the multiple parts of the container shell 100 together. Logically, the connection facilitator 140 may be applied only to the connection points between the lug 530 and the receiving point 540. As illustrated in FIGS. 8-12, the result may be a cylinder that may be smooth around the entire perimeter. In addition, the container may still be easily removed by a user and the container may still be biodegradable or compostable.

In addition, there may be embodiments where the container 90 may be made from more than two shell portions or halves 125 135 but may be made from several parts that are connected together, through adhesive 140 or through other appropriate manners of connection.

In some embodiments the adhesive 140 is applied to the first surface 122 and or second surface 130 to be connected prior to assembly. As an example and not limitation, contact cement may be applied as the adhesive 140 and allowed to dry prior to the use of the container assembly unit 110. The adhesive 140 could be a decal adhesive, a pressure sensitive adhesive, a heat activated adhesive, a hot melt adhesive, or any appropriate adhesive. In addition, mechanical or physical connections may be possible and are contemplated.

Figure 13:
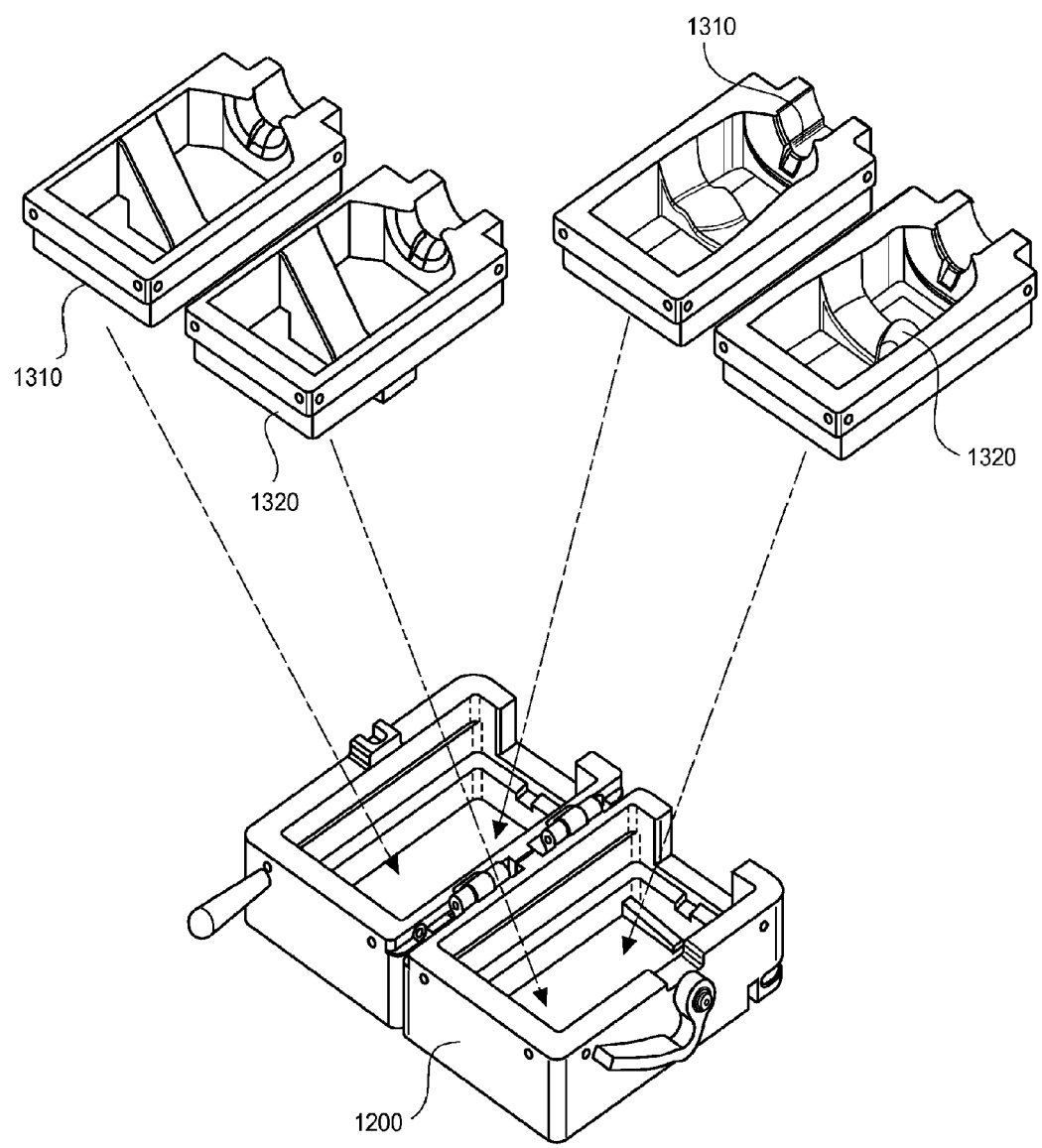
FIG. 13 is an illustration of an assembly unit with inserts for different container types.
Figure 14:
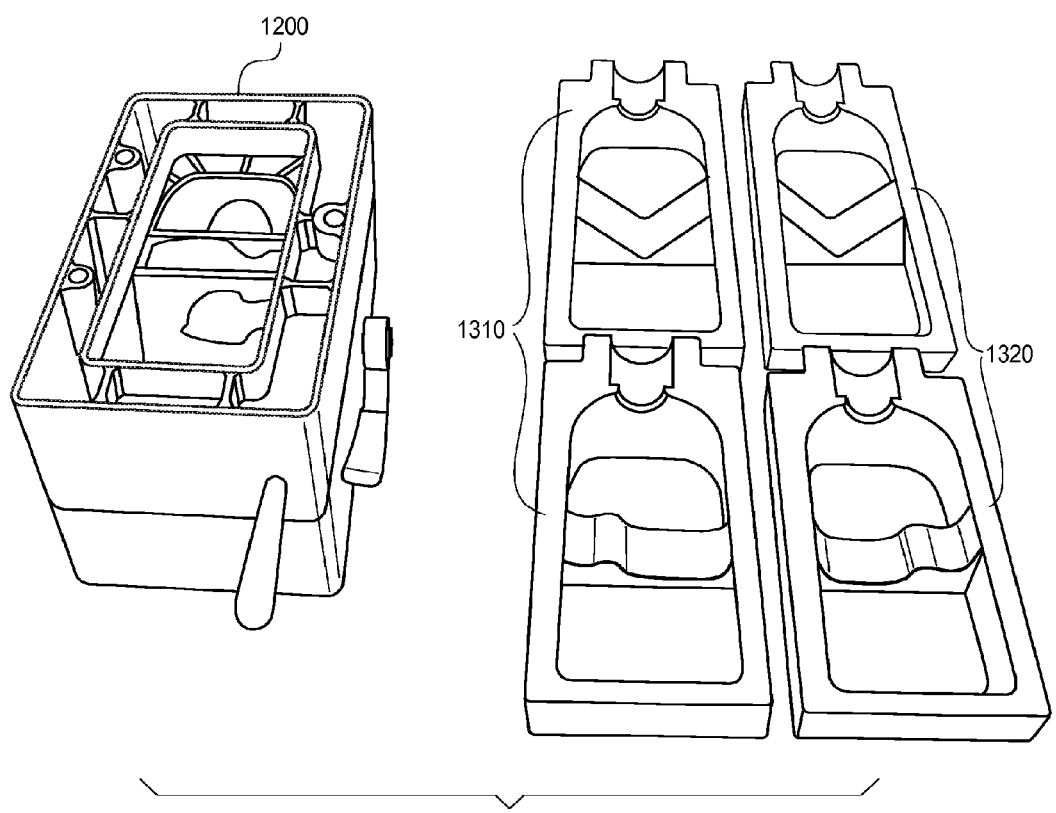
FIG. 14 is an illustration of an assembly unit and some inserts.
Figure 15:
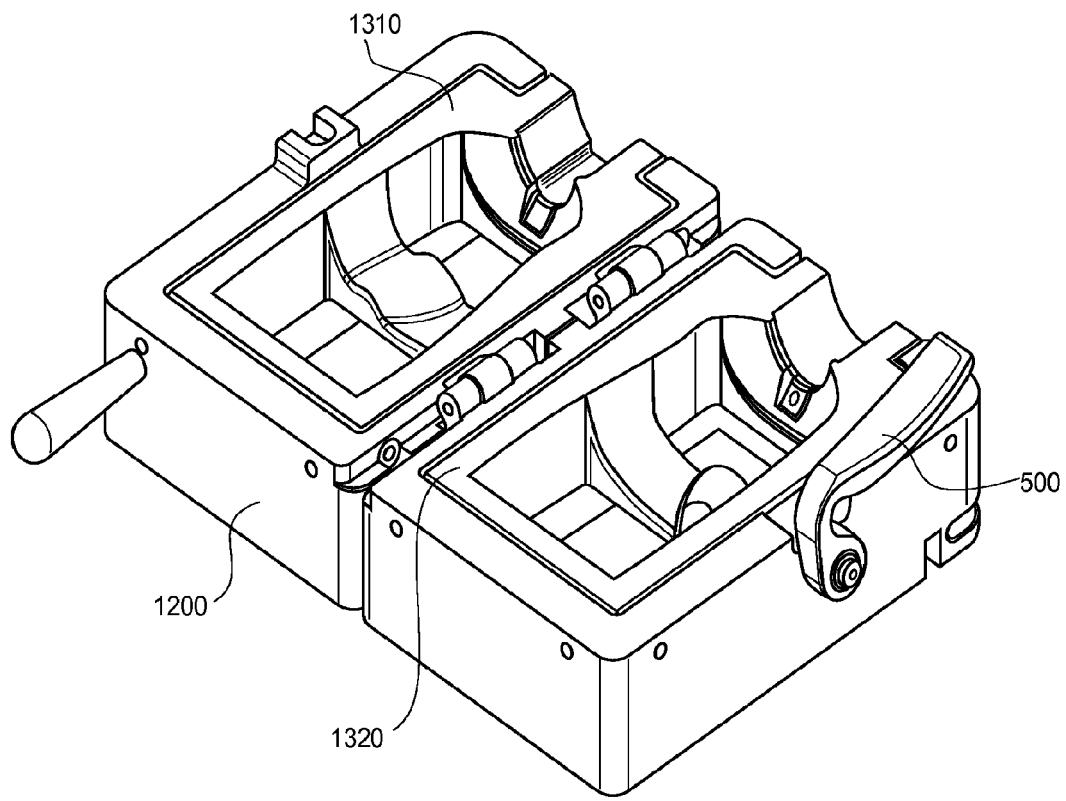
FIG. 15 is an illustration of an assembly unit with inserts in the assembly unit.

In some embodiments such as the embodiment illustrated in FIG. 13, the assembly unit 1200 may contain inserts 1310 that may be changed depending on the container 90. The inserts 1310 may be designed to facilitate the creation of containers of different shapes while using the same assembly unit. The inserts 1310 may be added to the assembly unit 1200 allowing for the simple substitution of inserts 1310 into the assembly unit 1200. FIG. 14 is an illustration of the assembly unit 1200 next to a first set of top and bottom inserts 1310 1320 and a second set of top and bottom inserts 1310 1320 where both the first set and second set of inserts 1310 1320 may fit inside the assembly unit 1200.

The inserts 1310 may be made from a variety of materials as long as the inserts 1310 can meet the required functionality of compressing the parts of the shells together. In some embodiments, the inserts 1310 are made of the same material as the assembly unit 1200, such as aluminum or an aluminum alloy. Of course, other stiff and resilient materials are possible and are contemplated.

The inserts 1310 may be held in place in place in a variety of ways. In some embodiments, such as the embodiment illustrated in FIG. 15, set screws may be used to hold the inserts 1310 in place. In other embodiments, releasable clips, or magnets may be used to secure the inserts 1310 into the assembly unit 1200. In yet another embodiment, the assembly unit 1200 may open to allow the inserts 1310 to be placed inside and then the assembly unit 1200 may be secured around the insert 1310. Of course, other manners of securing the inserts 1310 to be secured inside the assembly unit 1200 are possible and are contemplated.

Figure 16:
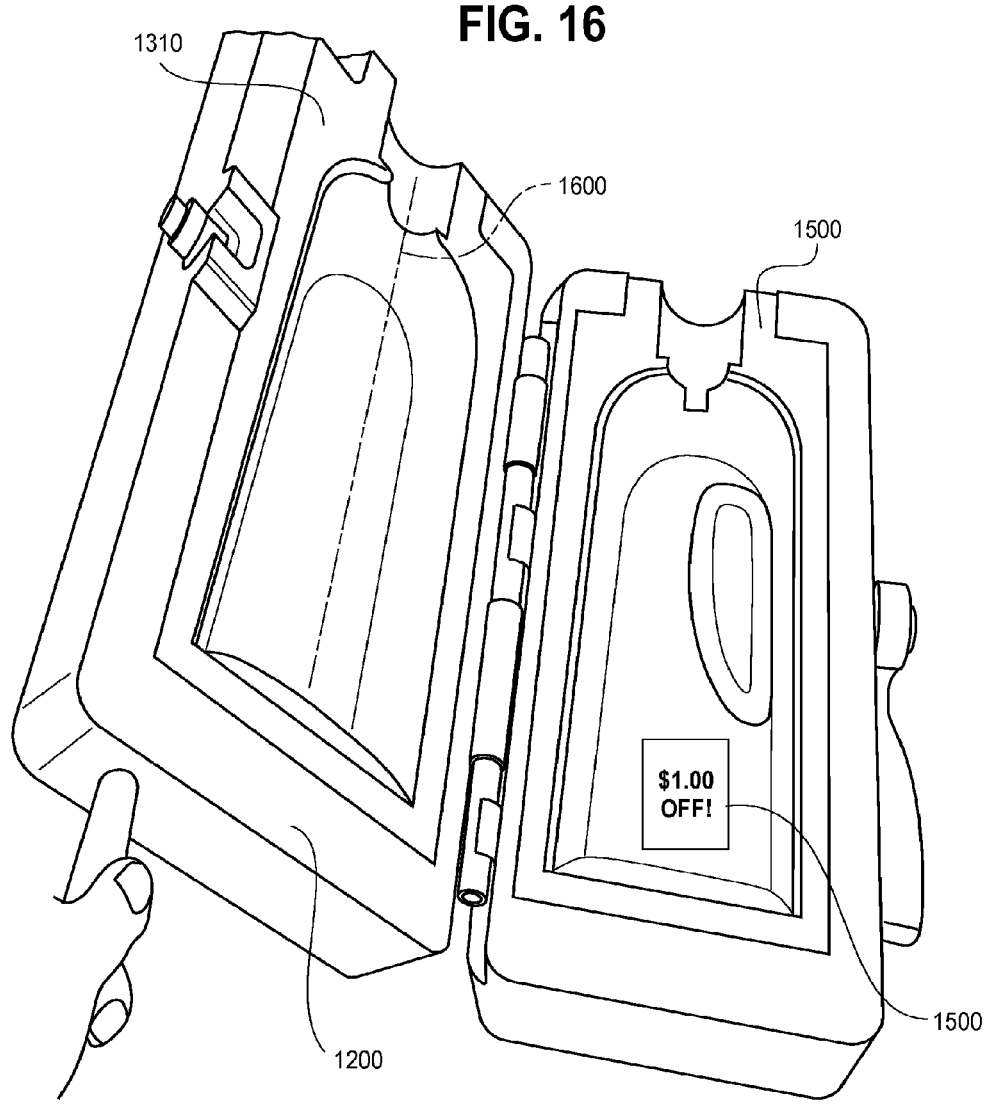
FIG. 16 is an illustration of an assembly unit with inserts and a container that is formed from two separate pieces.
Figure 17A:
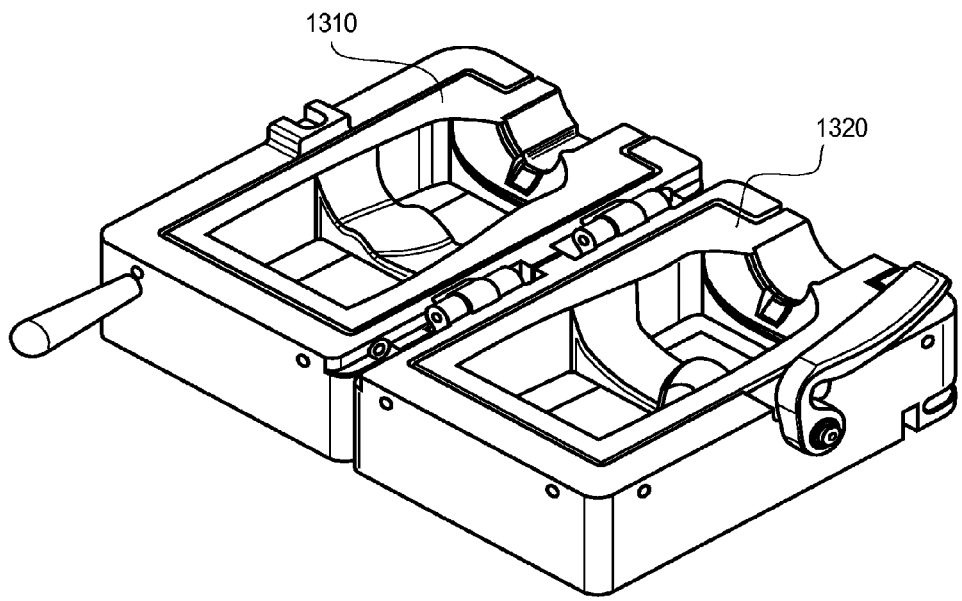
FIG. 17a is an illustration of the assembly unit in the open position.
Figure 17B:
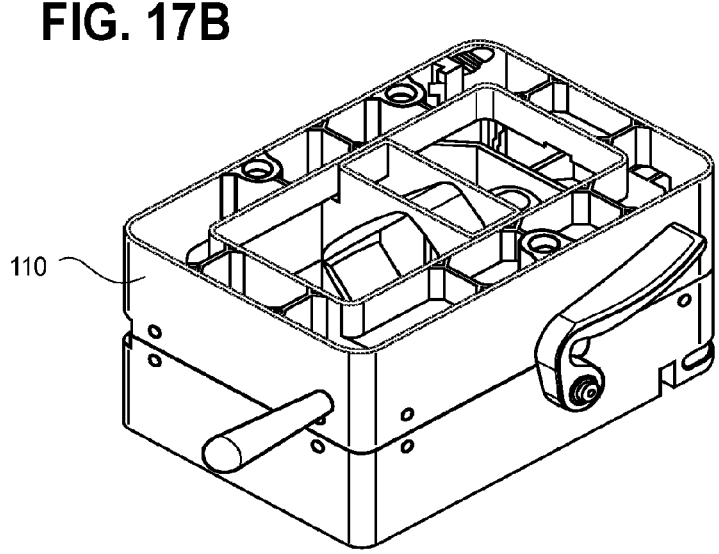
FIG. 17b is an illustration of the assembly unit in the closed position.
Figure 18:
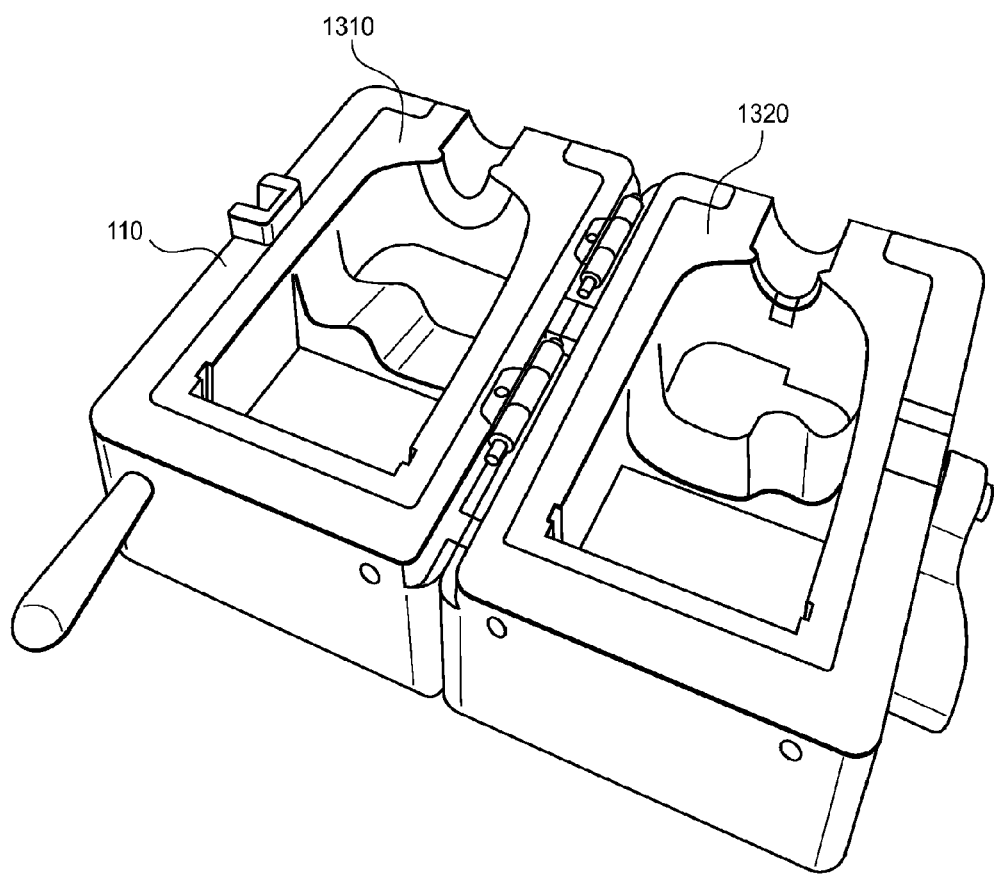
FIG. 18 is an illustration of the assembly unit with the assist handle in the open position.
Figure 19:
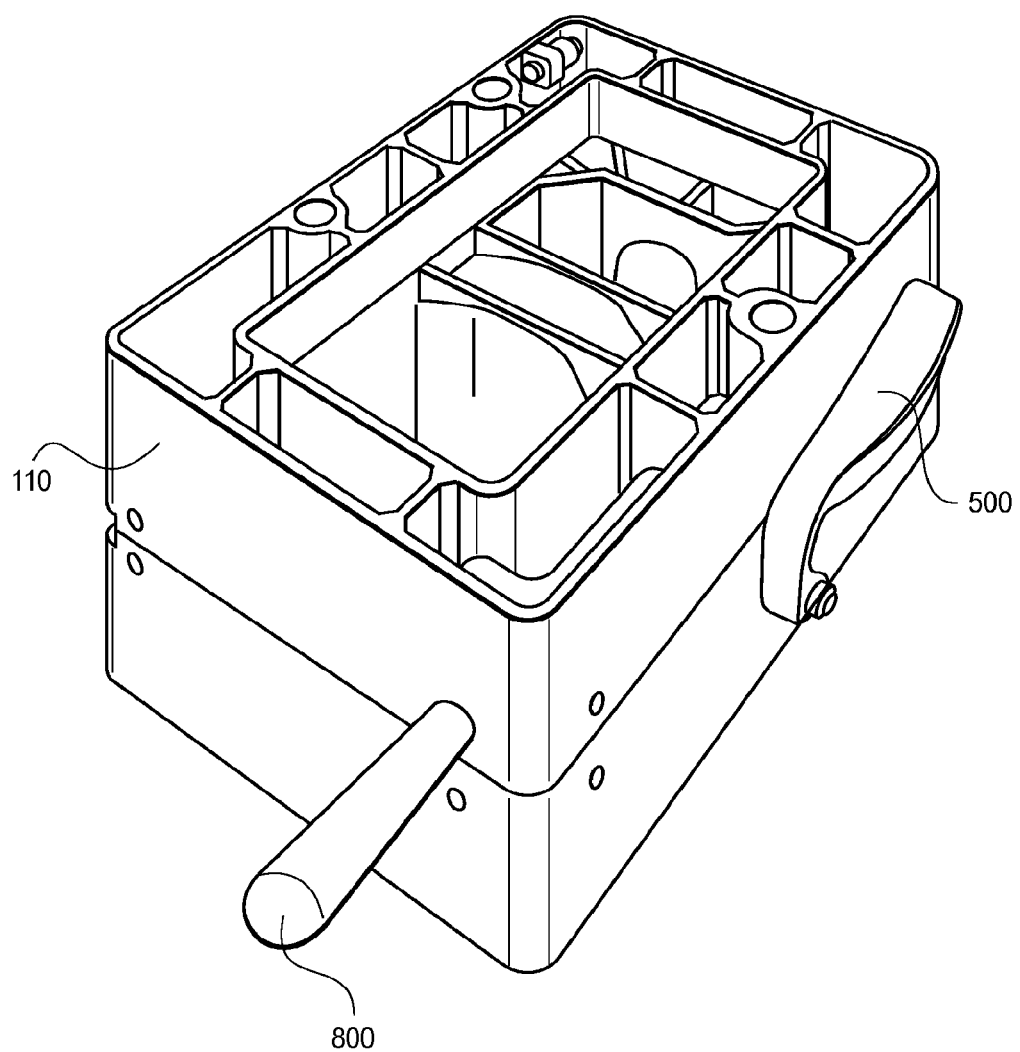
FIG. 19 is an illustration of the assembly unit with the assist handle in the closed position.

FIGS. 13-17 illustrate one embodiment of an assembly unit 1200 adapted to receive an insert 1310. Sample steps to install the insert 1310 include loosening the set screws that hold the insert 1310 such that the insert 1310 may be properly placed without interference from the set screws. The frames or halves of the assembly unit 1200 may be opened and the inserts 1310 may be added to the cavities in the frames of the assembly unit 1200. The frames of the assembly unit 1200 may be closed and latched. The inner edges of the inserts 1310 may be adjusted and aligned and the set screws may be slightly tightened. The frames of the assembly unit 1200 may be opened and shell portions 125 135 may be placed in the cavities of the inserts 1310. The frames of the assembly unit 1200 may be closed and locked and the set screws may be tightened to lock the insert 1310 in place. Finally, the latch 500 and hinge 170 tension may be adjusted for the desired clamping force depending of the type of shell 100 and desired final container 90. FIG. 18 illustrate the inserts 1310 in the frames of the assembly unit 1200 and FIG. 19 illustrates the assembly unit 1200 being closed and locked with the inserts 1310 1320 in place.

In operation, the assembly unit 1200 with inserts 1310 may operate in a similar manner as an assembly unit 1200 without inserts 1310. As illustrated in FIG. 17, the first part of the shell 125 may be placed in the top insert 1310 and the second part of the shell 135 may be place in the bottom insert 1320 and the two shells 125 135 may brought together in a controlled and aligned manner to connect the two (or more) parts of the shell together using the connection facilitator 140 to make an integrated container 90 that still can be separated from the liner 120 and composted and/or recycled.

It also should be noted that it may be more efficient to have dedicated assembly units 1200 for high volume containers 100 as removing an insert 1310 and adding a new insert 1310 may be time consuming. Further, dedicated assembly units 1200 may be designed for a longer life. In addition, there may be assembly units 1200 and related inserts 1310 and shells 125 135 with more than just a top part and bottom part but may have a plurality of parts that are brought together to form the container 90

Figure 3:
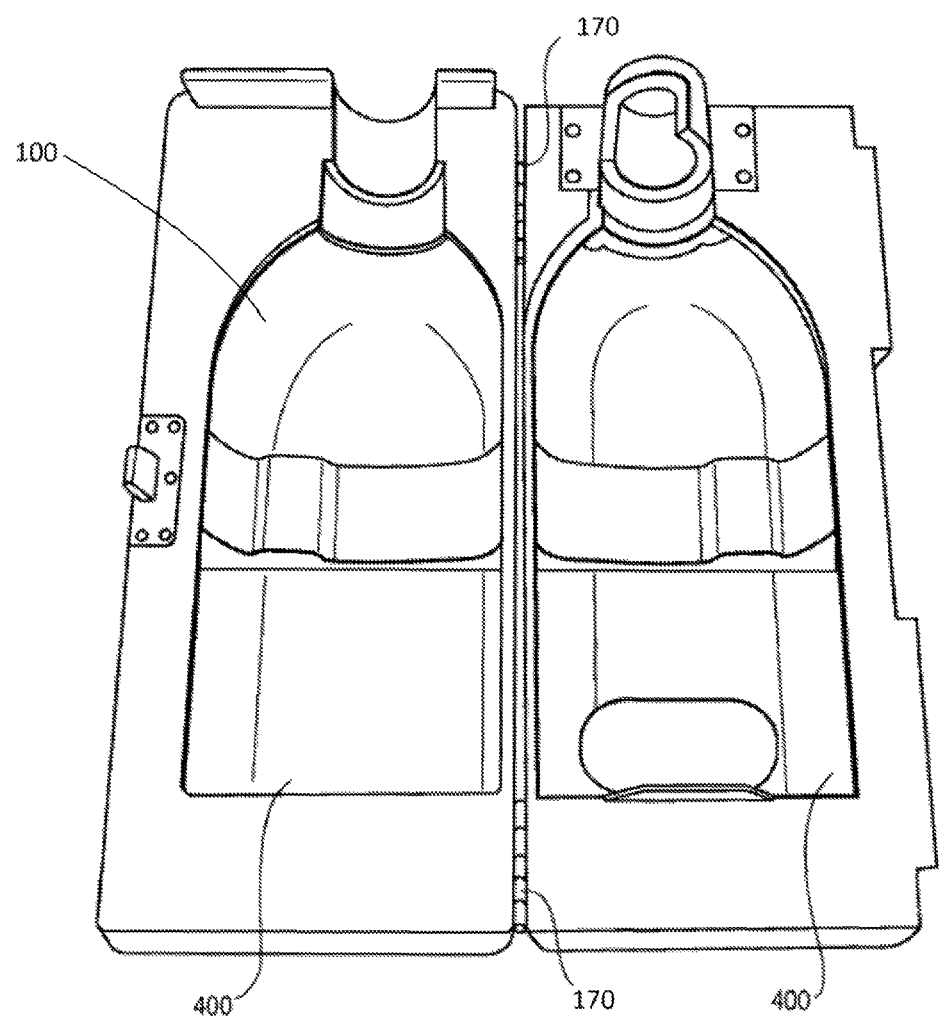
FIG. 3 is an illustration of an assembly unit.
Figure 4:
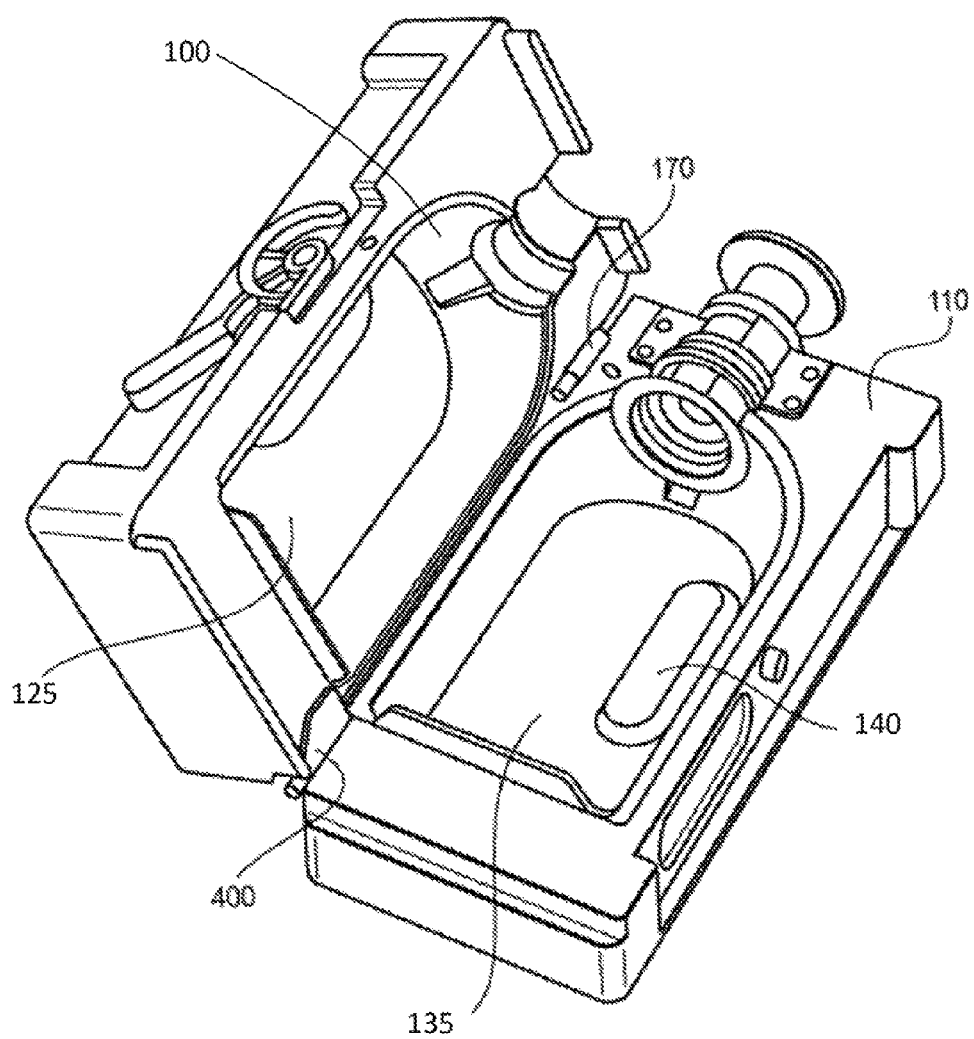
FIG. 4 is an illustration of an assembly unit and container in an open position.
Figure 20:
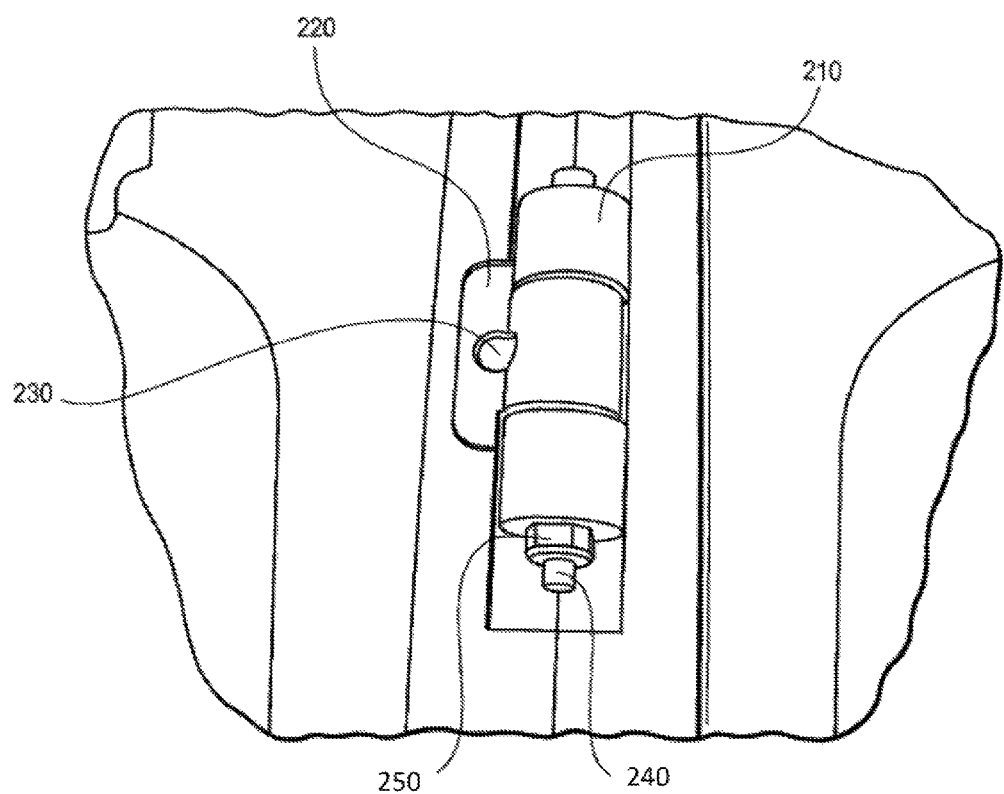
FIG. 20 is an illustration of an adjustable hinge in an assembly unit.

The assembly unit 110 may include one or more hinged connections 170 between shell cavities 400 (FIGS. 3 and 4). A hinge location 180 can be in axial alignment with a hinge of the pulp shell of the container 90. In other embodiments, the device 100 assembly's hinge 170 is parallel to a pulp shell's 100 hinge but with a dimensional offset in order to achieve optimal compression between the pulp shell 100 features. This relationship could be adjustable. For example, the hinge 170 may be adjustable to separate the shell cavities 400 apart by a desirable distance depending on the width of the material of the shell 100. FIG. 20 may illustrate one embodiment of an adjustable hinge 170. The hinge 170 may comprise two wings 210 220 held together with a pin 240 upon which the wings rotate. The pin 240 may be held in place using a screw and a nut 250 which may be removable. In addition, one or both of the hinge wings 210 220 may be replaceable. In this way, the width of the assembly unit 1200 may be adjusted to accommodate materials and containers 100 of different widths.

Figure 21:
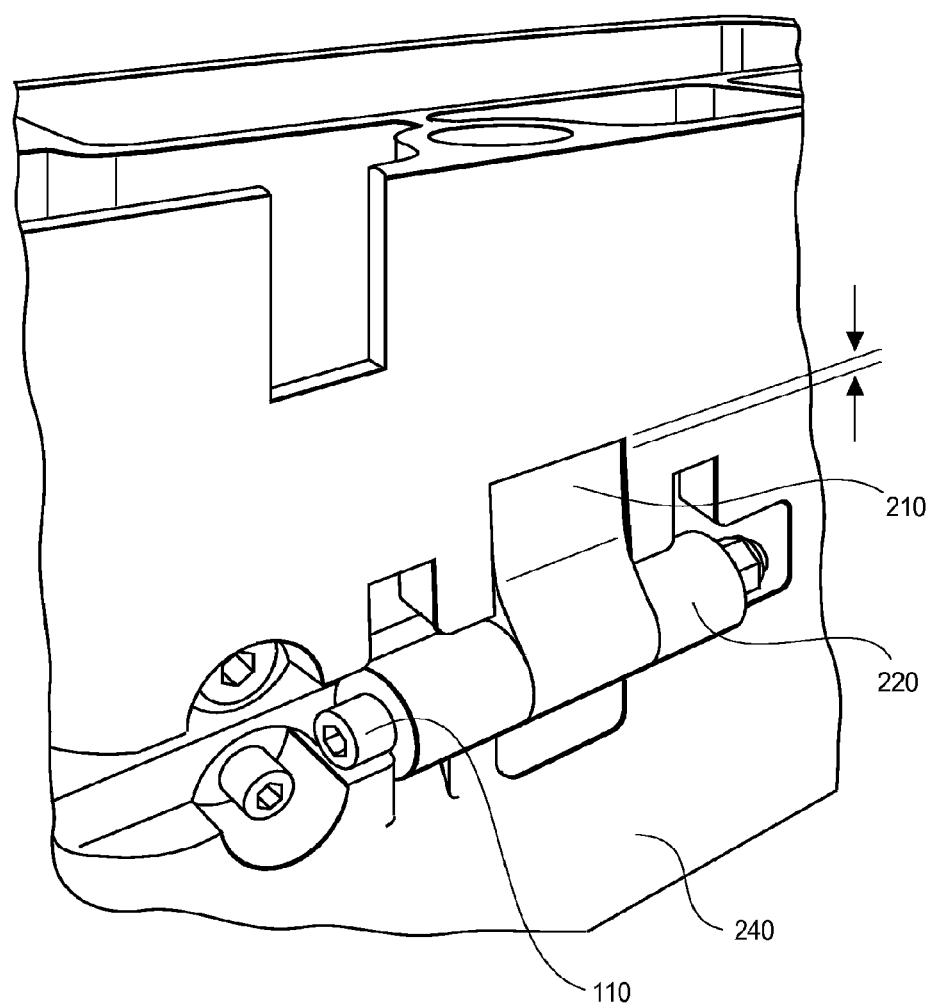
FIG. 21 is an illustration of an assembly unit with an adjustable hinge for containers of different thicknesses.

FIG. 21 may illustrate from another view how the width of the assembly unit 110 may be modified based on the hinge wings 210 220 used. In other embodiments, the hinge wings 210 220 may have an adjustable attachment point where the attachment point is not just a hole but is a slot that allows the hinge wing attachment point to be adjusted based on the width of the material or the container 90 being created. Of course, other manners of adjusting the assembly unit 110 to accommodate materials and containers 100 of different widths are possible and are contemplated.

Figure 22:
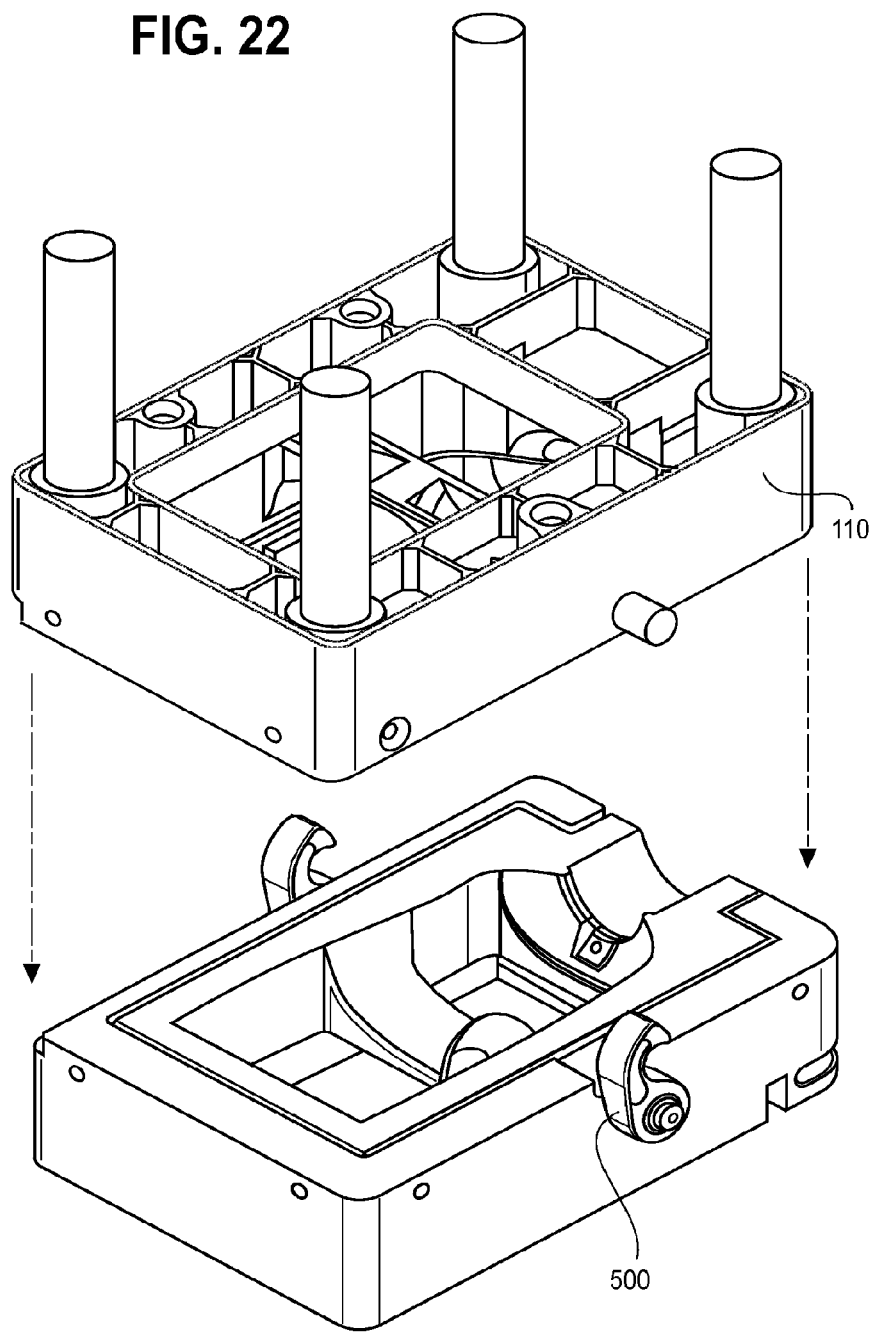
FIG. 22 is an illustration of an assembly unit without a hinge.

In addition, the pulp shell 100 may be separate pieces without a hinge 170 or could be more than two pieces that are connected together to form the container 90. In this case, hinges 170 may be required on the integration fixture 110 to bring the parts of the container together, but the hinges 170 may or may not be aligned to any particular feature of the shell parts. Of course, other means to moveably connect together the parts of the fixture, such as rods, pivots, guides, slots, chains, pistons, axles, are possible and are contemplated. The device 110 could be two independent and non-hinged parts, in the example of a container with 2 shells. This could be described a top and a bottom part as illustrated in FIGS. 22-24. They could then be brought together in a top down linear translation. The two parts could register as they close so that shell to shell alignment is maintained.

Figure 23A:
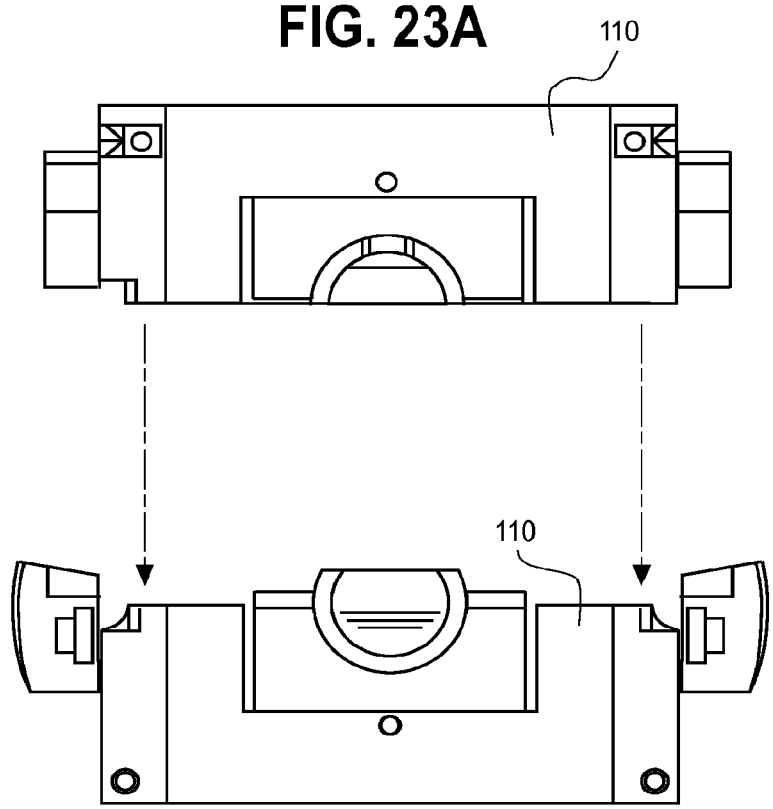
FIG. 23a is an illustration of the un-hinged assembly unit being put together.
Figure 23B:
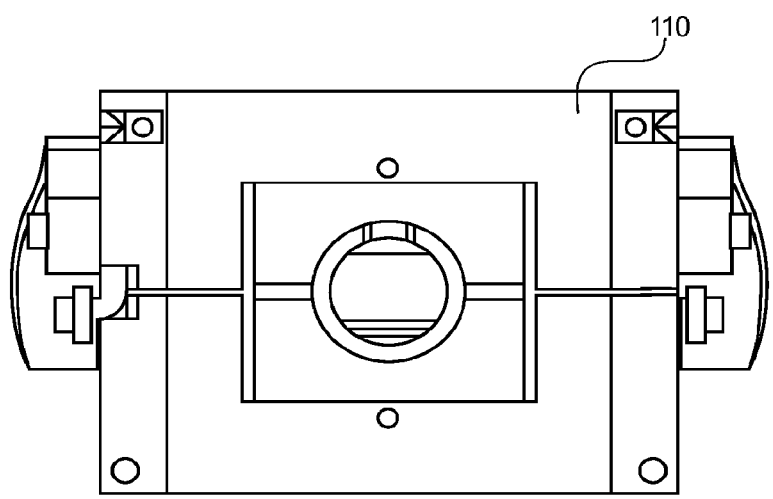
FIG. 23b is an illustration of the un-hinged assembly unit in a closed state.
Figure 24:
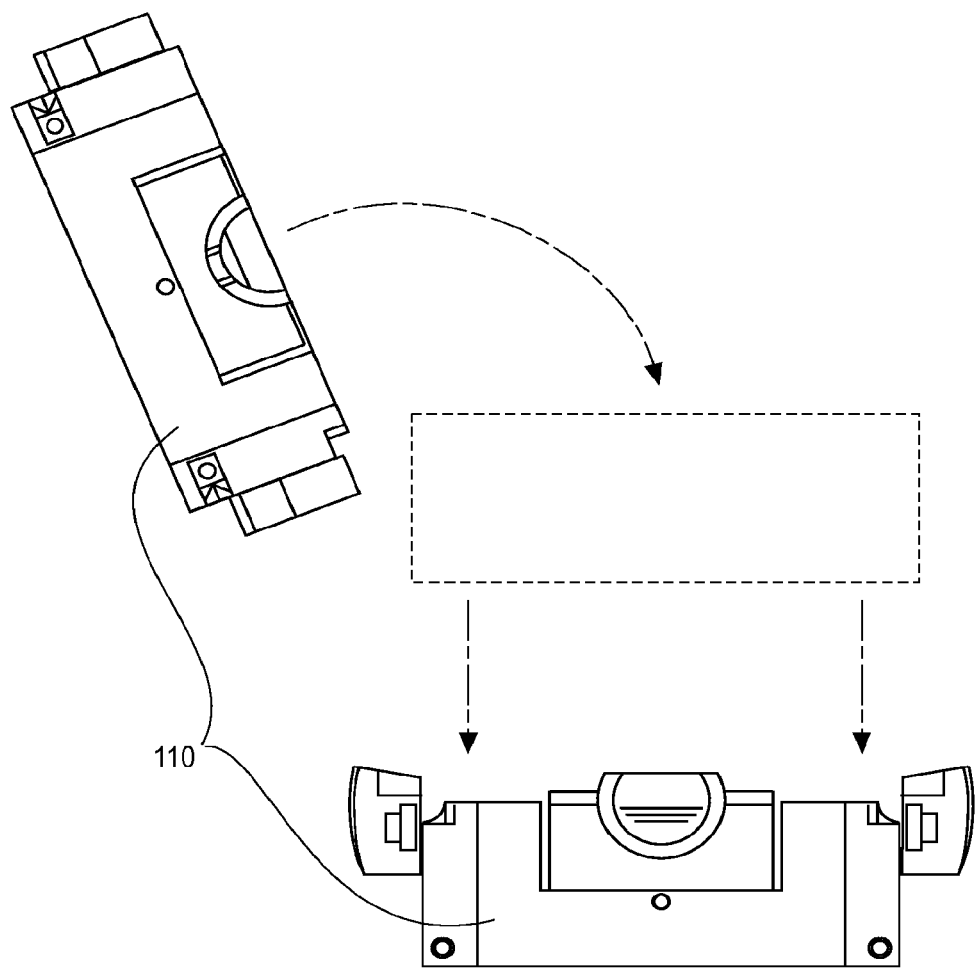
FIG. 24 is an illustration of how the un-hinged assembly unit is used.

FIG. 22-24 may illustrate other embodiments of the assembly unit 110 which may be designed to handle shells 100 that are not hingedly connected but are in two parts. The assembly unit 110 may also be of two parts that are not connected by a hinge 170 but may be guided to be aligned using guide pins, rails or optical sensors. In FIG. 22, the parts of the assembly unit 110 may be linearly guided together as also illustrated in FIGS. 23a and 23b, while in FIG. 24, the two parts may be rotated to be in communication with each other again, using guidance devices such as rails, pins, optical sensors, etc. For example, the first assembly unit 110 part may be in a press type arrangement where the first device part is pressed into the second assembly unit 110 where the second device part may be stationary or may also move.

Figure 25:
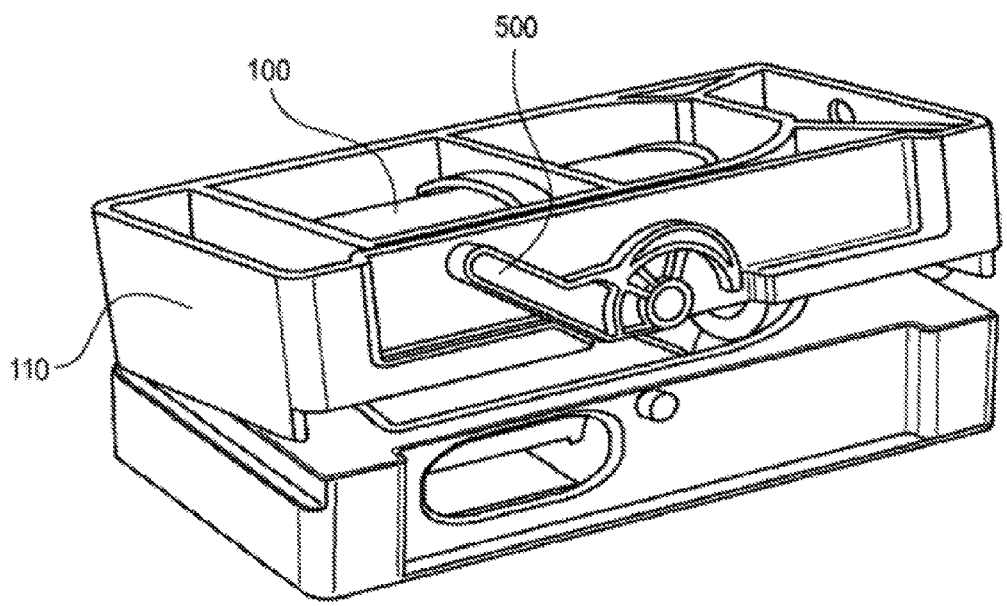
FIG. 25 is an illustration of an assembly unit and container approaching the closed position.
Figure 26:
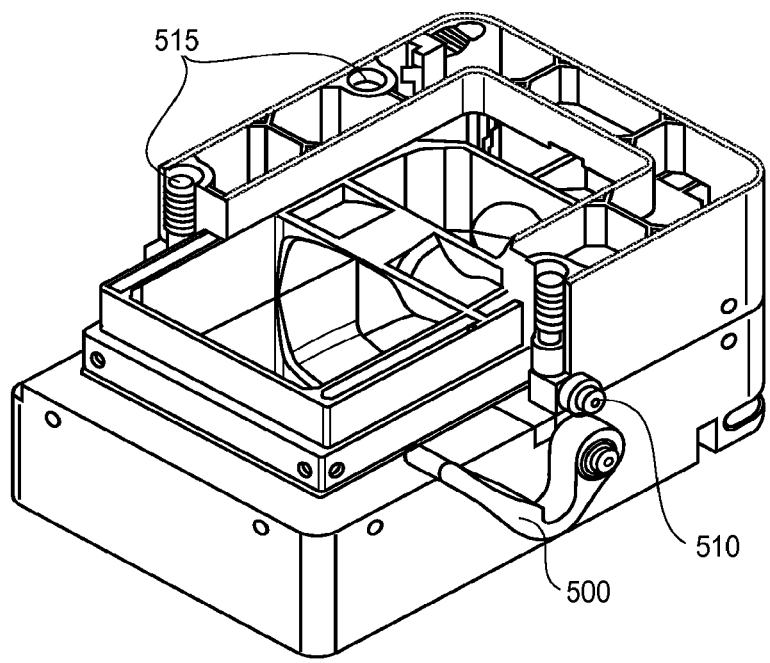
FIG. 26 is an illustration of the adjustable features of the assembly unit.

There could also be features on the assembly unit 110 to lock the assembly unit 110 closed for the period of time required for glue curing. There could also be a force controlling feature to ensure a specific pressure is applied to the glue surfaces. The assembly unit 110 may include a latch system 500 (FIG. 25) to provide pressure upon the flanges 122 130 during a period of time required to obtain a sufficient bond. Depending on the adhesive used or the mechanical connection method used, the time and pressure required could vary widely. In an embodiment, a cam-style latch 500 is employed to give the operator flexibility in the amount of pressure exerted on the joint and in the amount of time the pressure is applied. It could be momentary, or last until the assembly unit 110 is opened and the container 90 removed. FIG. 26 illustrates another sample cam-style latch 500. The pin 510 which the cam latch 500 interfaces and leverages against may be a bearing that easily spins for easier latching and longer life. In addition, the latch 500 may be manually operated or may be operated by a machine.

In some additional embodiments, it is conceived that adhesive 140 may be applied to the pulp shell gluing surfaces (first surface 122 and second surface 130) while in the container assembly unit 110. The container assembly unit 110 may retain the pulp part of the shell 100 in its correct dimensional shape while the adhesive 140 is applied to specific areas of the pulp shell 100. This adhesive 140 application could be automated for precise dosing and location or it could be applied manually by an operator. Features on the container assembly unit 110 could aid in the controlled application of the adhesive 140. This could include guide channels to allow a roller-style adhesive applicator to follow. A 2 axis applicator could move the adhesive applicator precisely. There could also be a 3-axis motion for the application of the connection facilitator where the areas receiving the adhesive are in the third dimension are not easily reached by the 2-axis applicator.

Further, a separate glue application unit may accept the assembly unit 110 with shells and then apply the connection facilitator 140 while the container shell 100 is in the assembly unit 110. In some embodiments, the assembly unit 110 may assist in the connection process, such as applying the glue from distributions channels in the assembly unit 110 or by allowing mechanical connections to be added to the first 120 and second surfaces 130 while the container shell 100 is in the assembly unit 110. Of course, other manners of applying the connection facilitator 140 are possible and are contemplated. In some configurations of the integration equipment 1200, a functional station may exist that is arranged to prepare container shells 100 or liner parts 120 for assembly, by application of connection facilitator 140.

Under some circumstances modifications, to the shell 100 parts may be required in order for there to be an increased mechanical bond between the shell and the glue. Glue failure between shells 100 can be due to the glue peeling away the thin contact surface/layer of the pulp part. In this example, the strength of the glue joint is not greater than the separation strength of the compressed pulp. Of course increased gluing surface area will add to the overall separation resistance. But within a given surface area, it has been found that if the glue is able to get into the 'layers' of or the 'thickness' of the pulp, there is a greater amount of force required to separate the shells. This is due to the fact that the separation forces are not only concentrated at the glue contact face with the pulp but at varying depths within. The separation force is distributed within a greater range of wall thickness. A station where the areas to be glued are modified is conceived. By way of example and not limitation, a compression operation (or other type) could transmit blind holes into the flanges of the pulp and any areas to be glued. In one embodiment such as in FIG. 10, these divots 530 and detents 540 create unevenness into the flange and allow glue to get into the wall thickness, into the fibers, as well as the unaffected outer surface. This can allow for a better bond between shells or between fitment and shells. Many characteristics of this modification are contemplated.

The adhesive may be applied to the container shells 100 (first 122 and second surfaces 130) at a variety of orientations and a variety of locations. For example, the adhesive may be applied to container shell 100 flanges while container shells 100 may be in an assembly unit 110 such as an assembly unit 110. In another embodiment, the adhesive may be applied before the container shells 100 are placed in the assembly unit 110. In another embodiment the adhesive may be located in an area of the shell 100 so that the pouch/liner, once expanded, becomes bonded to the shell 100.

In some versions of the container shell 100, the base 160 is formed from two flaps that overlap. There may be a need for a ramp like feature 165 (FIG. 1) that positions the desired interior flap to the inside so that there is no interference on closing of the device 110. The bottom 160 could also have 'split interlock flanges' or other arrangements that need to be controlled upon closing. In another version of the container such as in FIGS. 7, 8 and 9, there are flaps along the side of the container that overlap form the opposite shell and adhered with adhesive.

It should also be noted that the assembly units 110 may have additional adjustments such that the assembly unit may create a variety of containers 90. As illustrated in FIG. 26, a variety of adjustments are possible and are contemplated. For example, the receiving pin 510 may allow travel such that the clamping force may be adjusted. In addition, the pin 510 may be spring loaded such that the pin 510 may make it easier to initially latch the assembly unit 110 closed.

In addition, the hinges 170 may be adjustable. A set screw 515 may be used to adjust the attachment point of the hinge wings 210 220 such that the opening when the assembly unit 110 is closed may be adjusted. As can be seen in FIG. 21, the set screw may be located above the hinge 170 and may be used to pull or push the hinge wing 210 220 to the desired opening.

At block 209 in FIG. 2, the connection facilitator 140 (e.g., FIG. 1) may be prepared to a state of readiness for connection. If the connection facilitator 140 is mechanical, a protrusion may be stamped into the first surface 122 and a receiver may be stamped into the second surface 130. In another embodiment, a slot may be formed in the first surface 122 and a receiver may be formed in the second surface 130. If the connection facilitator 140 is an adhesive, in some embodiments, only the first surface 122 or second surface 130 receives the application of adhesive 140. In addition, there may be embodiments where the container shell 100 may be made from more than two portions or halves 125 135 but may be made from several parts that are connected together, through adhesive 140 or through other appropriate manners of connection.

At block 212 in FIG. 2, the connection facilitator 140 (e.g., FIG. 1) may be tested for completeness. The test may be completed in a variety of ways. In some embodiments, the connection facilitator 140 may be an adhesive 140 and will need to dry. In other embodiments, a necessary heat may be required to prepare the adhesive 140. In yet another embodiment, a necessary pressure may be required to prepare the adhesive 140. In some embodiments, specific devices of the assembly unit 110 may assist in the connection process. For example, the retention device 500 of FIG. 5 may be used to supply a consistent amount of pressure to seal the adhesive. Similarly, the assembly unit 110 may have a heating element that may be used to apply a consistent amount of heat to the perimeter of the assembly unit 110.

In mechanical adhesion embodiments, the necessary protrusions and protrusion receivers may have to be formed and shaped to be able to have the sides or halves 135 125 adhere. Of course, other embodiments are possible and are contemplated. In some embodiments, the connection is tested to ensure it has sufficient strength. In additional embodiments, the connection may be tested to ensure the first surface 122 and second surface 130 are connected in manner that is visually appealing and functions as desired. If the connection is faulty, the container may be rejected.

Control of Shell Perimeter

Tolerances of pulp molded parts can be lower than parts made in other processes. Further, the contain shells 100 may be deformed from the shipping process. In addition, the component parts may have a relatively high degree of variability. As the contain shells 100 may be deformed in different ways, there is a need to force at least the perimeter of the molded container shells 100 into a correct position for assembly. The cavity 400 in the assembly unit 110 may compel the container shell 100 perimeter to comply dimensionally with the desired specification.

In the case in which the shells 100 are larger than the desired specification, or the perimeter flanges are splayed out from their nominal molded position, the rigid perimeter of the cavity in the assembly unit 110 may force the perimeter back into the correct nominal position. Splaying may occur if a container shell 100 is situated at the bottom of a stack of container shells 100 for shipping, and the nested container shells 100 above force the perimeter of the container shells 100 outward.

In the case in which the container shells 100 are smaller than a desired specification, or the perimeter flanges may be bowed in from their nominal molded position, the assembly unit 110 perimeter may be used to induce the container shell 100 perimeter out to the nominal molded position. As an example and not limitation, the mechanism may contain one or more holes situated at the perimeter of the assembly unit cavity 400 in such a way as to communicate a vacuum to an outside surface of the container shell 100, thereby pulling the container shell 100 perimeter out to its nominal molded position.

In some embodiments, separate inserts 1310 1320 may be placed in the assembly unit 110. The inserts 1310 1320 may be different for different types and size of containers 90. FIGS. 13 and 14 may illustrate sample inserts 1310 1320 being placed inside the assembly unit 110. Also as mentioned previously, the inserts 1310 1320 may be held in place using set screws or the like.

At block 215, the container shell 100 may be placed in an open position. In some embodiments, the container shell 100 is stiff enough that an assembly unit 110 is not needed. In other embodiments, the container shell 100 may be placed in an assembly unit 110 and the both the shell 100 and assembly unit 110 may be placed in an open position. As shown in FIG. 13, the assembly unit 110 may have two or more bays to accept the two or more parts of the container shell 100. The assembly unit 110 may be hinged or guided in a way such that the two or more parts of the shell 100 may be brought together in a controlled and precise manner. In some additional embodiments, the assembly unit 110 may make handling the container shell 100 easier, especially when the edges are covered with adhesive. The assembly unit 110 may have several other advantages, such as being used to apply the connection facilitator (either the deformations or the adhesive), to assist in controlling the connection facilitator, to adding precision to the connection facilitator, etc.

If an assembly unit 110 is used, then a container shell 100 may be placed in the cavities 400 of the assembly unit 110. The placement may be made manually, may be made through a vacuum holding device, mechanical placement, gravity fed, etc.

In some situations, it may be necessary or desirable to include an extra item 1500 inside the container shell 100 along with the liner 120 as illustrated in FIG. 16. A purpose for the extra item 1500 could be a promotional function, such as an inducement to further subsequent purchase, or supply of additional information, an improvement to the function of the package or product housed in the package. If an extra item 1500 is to be included, at block 218, the extra item 1500 may be placed in the open shell 100. A functional station may be configured with equipment or devices for the placement of an extra item 1500 into the cavity 400 of the container shell 100 parts prior to closing of the container shell 100 in the assembly process. The extra item or items 1500 may be placed in container shell 100 cavity 400 before or after a liner 120 is placed in the cavity 400. As examples and not limitations, extra items 1500 could include coupons, fliers, cards, toys, tools, writing implements, packets containing other products such as detergent, milk, seeds, powders, flavorings, scents, etc.

Some composite containers 90 with molded pulp and polymer liners 120 may be configured to facilitate full separation of material groups for disposal after use. Once separated from the polymer liner parts 120, the molded pulp container shells 100 may be recycled or composted. Similarly, the polymer parts of the container liner 120 may be recycled after they are separated from the pulp parts such as the container shell 100. In some containers 90, it may be desirable or necessary to provide aids to separation of the constituent container parts for disposal after the contents have been exhausted.

A separation aid 1600 (FIG. 16) may provide a user with a tab, loop, flap, string, thread, etc. to pull on to improve the mechanical advantage of the manual separation process. The aid 1600 may, upon being pulled, physically separate enclosing shell parts from one another and promote such separation through continued tension. The separation aids 1600 may be located between container shell 100 parts, alongside container shell 100 parts, near or protruding though openings in the container shell 100 walls, at an edge, or at an end of a container shell 100 part. The aids 1600 may be attached to a container shell 100 part using mechanical means or an adhesive. The aid 1600 may be captured between container shell 100 part attachment flanges.

Figure 39:
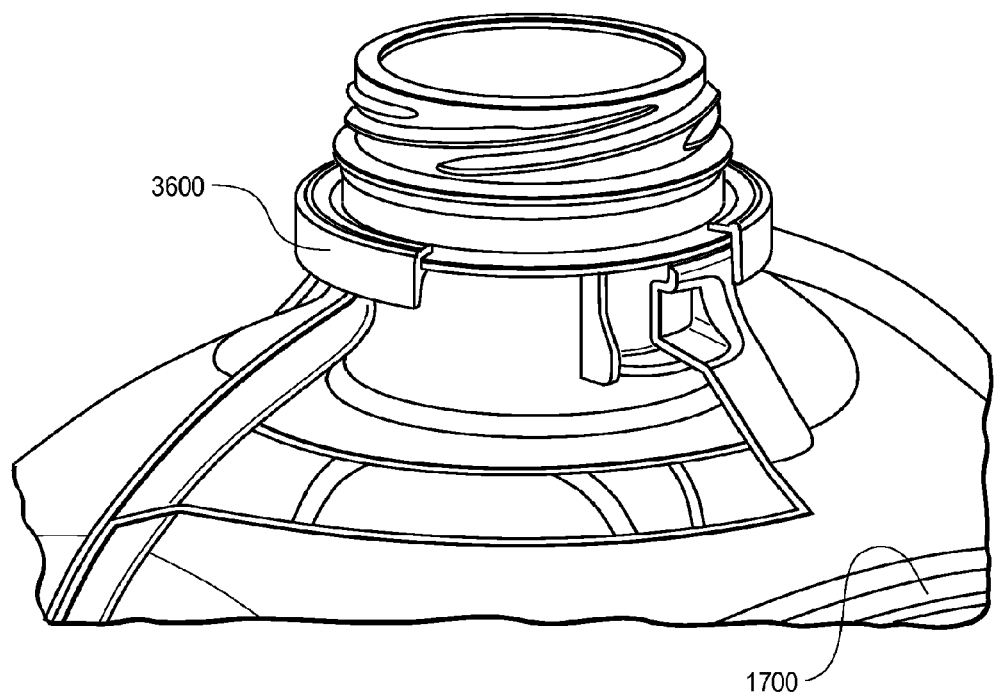
FIG. 39 is a cut-away illustration of the alignment protuberance and the neck interfacing.

A retail part 1700 (FIG. 39) may be attached to a container shell 100 part. The retail part 1700 may be made from paper, paperboard, polymer, polymer film, molded fiber, wood, textiles, etc. The retail part 1700 may be attached to one surface of a container shell 100 part, two or more surfaces of a container shell 100 part, or to an edge of a container shell 100 part. As an example and not limitation, a retail part 1700 may function as a handle, label, hangtag, separation aid, merchandising facilitator, hook, stand, separator, package collator, enclosure wall. Of course, the retail part 1700 may have other functions, shapes, materials, etc., and such logical variations are possible and are contemplated.

Figure 37:
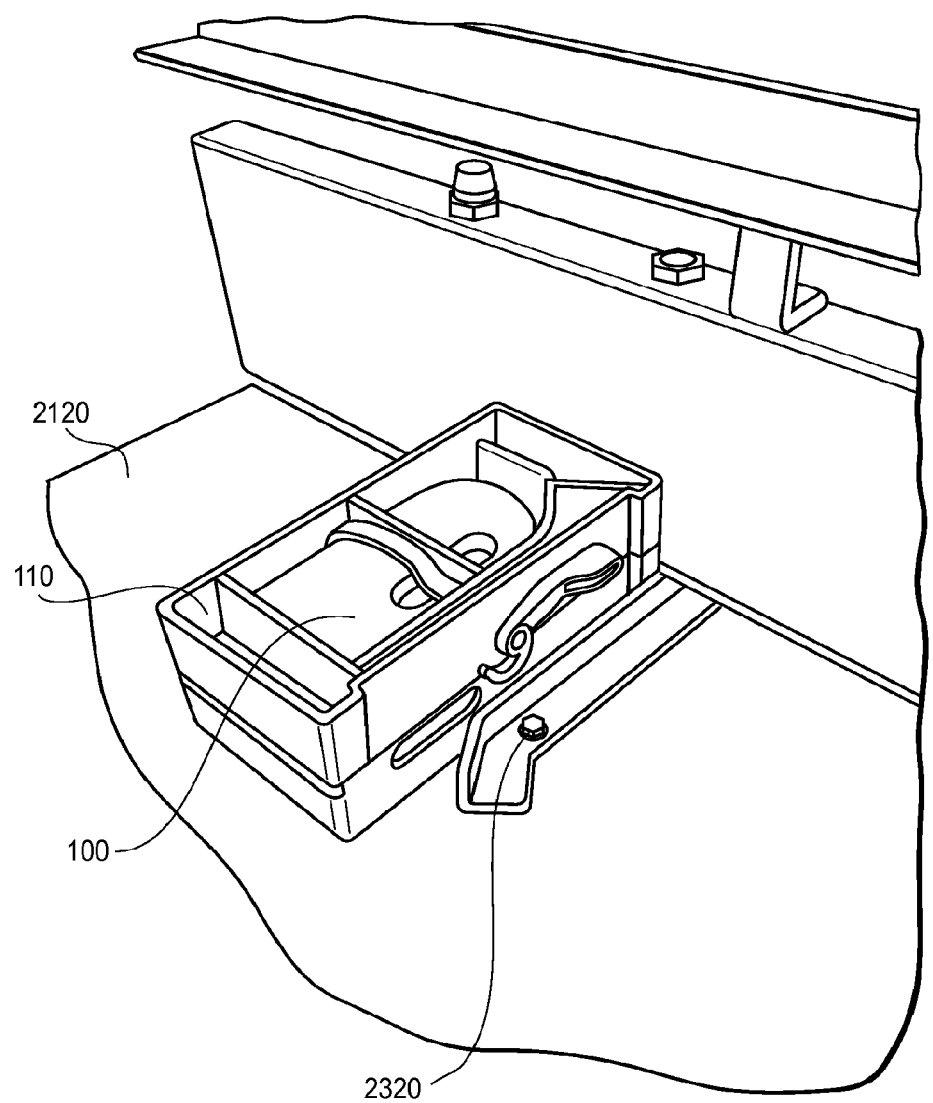
FIG. 37 is an illustration of an assembly device using an alignment device with an assembly unit.

An additional functional part or parts may be inserted into the container prior to assembly. The additional part 3600 (FIG. 39) may be a component that adds support or additional structure to a specific feature or area. Features that could benefit from an insert part could be the handle area, the neck area, the base, as examples and not limitations. This could be made of the same material as the shell, of molded fiber from a range of molding processes, of molded plastic, sheet plastic, cardboard corrugate, etc. Referring briefly to FIG. 37, a retaining collar 3600 may be added to provide additional support to the container collar and neck. Of course, other additional parts are possible and are contemplated.

At block 221, a container shell 100 perimeter may be aligned in a desired dimension and shape. The alignment may be made through a mechanical adjustment, such as mechanical fingers that place the container shell 100 perimeter in the desired location. In another embodiment, guide holes may be used to assist in placing the container shell 100 in the desired location. In yet another embodiment, a vision device as part of the assembly device 1200 may be used to assist in ensuring the container shell 100 perimeters are in the desired locations. In yet another embodiment, a vacuum may be used to guide the container shells 100 into the desired location. Of course, other manners of aligning the container shells 100 are possible and are contemplated. In addition, the assembly unit 110 may embody many of the features used to assist in aligning the container shell 100.

At block 224, liners 120 may be presented to the assembly device 1200. In one embodiment, the liners 120 are premade either at the same location or at a separate location. In another embodiment, the liners 120 are made earlier in the process. In some embodiments, the liners 120 may be made by the same assembly device 1200 and are continuously fed to the assembly device 1200. Of course, other combinations are possible and are contemplated.

Figure 27:
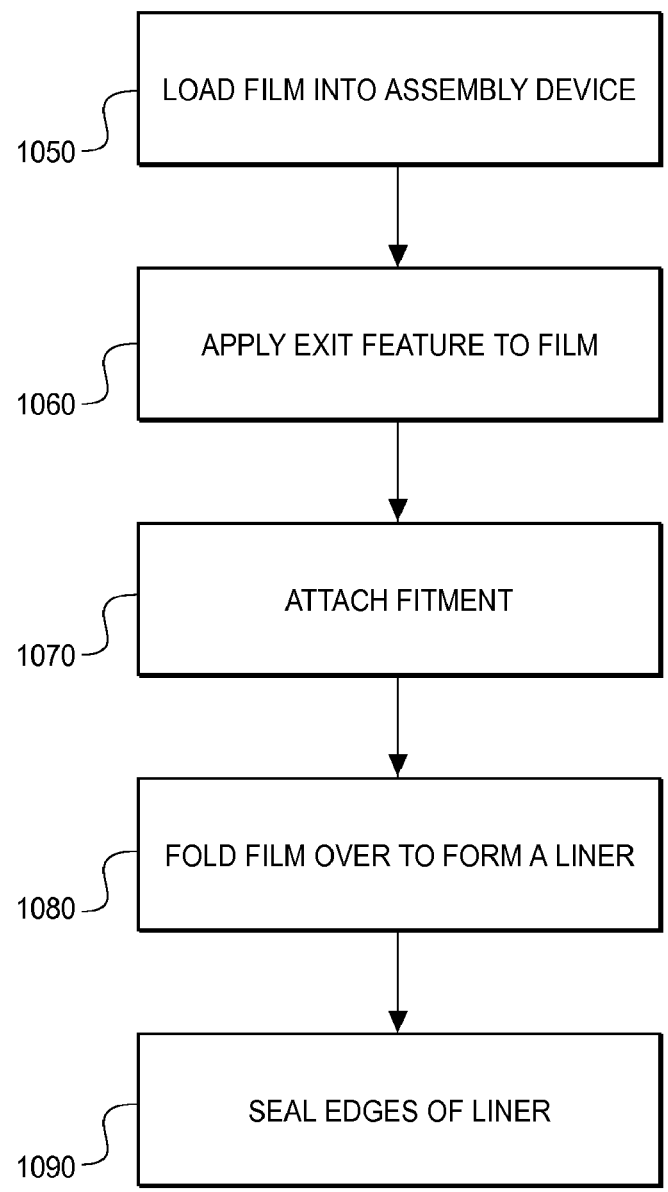
FIG. 27 is block diagram of a method of creating liners.

At block 227, the liners 120 may be separated. Application Ser. No. 12/740,350 assigned to Eco.logic Brands describes many manners of creating liner and this application is incorporated by reference. In addition, FIG. 27 may be a high level illustration of one method of creating the liners 120.

At block 1050, a roll of film may be loaded into the assembly device 1200. The film may be a material that is adapted to the goods to be contained in the film. For example, if the liner 120 is to hold dishwasher crystals which may be rough and abrasive, the film (and resulting liner 120) may be a tougher film. In another embodiment, if the liner 120 is to hold a small volume of liquid, then the film may be thinner.

At block 1060, an exit feature 1800 may be applied to the film. The exit feature 1800 may be used to allow the liner to be emptied through the container shell 100. The exit feature 1800 may be a hole in the film or a slit or any other appropriate shape. The exit feature 1800 may be mated to a fitment 150. The fitment 150 may be used to assist in pouring from the container 90 and may be used to seal the container 90 when the container 90 is not in use. The fitment may be mated to the liner 120 in a variety of ways, such ultrasonic welding, adhesive, mechanical connections, heat welding or a combination of all of these methods.

At block 1070, the fitment 150 may also attach to the liner 120. The attachment of the fitment 150 may have several purposes. In some embodiments, the attachment may keep the fitment 150 from spinning. For example, the fitment 150 may have a screw top. In order for a screw top to work effectively, the fitment 150 should not spin. The attachment of the fitment 150 may be made in a way that ensures the fitment 150 does not spin when a cap is attached. In other embodiments, the fitment 150 may also be attached to the container shell 100 and the attachment to the container shell 100 may ensure that the liner 120 will not fall down into the container shell 100. In some embodiments, the fitment 150 may keep the exit device appropriately placed such that the contents may easily flow from the container.

After the fitment 150 is attached, at block 1080, the film may be folded over onto itself to form a liner 120. Again, the film may be handled by machinery which may use a vacuum or grabbing fingers to move the film.

At block 1090, the side and top of the liner 120 may be sealed. The liner 120 may be sealed in a variety of ways. In one embodiment, the liner 120 is ultrasonically welded together. In another embodiment, the film is heated to melt the sides together. In yet another embodiment, a sealant is used to hold the sides together. Of course, additional methods of sealing the sides are possible and are contemplated.

Once the liners 120 are complete, they are collected and prepared to be separated for insertion into the container shells 100. Of course, as mentioned previously, the liners may be produced at an additional location and may be packaged and shipped to the assembly device 1200 to be added to the container shells 100. The liners 120 may cling to each other as often happens with plastics. Hence, separating the liners 120 may be a challenge.

Referring again to block 227, the liners 120 may be prepared to be handled to be placed inside the container shell. In one embodiment, the liners 120 are separated by hand. In another embodiment, the liners 120 may be separated using a vacuum device to grab a single pouch. In yet another embodiment, the liner 120 may be provided with a specific portion that is meant to be grabbed such as an extension or ear. In yet a further embodiment, the liner 120 may be grabbed by the fitment. In addition, a combination of the above mentioned methods may also be used.

In some embodiments, the process may be in a germ reduced environment. In these embodiments, addition effort may be made to ensure that the liners 120 are handled in a way and in an environment to endure that germs are not introduced into the process or the liner 120. Some sample precautions may include using sanitized machinery to touch and handle the liner 120, keeping the environment germ free, etc. The assembly device 1200 may be configured to be operable in a clean, food-safe environment such as a dairy— or other food- or liquid-packing facility. It may comply with standards applicable to the dairy industry (for example and not limitation: AAA or Interstate Milk Shippers). The assembly equipment or machines 1200 may be configured with guards, covers, cleaning ports and made of suitable materials to facilitate maintenance of food-safe condition and operation. The assembly device's 1200 drive components, motors, servos, chains, links, lubrication points, robotic arms etc., may be positioned to facilitate clean operation for food-safe or dairy conditions (such as AAA or Interstate Milk Shippers certification requirements). For example, all of the assembly components may be situated below the open liners 120 or container shells 100 during the assembly process. The assembly equipment 1200 may be configured to prevent any foreign material from entering the liner 120 or contacting any surfaces that can be expected to have direct contact with edible materials during the integration process. The assembly equipment 1200 may be configured to withstand regular wash-down procedures consistent with food-safe or dairy-filling environments.

Figure 28A:
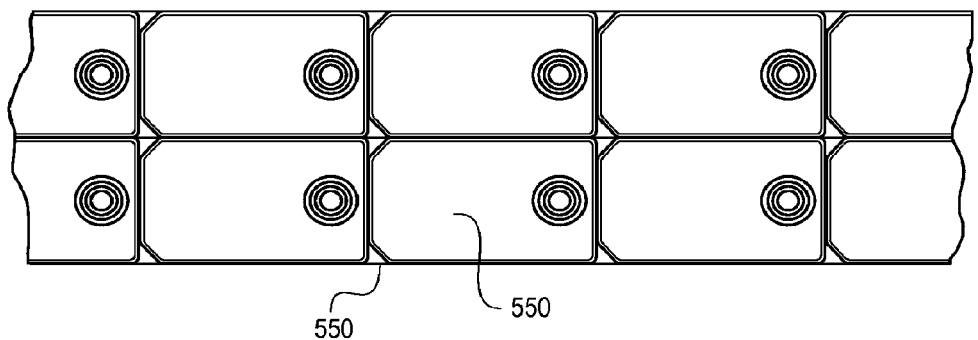
FIG. 28a is an illustration of liners in a bandoleer arrangement with multiple rows.
Figure 28B:
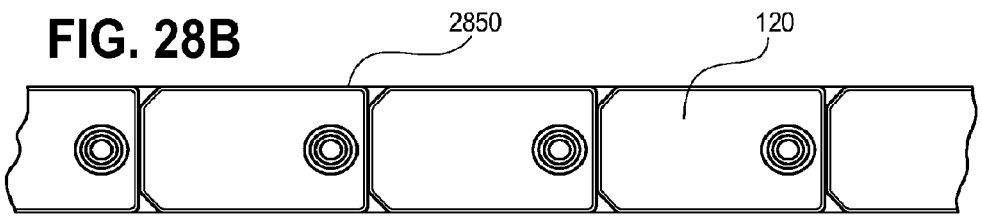
FIG. 28b is an illustration of liners in a bandoleer arrangement with a single row.

The assembly device 1200 may handle liners 120 and pouches of different types such as platen seal, fin seal, 3 sided, etc. As illustrated in FIGS. 28*a* and 28*b*, liners 120 may be incoming in bandoleer style where the pouches or liners 120 are connected one to the next as they were manufactured. There may be a perforation 2850 between them so that they are machine separable. The pouches 120 may be connected side to side or end to end and the preferred format is determined by a combination for best orientation for pouch production vs. desired orientation for the incoming bandoleer at integration. Also, vertical form fill and seal devices may be part of the assembly device 1200. The liners may be connected single file as in FIG. 28*b* or may have multiple rows of liners 120 as illustrated in FIG. 28*a*.

Liner Manipulation for Assembly

At block 230, once the liners 120 are separated, the liners 120 may be prepared to be placed in the container shell 100. In order to make it easier to place the liners 120 in the container shell 100*s*, the liners 120 may be manipulated in order to ensure a proper fit and that the liners 120 are not pinched when the container shell 100 parts are brought together. The manipulation could include folding, or evacuation of gas from inside the liner. In some embodiments, the manipulation could take place in a specific functional station, or in several functional stations that are part of the assembly device 1200. It could also include some pressurization or vacuum in combination with folding, possibly in cyclical operation or repeated operations. In one embodiment, the liners 120 are subjected to a vacuum. The vacuum may be provided in a variety of ways and may depend on the type of fitment 150 used.

Figure 29A:
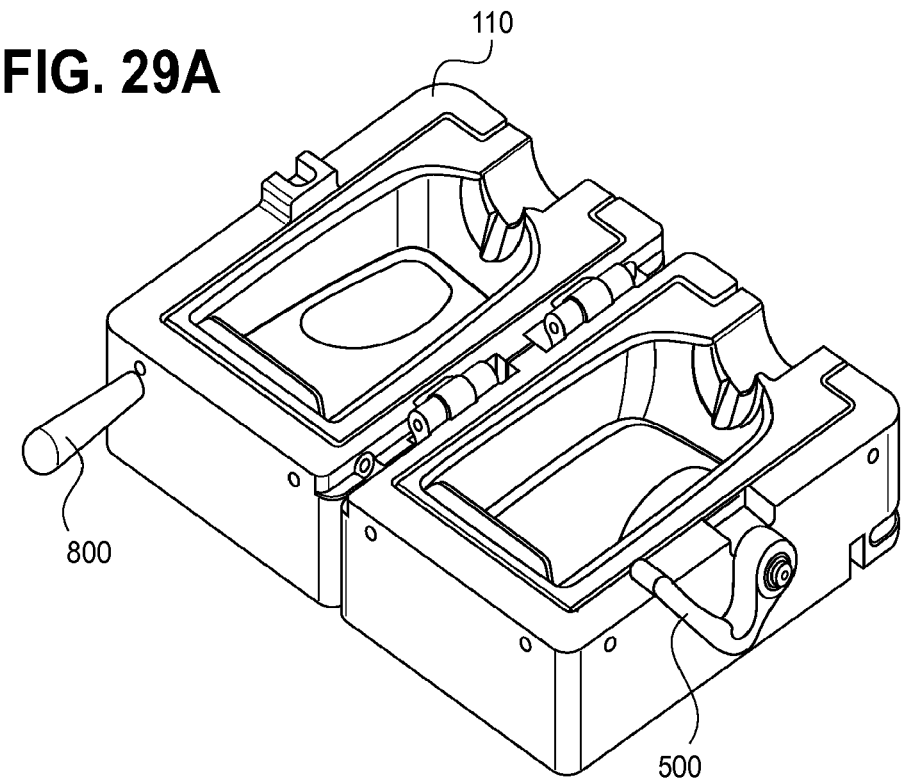
FIG. 29a is an illustration of an assembly unit with a first and second container shell part prepared to receive a pouch.
Figure 29B:
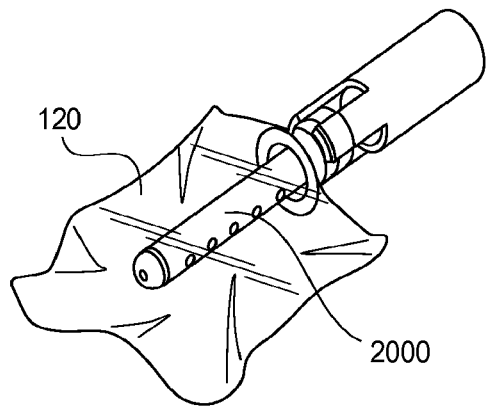
FIG. 29b is an illustration of a pouch on a wand prepared to be placed into a container shell.
Figure 30A:
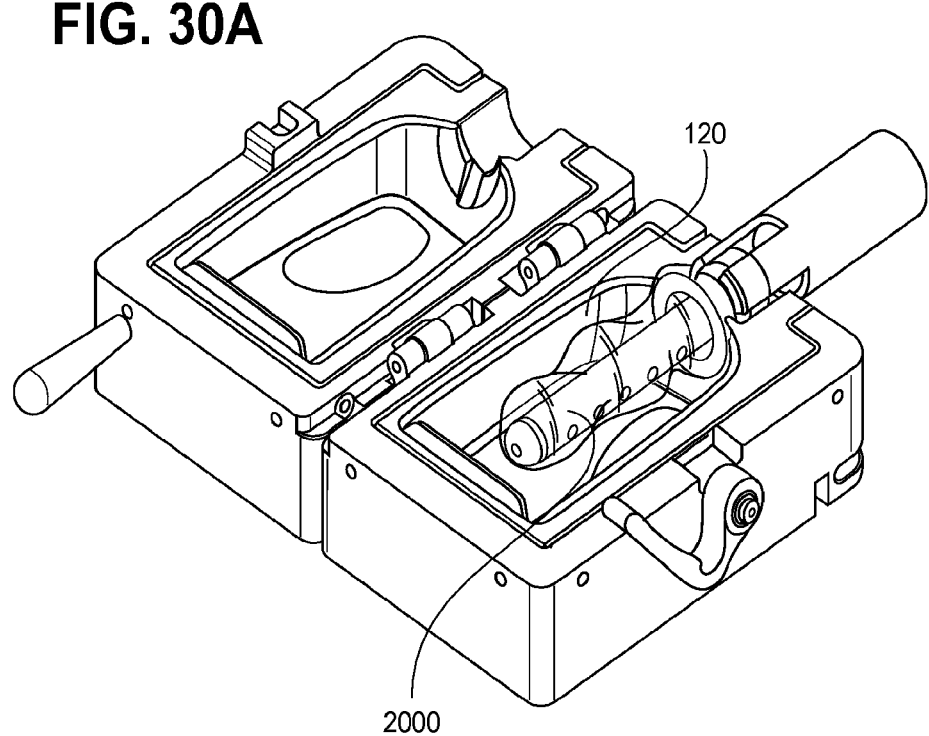
FIG. 30a is an illustration of a collapsed pouch being placed in a shell in an assembly unit.
Figure 30B:
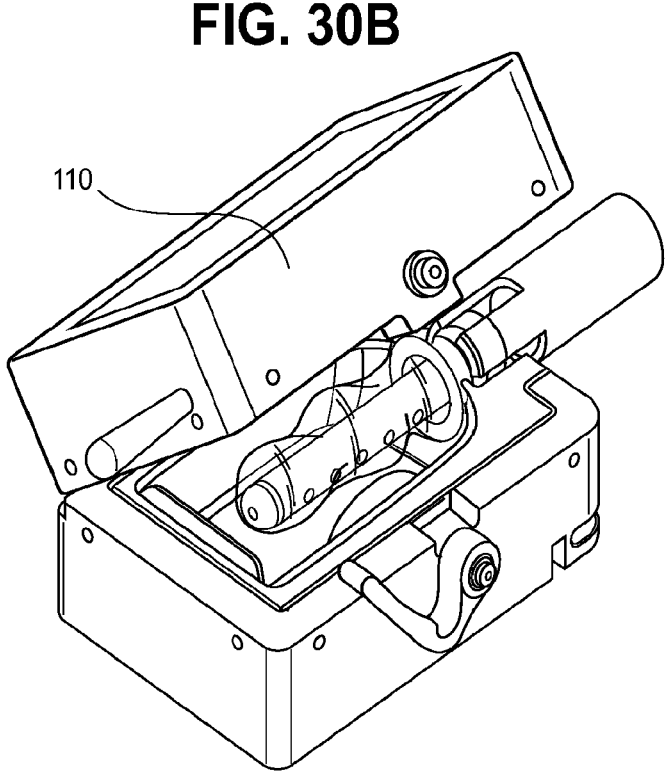
FIG. 30b is an illustration of a collapsed pouch inside a shell while the assembly unit is closed.
Figure 31:
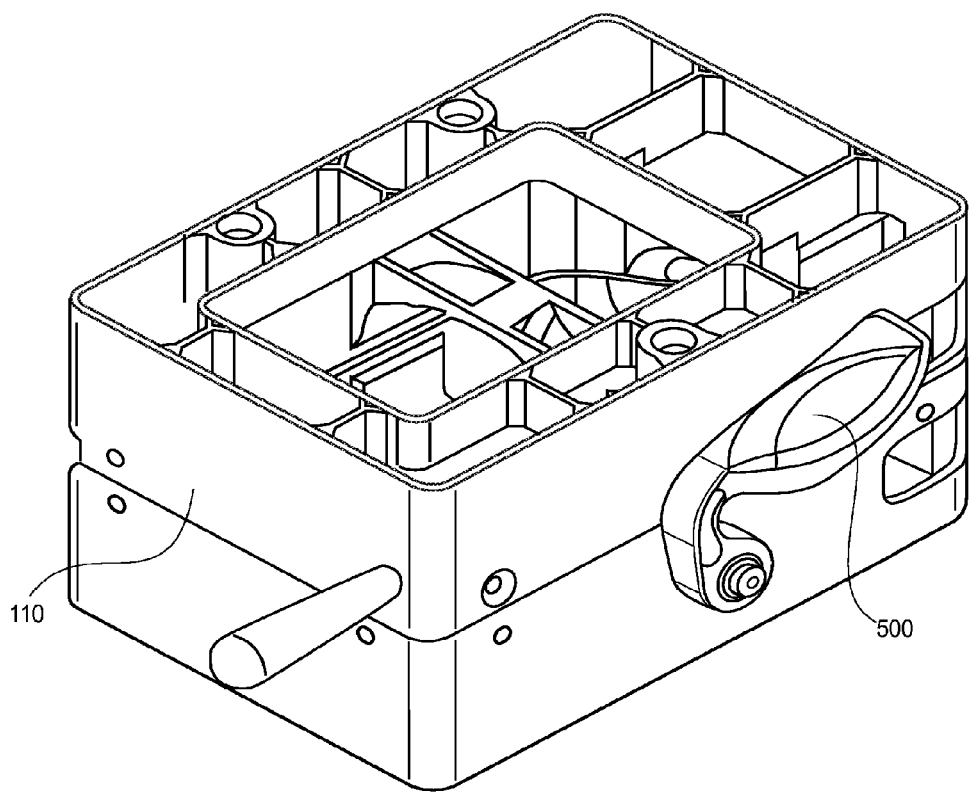
FIG. 31 is an illustration a closed assembly unit containing a pouch within the shell.
Figure 32:
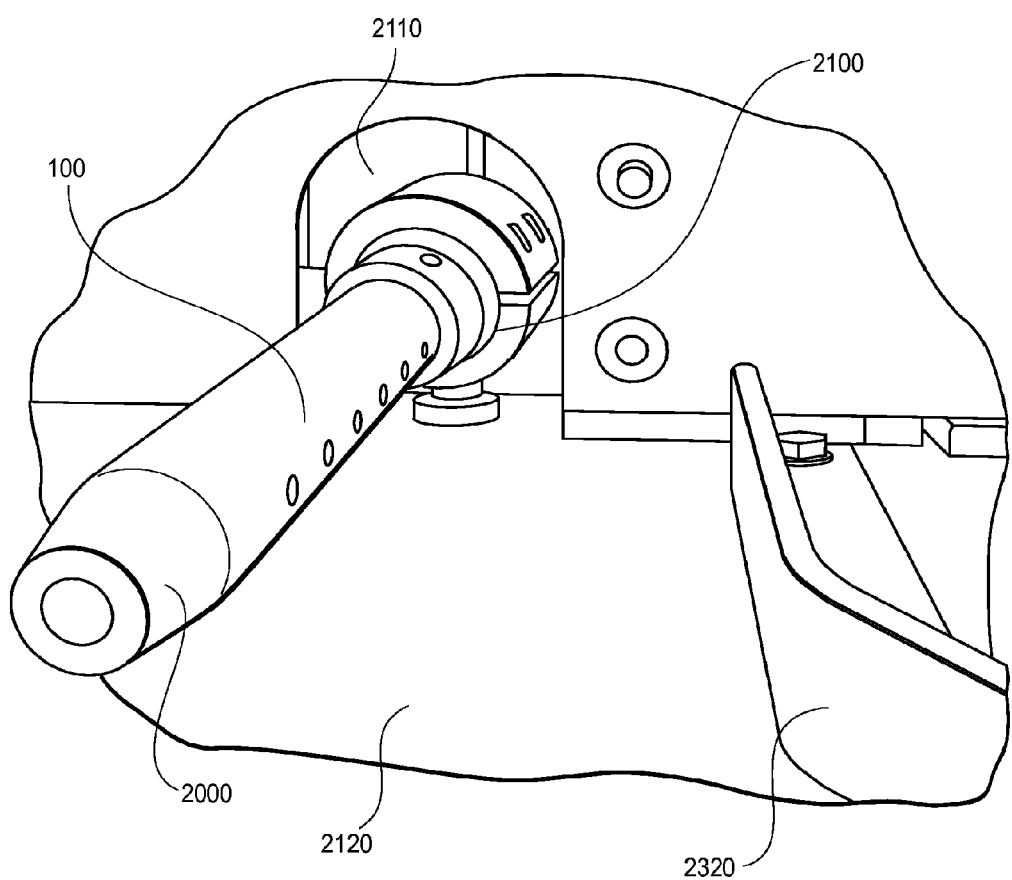
FIG. 32 is an illustration of a wand.
Figure 33:
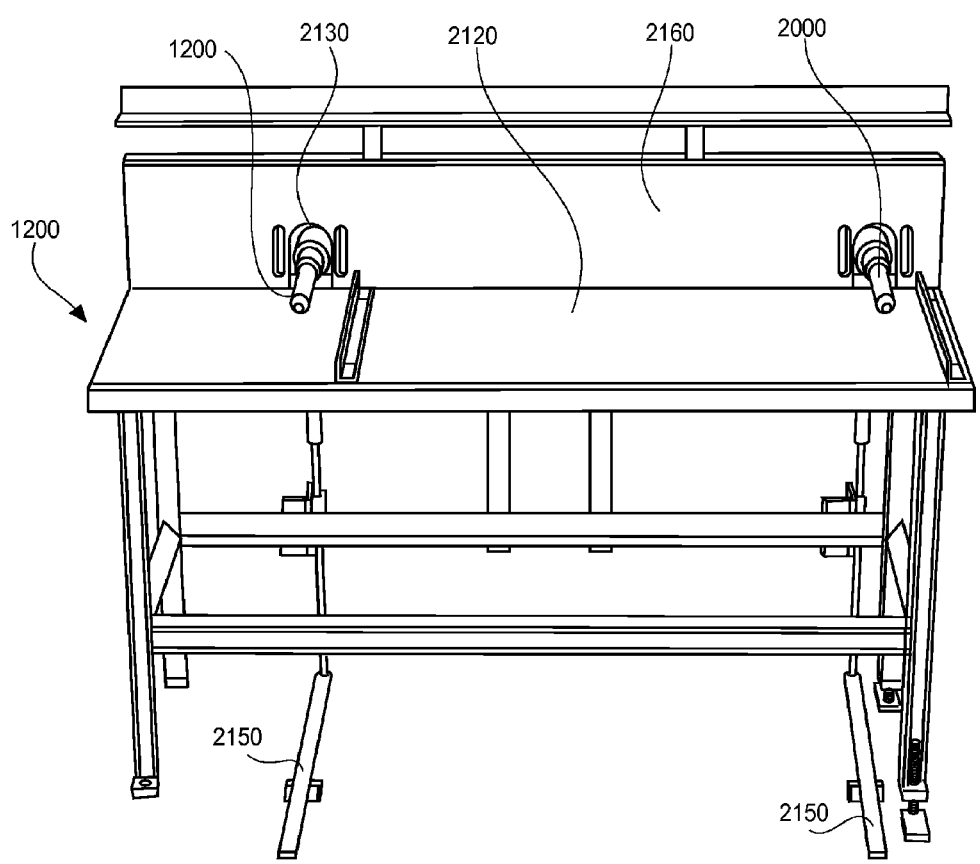
FIG. 33 is an illustration of an assembly table with a wand that moves from a first position to a second position.

In one embodiment, such as in FIG. 29-31, a wand 2000 may be inserted into the fitment 150 of the liner 120 and a vacuum may be applied. The wand 2000 may be tapered from a diameter less than the opening of the fitment 150 to a diameter that can fit tightly and create a satisfactory seal with the fitment. FIG. 32 may be an illustration of a sample wand. The wand 2000 may have openings through which the vacuum may be applied, thereby creating a vacuum. The wand 2000 may have an opening on one end and be closed on the other and the vacuum may be applied to the open end when the closed end is inserted into the fitment 150. The result of the vacuum is that the liners 120 may reduce in size, making them easier to insert to the container shell 100*s*.

In another embodiment, the vacuum may attach to the fitment 150. For example, if the fitment 150 uses a screw top, the vacuum may screw onto the fitment 150. To assist in manipulating the liner 120, a wand 2000 may be used to manipulate the liner 120.

Vacuum Wand

The fitment 150 of the liner assembly can be placed onto a wand 2000 configured to provide a secure connection and a robust seal to the fitment 150 and the liner 120. The wand 2000 can be configured to carry the fitment 150 and the liner 120 throughout the motions required for manipulation, vacuum, inflation, folding, location, etc. To enable the production of different types of packages with generally similar but specifically differing components, the wand 2000 may be arranged with one or more parts that may be changed to accommodate different fitment 150 styles or sizes, and container shells 100 of differing sizes and styles. As an example and not limitation, a portion of the wand 2000 assembly may extend into the liner 120 through an opening in the fitment 150, and this extending portion of the wand 2000 assembly may be changed to accommodate a differently-sized opening in another fitment 150 and liner 120 assembly. As another example the wands 2000 can be fitted with sleeves that function to adapt the wand 2000 to be a receiver for different styles of fitments. The function to provide a stop to the fitment/liner insertion process and also to provide axial registration and axial rotational resistance. In some embodiments, the wand 2000 assembly may have a partial retraction feature that is used on the vacuum cycle to help shorten the length of the collapsed pouch as it partially retracts.

The wand 2000 assembly may have a fixed position. The wand 2000 assembly may travel through a defined and particular path from one or more position to another position. The path may be vertical, horizontal, or a combination of directions. The assembly equipment 1200 may be configured such that any liner 120 manipulation cycles, such as vacuum, inflation, folding, squeezing, could be timed to start or stop at an extent of motion of the wand 2000 assembly, or at any point during the travel of the wand 2000 assembly.

Figure 34:
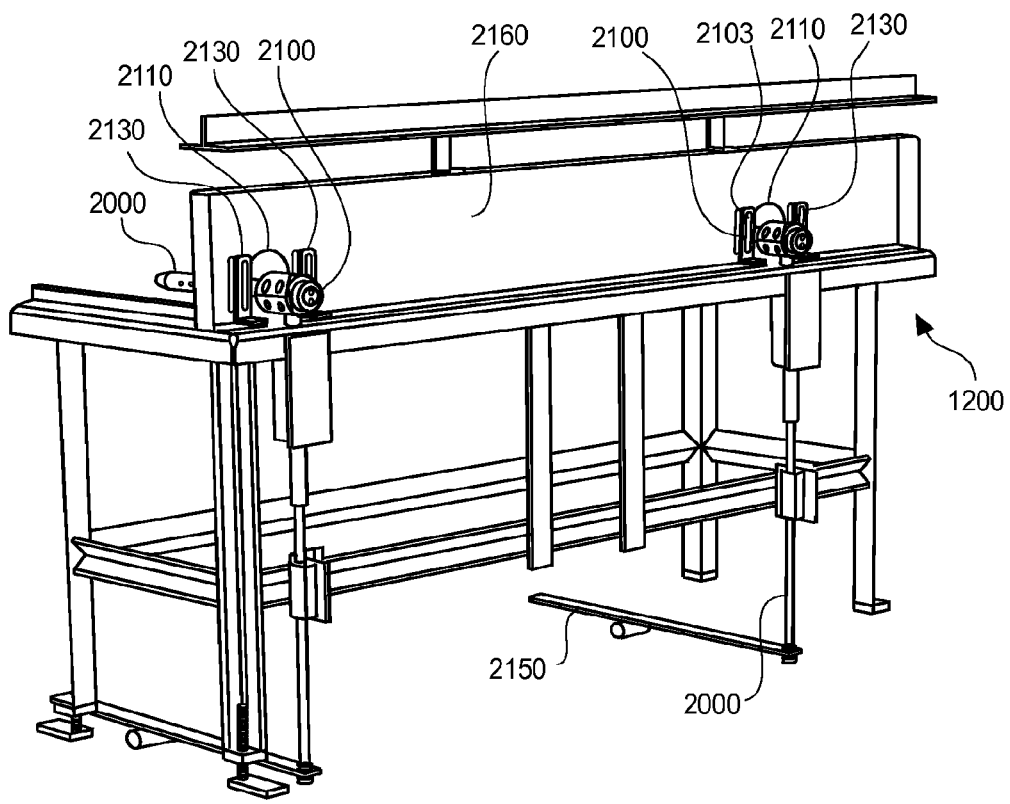
FIG. 34 is an illustration of an assembly table with a wand that moves from a first position to a second position.
Figure 35:
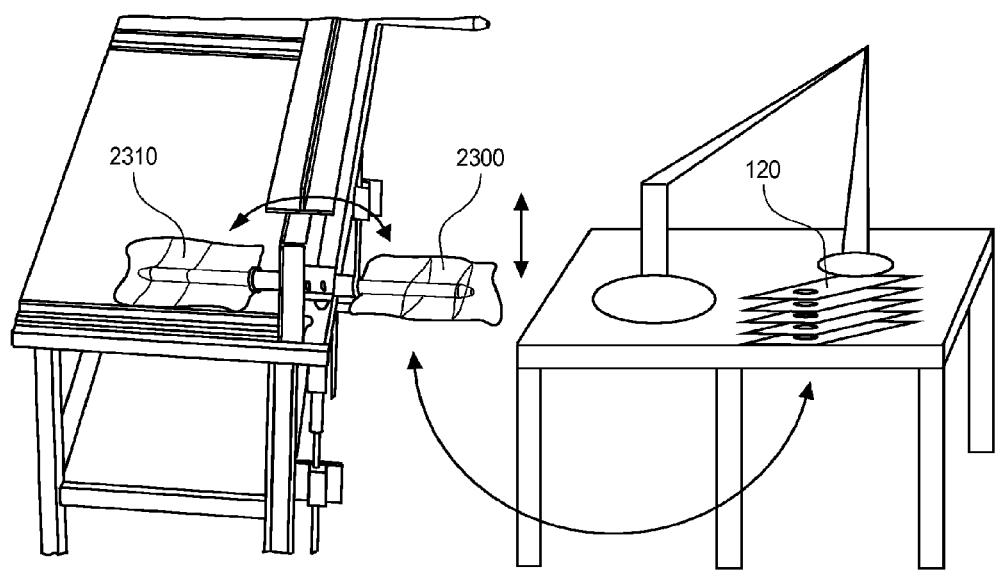
FIG. 35 is an illustration of an assembly device with multiple wands that rotate around an axis.

In some embodiments as illustrated in FIGS. 34 and 35, the wand 2000 may be moved from a first position 2100 to a second position 2110. The second position 2110 may be a position which makes liner attachment to the wand 2000 easier by reducing interference with the rest of the apparatus. In one embodiment, the wand 2000 is moved away from a working surface 2120, thereby reducing the interference with the working surface 2120. In one embodiment, the wand 2000 is raised upward away from the surface 2120 to an easier working height. Again, in some embodiments, the liner 120 may be placed on the wand 2000 by hand. By moving the wand 2000 away from the working surface 2120, the placement of the liner may be easier, faster, smoother, more economical and may be more reliable. With the wand in the second position 2110 the assembly device 1200 clears under the wand, the fitment and the liner as it is moved towards the backwall 2160 of station 2120. As the wand 2000 is lowered to the first position 2100 the fitment is registered into the assembly device 1200 and shell.

The wand 2000 may be moved in a variety of ways. In one embodiment, the wand 2000 may move in a channel 2130 and a user may move the wand 2000 from the first position 2100 to the second position 2110 manually. The channel 2130 may have indents 2140 that temporarily hold the wand 2000 in the first position.

In another embodiment, a foot lever 2150 may be mechanically connected to the wand 2000 and the foot lever 2150 may be used to mechanically move the wand 2000 from the first position 2100 to the second position 2110 and vice versa.

In yet another embodiment, the wand 2000 may be moved using electro-mechanical equipment. In one embodiment, a worker may press a button which may cause the wand 2000 to move to the second position 2110. The wand 2000 may be moved using a motor and gears, pulleys, chains or other electro-mechanical means. Hydraulic apparatus may also be used in addition or in place of electrical devices.

The first position 2100 and second position 2110 may be adjusted for a variety of factors. In some embodiments, the first position 2100 and second position 2110 may be based on the height of a user. The first position 2100 and second position 2110 may be adjusted by the user or vision technology may also be used to adjust the first position 2100 and second position 2110 to be optimal for different users, liner types, workspace height, etc. In some embodiments, there may be a variety of indentations 2140 or stops that may be used as set points for the position of the wand 2000.

In some additional embodiments such as illustrated in FIG. 35, the wand 2000 may rotate through one or more positions to enable additional users to place liners 120 onto wands 2000. In one embodiment as illustrated in FIG. 35, the wands 2000 may rotate around a vertical axis similar to a turntable. At a first station 2200, a user may place a liner 120 on the wand 2000 and at a second station 2210, the liner 120 may be placed into the container shell 100. Of course, there may be additional wands 2000 and addition stations 2200 2210. For example as illustrated in FIG. 35, the wands 2000 may rotate around a vertical axis and the wands 2000 may pivot or tilt from a loading side 2300 to a placement side 2310, allowing a plurality of wands 2000 to be used and loaded. In addition, the wands 2000 may tilt, allowing gravity to hold the liners 120 in place and not allow the liners 120 to slip off. The pivot of the wands 2000 may be accomplished manually, may be mechanically implemented or may be implemented using electro-mechanical devices.

In one embodiment, the liner 120 may be place on the wand 2000. The liner 120 placement may be manual, such as by a user, or may be placed by an electro-mechanical device, or by an pneumatic-mechanical device. The placement may be assisted by an electro-mechanical device that uses vision to assist in the liner 120 placement. In yet another embodiment, the electro-mechanical device may use mechanical movement that is assisted by sensors that ensure that a wand 2000 is empty, is in the proper place and is prepared to receive a liner 120. Of course, other manners and devices or combinations thereof are possible and are contemplated.

The vacuum wand 2000 may be used to evacuate the contents of the liner 120. The wand 2000 may have one of more holes through which a vacuum may be applied to the liner. The vacuum may occur in a pulsed manner (for instance, for example and not limitation, a pulse of 100 ms followed by a break of 200 ms, repeated for a period of 2 s) or some other advantageous pattern. In another embodiment, the vacuum may have a pressure sensor that senses when a liner 120 has been emptied to a point at which the pressure inside the liner 120 is above a threshold, indicating that the liner 120 has been sufficiently deflated. In yet another embodiment, the vacuum may be operated by a user and the user may use visual clues to determine when the liner 120 has been sufficiently deflated. In other embodiment, the vacuum may operate for a predetermined amount of time that has previously been determined to be sufficient to sufficiently deflate a specific type of liner 120. The assembly unit 110 may have features that are sensed by the integration station (In one embodiment there are sensors or eyes in the backwall 2160). As an example and not limitation, the assembly unit 110 can be sensed once it is placed against the back wall, thereby triggering the dropping of wand 2000 from position 2110 to 2100 and also to initiate the vacuum sequence. As the assembly unit 110 swings to the closed position, the pressure sequence can be initiated. In yet a further embodiment, sensors may determine the size of the liner 120 has decreased sufficiently to stop the vacuum. Of course, other methods are possible and are contemplated.

At block 233, the reduced liner 120 may be placed in communication with the container shell 100. The manner of placement may depend on the manner in which the liner 120 is being held, the number of wands 2000, the manner the wands 2000 move, etc. For example, if the liner is on a wand 2000 such as in the embodiment illustrated in FIGS. 33 and 34, the wand 2000 and liner 120 may be moved from the seconding position 2210 (away from the working table 2120) to the first position 2100 (toward the working table 2120). The first position 2100 may place the place the liner 120 into the container shell 100.

Figure 38:
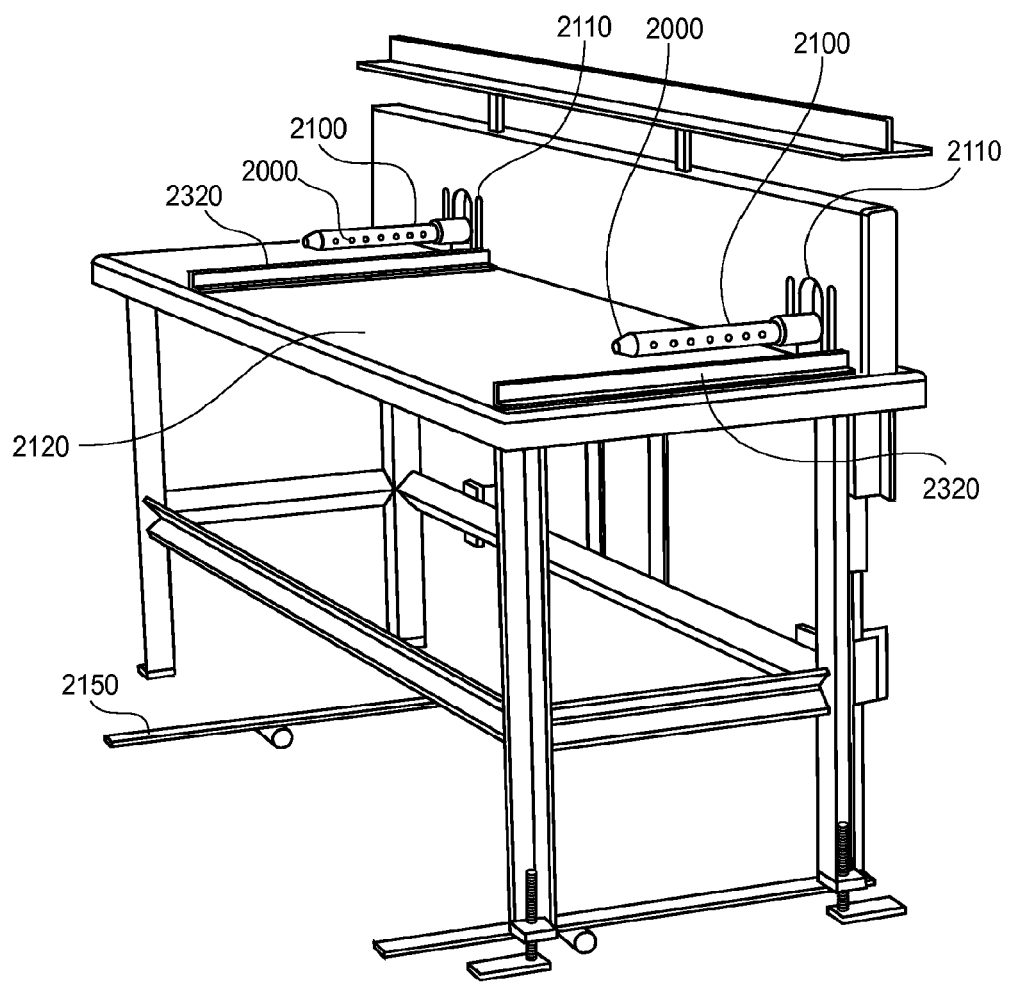
FIG. 38 is an illustration of an assembly device where the wand moves from a first position to a second position.

In some embodiments, an alignment device 2320 such as illustrated in FIGS. 37 and 38 may be used to place the container shell 100 in the proper place to accept the liner 120. In some embodiments, the container shell may be held in an assembly unit 110 and the assembly unit 110 may be used against the alignment device 2320 to ensure that the liner 2120 is properly paced in the container shell 100.

Figure 36:
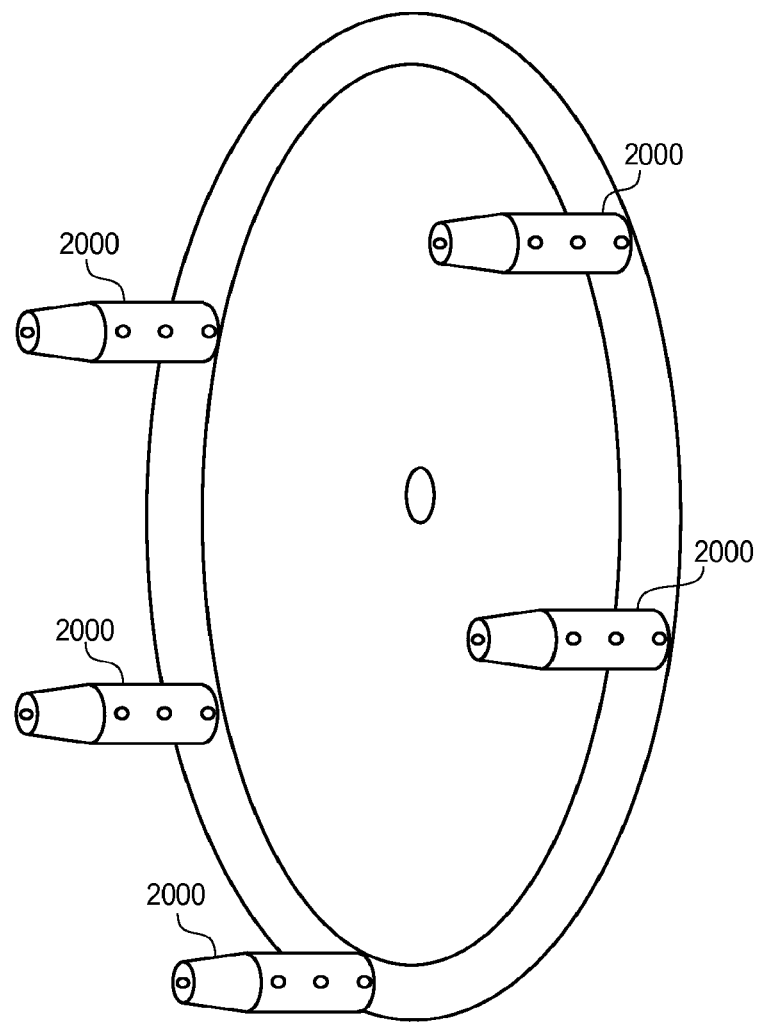
FIG. 36 is an illustration of an assembly device with multiple wands.

In more complex assembly device 1200 such as the multiple wand 2000 example of FIG. 36, the wands 2000 (and liner 120) may pivot from a loading side into a placing side. In another example, the container shells 100 may be mechanically brought to the wand 2000 (and liner 120) rather than bringing the liner 120 to the shell containers 100. Of course, the variations and manners of bring the liner 120 and shell containers 100 together are virtually unlimited by the imagination of the user.

In some embodiments, vision technology may be used to assist in guiding the liner 2120 into the container shell 100. For example, an image of the liner 120 approaching the container shell 100 may be communicated to a computing device where the image may be analyzed. If the liner 120 is off to one side in the image, the liner 120 may be adjusted in the proper direction. The movement if the liner 120 may be controlled by a robot and the movement may be controlled by a PID type controller.

In yet another embodiment, force sensors may be used to ensure that the liner 120 is sufficiently placed in the container shell 100. In yet another embodiment, guide pins are used to ensure that the liner 120 is properly guided into the container shell 100. In some embodiments, target marks are used and vision technology is used to ensure that the holding devices place the liner in a way such that the liner matched up with the target marks. Finally, in some embodiments, a user may assist in guiding the liner 120 into the container shell 100.

Fitment 150 Locking Functions—Locking Collar/Ultrasonic

Some composite containers 90 may require the inclusion of a component that performs the function of locking the fitment 150 in place relative to the container shells 100. In some embodiments, the locking function may be performed by an annular collar 3600 part such as FIG. 39. The collar 3600 may be circular, rectangular, triangular, or any other suitable shape. As an example and not limitation, the collar 3600 may be made from polymer, paper, rubber, fiber, etc.

The collar 3600 may be installed to the assembly by translation along an axis of the fitment 150 opening until an interference fit is achieved with a receiving feature of the fitment 150. The container shell 100 may be captured and fixed in place between the fitment 150 and an extended part of the collar 3600 to form a secure and rigid connection. In one embodiment, the collar 3600 can be snap fit directly to the fitment because of an undercut relative to the container opening axis, its axis of installation. This causes the collar 3600 to snap over the annular flange of the fitment 150 and lock into place. It is the extended part of the collar 3600 that is below the snap engagement that then limits the shell's 100 ability to move away from the fitment. Drops from either rough handling or from routine handling during the supply chain can result in forces that act to separate the shells 100 from each other. When the shells 100 separate, the engagement of the fitment to the container 90 is reduced resulting is reduced resistance to the rotational forces of capping and uncapping and to the ability of the shells 100 to keep the liner 120 contained within. With the shell 100 fixed in place to the fitment the container is more durable and resistant to damage. The part of the container shell 100 that is captured may be an extent or edge of the container shell 100, or may be a perimeter region of a hole created in the container shell 100 to receive the fitment 150 and the locking collar 3600.

The equipment may be configured to collate, scramble, sort, align, position, and install the collars 3600 onto the fitment 150 of the assembled container at a functional station. The collar 3600 may be installed after a shell-trimming operation, or before a shell-trimming operation. The locking function could be performed by an applied shrink sleeve. The functional station could be configured to present and install a pre-configured sleeve of appropriate material and dimension, and when heat is applied to the sleeve, the material contracts a pre-defined amount, conforming to the region of the shell and providing tensile resistance to movement or separation of the shell parts. The shrink sleeve may be configured to act as a locking element to only a portion of the assembled shell, or be configured to act as a fully-encompassing label wrap. The sleeve may be printed with graphics or other communication.

At block 236, the fitment 150 may be registered in the container shell 100 to keep it in place. In some embodiments of the composite container shell 100, the specific combination of container shell 100 design and fitment 150 design may employ other types of locking features. As an example and not limitation, a joint may be created between the polymer fitment 150 and the molded-pulp container shell 100. Integral features on the polymer fitment 150 could be situated and configured to create a secure bonded joint with the container shell 100. The features could resemble ribs, points, rods, cones, protrusions, pins, depressions. In some embodiments, deformation of the features could facilitate a mechanical connection between the fitment 150 and the container shell 100. The deformation could be caused by heat generated from proper and specific application of ultrasonic sound energy, such as in ultrasonic welding technology. In other embodiments, the heat could be generated by a heating element. Other methods for delivery of heat energy to the joining features are possible and are contemplated.

Figure 43A:
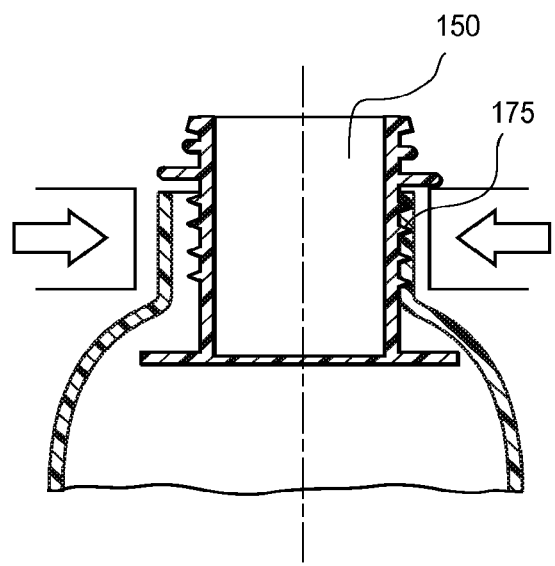
FIGS. 43a and 43b are illustrations of a fitment with raised portions to assist in connecting the fitment to the shell.
Figure 43B:
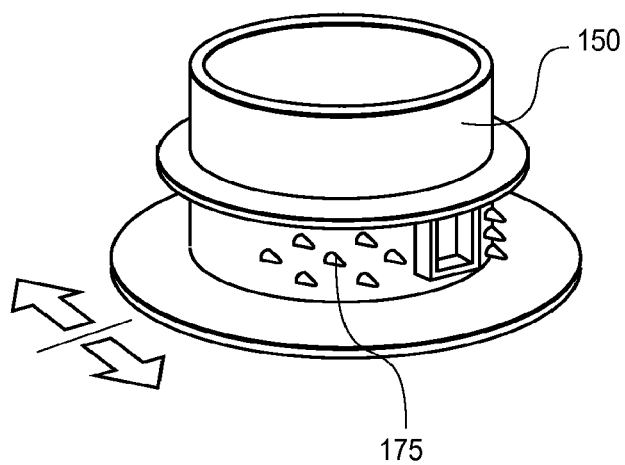

The feature could be arranged so that deformation by mechanical means is enabled. As illustrated in FIG. 43, protrusions 175 of the fitment 150 could extend up to, partially into, or through the container's shell 100 wall. In some embodiments, some or all of the protrusions 175 could be mechanically manipulated to create a locking connection to the shell 100. A functional station could be configured with mechanical means to cause this deformation and subsequent locking behavior. The locking connection between the shell and the fitment 150 could be sufficient such that no locking collar 3600 or other described component is required. In yet another embodiment this direct bond between the shell and the fitment can be augmented with additional mechanical features, previously outlined, such as locking collar 3600, a heat shrink band, or wire wrap.

At block 239, the fitment 150 may be also aligned and mated to the pulp shell 125 135. The fitment 150 may have a device to ensure that the fitment 150 attached to the liner may not turn when the mechanical capper applies the cap in the commercial filling process or when a user attempts to unscrew a cap or top on the container 90. In one embodiment, the shell 100 may contain an alignment protuberance 700 such as in FIGS. 39, 40 and 41. The fitment 150 may have vertical members that fit around the alignment protuberance 700. In addition, in some embodiments, the fitment 150 may also have a horizontal member that fits around the protuberance 700 and keeps the liner 110 and fitment 150 from unintentionally being pulled out of the shell 100. As mentioned previously, an another embodiment illustrated in FIG. 43, the fitment may have small protrusions 175 that provide additional surface area and biting power to attach the fitment to the shell.

It should be noted that in some embodiments, the liner 120 may be placed inside the container shell 100 before the connection facilitator is applied to the container shells 100. Care may need to be taken to ensure that the liner 120 is not damaged when the connection facilitator is applied. In yet another embodiment, the connection facilitator is applied at virtually the same time as the liner 120 is placed in the shell. Of course, additional manners of placing the liner 120 in the container shell 100 and applying the connection facilitator are possible and are contemplated.

At block 242, the assembly unit 110 may be closed in a controlled and aligned way around the fitment 150 and the liner where the first surface 122 of the first part 125 and the second surface 130 of the second part 135 are connected. Upon closing of the assembly unit 110, the pulp parts 125 135 are brought together with specific mating features of the hingedly opposed segments brought together. In other embodiments the shells 100 to be attached together are not hingedly attached and it is individual shells 100 that are brought together in a controlled fashion as in FIGS. 24 and 25. As examples and not a limitations the second shell 100 could be brought down to the first from above, or second and third shells could be brought together with the first from either side. This controlled engagement allows the assembled container 90 to benefit from inter-connection between matching flanges, of tongue into groove channels, of tabs into slots, or male protrusion into female recess. The assembly unit 110 facilitates making these connections. In some embodiments, mechanical connections are sufficient, and in other instances, the combination of adhesive and mechanical connections offers the most strength and structural performance As a result, the fitment 150 may be captured and located in place by specific features in the shell parts 125 135, and is possible because the materials of the fixture are more rigid than the material of the pulp molded shell or liner. It is known that there is a range of materials typically used for manufacturing fixtures and equipment. Such materials are possible and are contemplated. Upon closing of the assembly unit 110, the pulp parts 125 135 are brought together with specific mating features of the hingedly opposed segments brought together. This controlled engagement allows the assembled container 90 to benefit from inter-connection between matching flanges 125 135, of tongue into groove channels, of tabs into slots, or male protrusion into female recess. The assembly unit 110 facilitates making these connections. In some embodiments, mechanical connections are sufficient, and in other instances the combination of adhesive and mechanical connections offers the most strength and structural performance.

In a configuration of the assembly equipment 1200 in which an assembly unit 110 holds the components for assembly, the assembly unit 110 may be a separate part of the equipment than the machine components 1200 that secure the liner 150 during the pre-assembly manipulation, could move independently from the liner-securing assembly. The assembly machine 1200 components that secure the liner 150 during the pre-assembly manipulation could be configured to, in one position, hold the liner 120 and fitment 150 in a correct position for assembly, and in another position, hold the liner 120 and fitment 150 in a correct position for location of the assembly unit 110 for receipt of the liner and fitment 150 assembly. The equipment may be configured to provide environmental control of the functional station such that the liner 120 is kept at an optimal temperature (and therefore degree of ductility) for manipulation, assembly, inflation, deployment, etc. The liner 120 may be filled prior to assembly to the container shells 100. The manipulation performed upon the filled liner 120 assembly could differ or be similar to the manipulations required for integration of an empty liner 120.

A composite container 90 that includes an exterior pulp molded shell 110 and an inner polymer liner 120 may exhibit a certain efficiency of actual internal capacity as a function of total enclosed volume. In some cases, this efficiency may be lower than another desired efficiency level. It could be advantageous to improve the efficiency of a composite container 90 to create a more competitive container 90. A characteristic of a polymer liner 120 produced in an industry-standard method such as vertical form seal or platen sealing is that it may not possess a shape that allows the liner to perfectly comply with the inner surface of the enclosing container shell 100 upon inflation. This characteristic may vary with attributes of the liner 120 material, such as thickness, material, structure, method of manufacture, shape, style, orientation, assembly position, etc. An improvement to the efficiency could result from an improvement of the compliance to the interior surface of the shell 100. A functional station may be configured with a means to improve this compliance. In one instance, heated air can be helpful to soften the film material and allow the liner to more fully expand and conform to the internal shape of the container. Temperatures of air above room temperature such as between 50 and 70 C, or 45 C to 90 C, will improve the flexibility of the film but not to be higher than the melt temperature of the film being used. The application of this air can be timed and sequenced for best result.

At block 245, an expanding agent may be introduced into the liner through the exit device 1800. The liner 120 may be expanded until the liner 120 is coincident with the inside surfaces of the closed container shell 100s. In one embodiment, the liner 120 is filled with native air. In another embodiment, the liner 120 is filled with pure oxygen. The introduction of the expanding agent may occur in a pulsed manner (for instance, for example and not limitation, a pulse of 100 ms followed by a break of 200 ms, repeated for a period of 2 s) or some other advantageous pattern. After assembly of the container 90 and prior to filling, it may be desirable to have the liner 120 expanded so that it does not act to obstruct the filling process, or to prevent the desired volume of material to be placed in the container 90 during the filling process. The assembly unit 110 may also function to assist with the application of pressurized gas into the container 90. The assembly unit 110 may be the interface between the fitment 150 and the air supply.

In another embodiment, as a way to further facilitate the expansion of the liner, the assembly unit 110 when closed can be an air sealed chamber volume external to the container shell. As the inner liner is expanded, vacuum external to the shells 100 can be applied. This vacuum could transmit through the molded shell 100 to assist in more efficiently seating the liner 120 on the inside (but the level of air migration through the shell 100 will be governed by shell porosity). In a modified embodiment, each cavity of the assembly unit 110 could function as a sealed chamber to its corresponding shell and the connections between the assembly unit's 110 sealed chambers may be made airtight and vacuum can be drawn from each chamber. Additionally, the shells 100 could have perforations at strategic locations to allow for the vacuum to communicate with the internal areas of the shell more strongly and with most effect on assisting the fullest expansion of the liner 120. The container 90, including the container shell 100 and liner 120, may be further inspected to ensure the container 90 meets the desired standards. For example, when the liner 120 is expanded, it may extend beyond the container shell 100 which may be unacceptable and the container may be rejected. The inspection may occur in a variety of ways.

There may be a dedicated station on the assembly line that has equipment for inspection. The equipment may include a scale which may weigh the container 90 to ensure that the weight is within the desired range. The equipment may also have vision device that may be connected to a processor. The images from the vision device may be communicated to a processor where the image is analyzed. In one embodiment, the size of the container 90 is determined and compared to an acceptable range. For example, if the liner 120 is sticking outside the container shell, the size of the container 90 may appear to be too large and the container may be rejected. Of course, there are many methods and devices for analyzing images and determining whether a product is within desired specifications and these methods and devices are contemplated. The area at the neck of the assembled container 90 may be inspected to ensure that the connectivity in that region occurred within acceptable parameters. As example and not a limitation, the inspection could include inspection of gluing of the shell flanges, registration between the fitment 150 and the shell 100, proper application of the locking collar 3600, the connection of the fitment 150 to the shells 100 by any of the means described herein.

The expanded liner 120 may provide strength to the container 90. For example, the liner 120, when expanded, may fill in weak spots on the container shell 100 and the liner 120 may then provide additional strength. In some embodiments, the liner 120 may be of additional thickness and the liner 120 may have strength alone and this strength may add to the strength of the container shell 100 and the resulting container 90.

In yet another embodiment, the liner 120 may be thermoformed. As an example and not limitation, heated pressurized gas could be applied to the liner 120 (similar to blow molding), inducing the liner 120 to soften and comply more precisely with the interior surface of the container shell 100. Further, in embodiments where the liner 120 is thermoformed, the liner 120 may take a permanent form that matches the inside of the shell 100 and the thermoformed liner 120 may have strength alone which may add to the strength of the container 90.

In another embodiment, the liner 120 may be pressure formed. Some liners 120 may be smaller than the space available inside the container shell 100. The Container shells would function as the form or tool for this molding process. Pressure may be used to stretch these liners 120 to fill the space inside the container shell 100. Some liners 120 may become more rigid when stretched and this rigidity may add strength to the container shell 100 and the container 90 when the liner 120 is stretch under pressure to fill the space inside the container shell 100.

In some embodiments, the wand 2000 may still be inserted to the fitment 150 of the liner 120. The wand 2000 may be used to add pressure to the liner 120 to ensure the liner 120 is prepared for the addition of contents without any binding. Once the liner 120 has been sufficiently expanded, the wand 2000 may be removed from the complete containers. In addition, in some embodiments, the wand 2000 itself may be used to provide the contents to the liner 120 in the container shell 100.

Figure 44A:
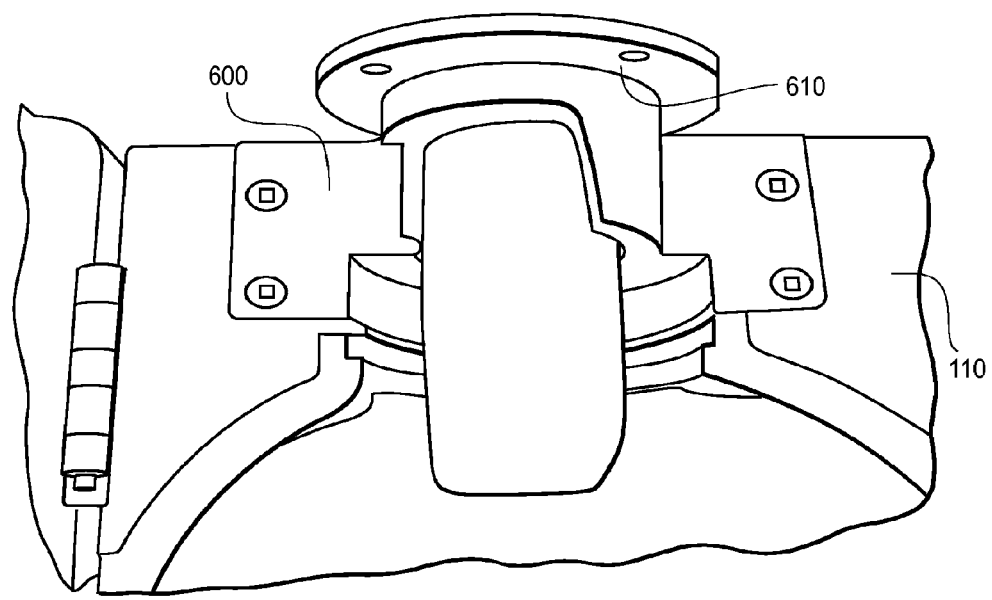
FIG. 44a is an illustration of a retention feature and an air valve in the assembly unit.
Figure 44B:
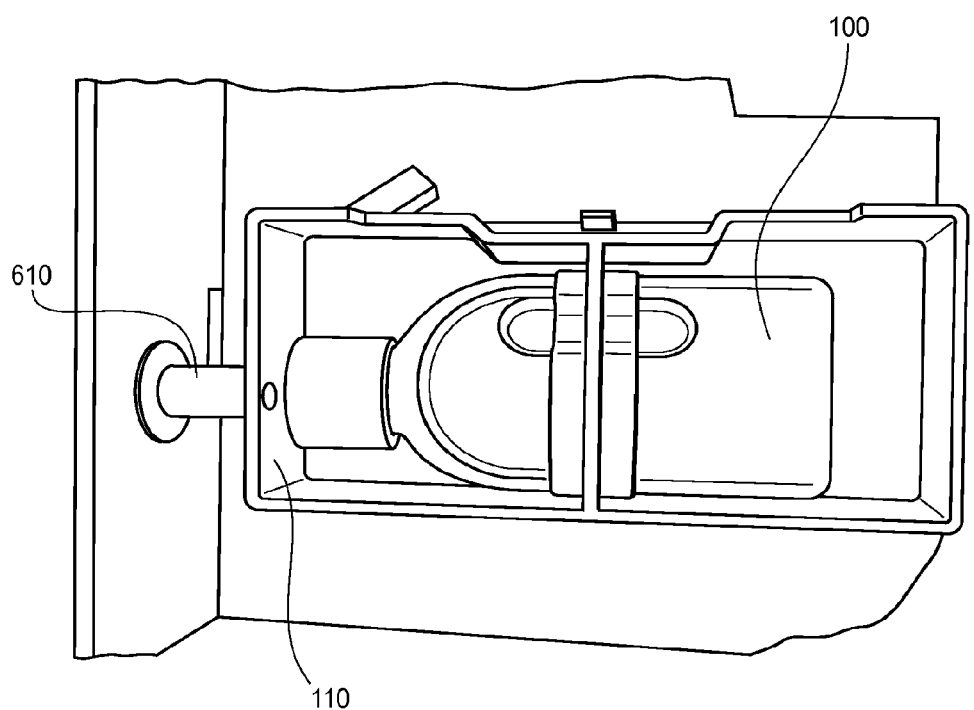
FIG. 44b is an illustration of the assembly unit, the air valve and the container.

In embodiments where the wand 2000 is not present in the liner, a fitment retention feature 600 (FIG. 44*a*) may have an opening connecting the outside of the device to the fitment 150 and the liner 120 inside of the container 90. It may then be possible for an operator to push the assembly unit 110 against an air valve 610 to expand the liner 120 inside the container shell 100 as illustrated in FIG. 44*b*. The air valve 610 can be activated during contact between the assembly unit 110 and the valve 610. Similarly contact could activate a timed or measured volume of air into the container 90, and the air could be introduced into the liner without requiring the fixture to contact a valve 610, but the air actuation could occur in some other manner (such as operator actuating a valve, automatic (computer-controlled) air burst, etc.). With the open assembly unit 120 located against the back wall 2610 of unit 1200, the closing action of the assembly unit 110 sweeps by sensors in the assembly device 1200 that register the position of the assembly unit 110, (open/closing/closed) where this is used to control the sequence of the wand and its vacuum and pressure capabilities, sequencing and pulsing. The assembly unit 110 may contact the shell 100 to support the shell 100 during the pressurized expansion process. The assembly unit 110 supports the glue joints and other faces of the container shell 100 to mitigate mechanical damage to the parts of the shell 125 135 or the glued areas 120 130.

The retention feature 600 may be removable and specific to the container shell 100 being manufactured. For example and not limitation, the container 90 may be for liquid laundry soap and the container 90 may contain a spout for pouring, including a drain hole to keep the spout clean. The retention feature 600 may be designed to accommodate the spout. The next run of containers 90 may be for milk and the milk may have a traditional screw top.

Figure 40:
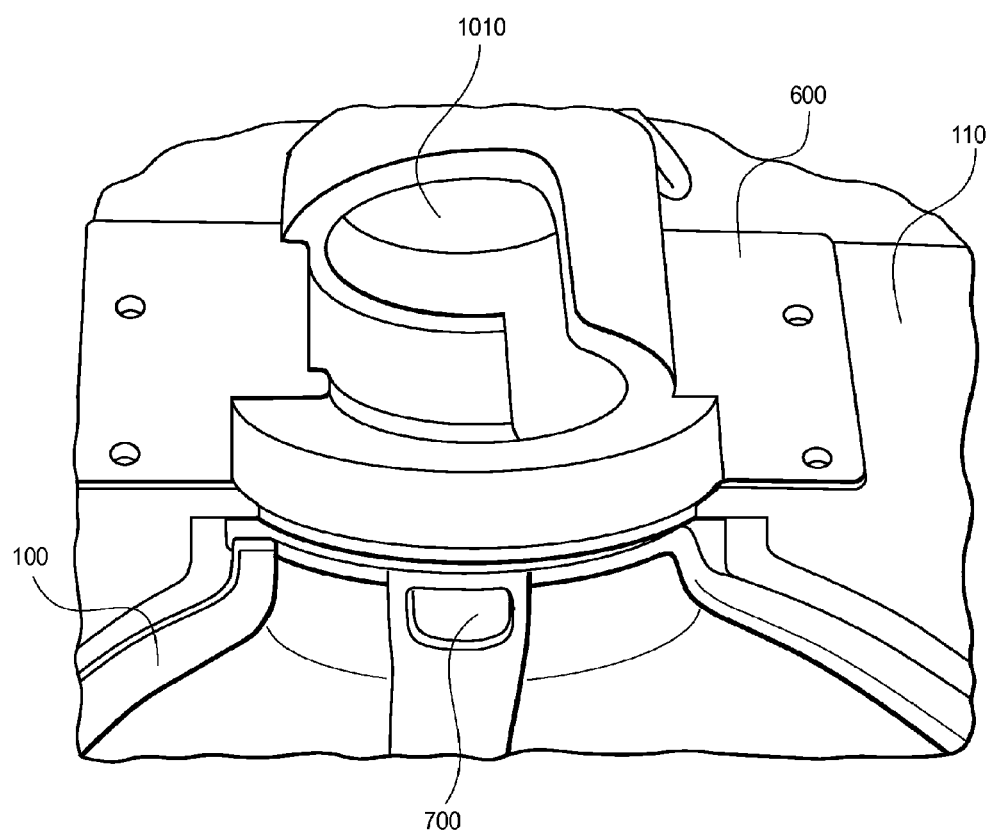
FIG. 40 is an illustration of the retention feature and the alignment protuberance in an open position.
Figure 41:
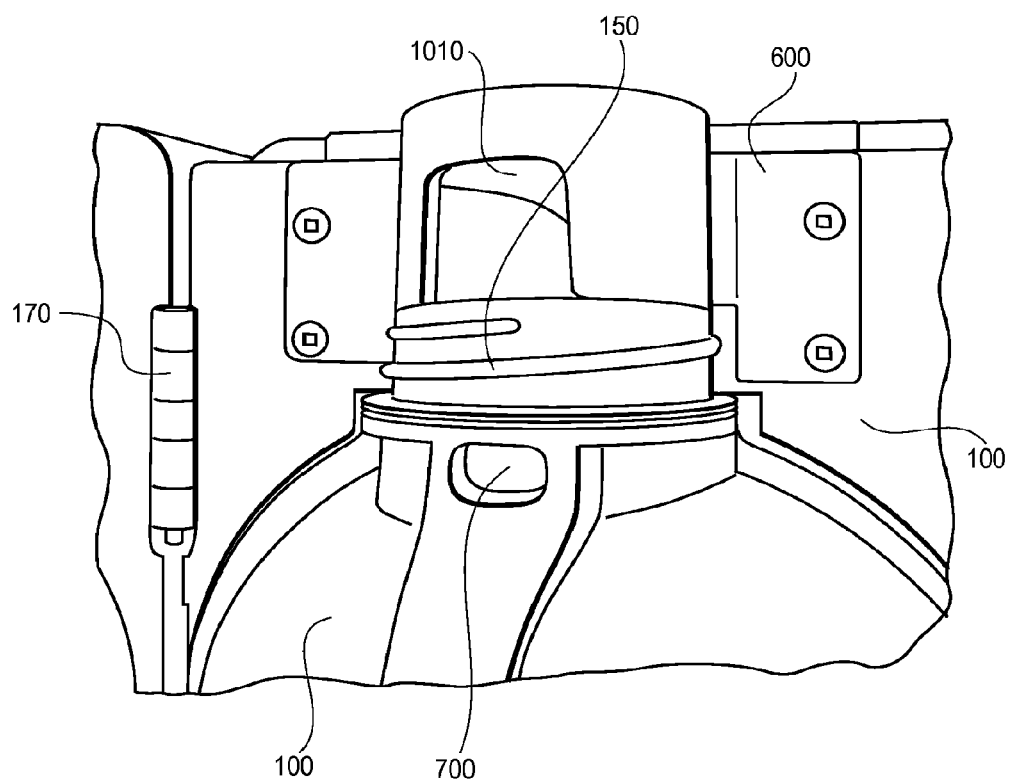
FIG. 41 is an illustration of an open assembly unit with the retention feature holding the fitment in place using the alignment protuberance.
Figure 42:
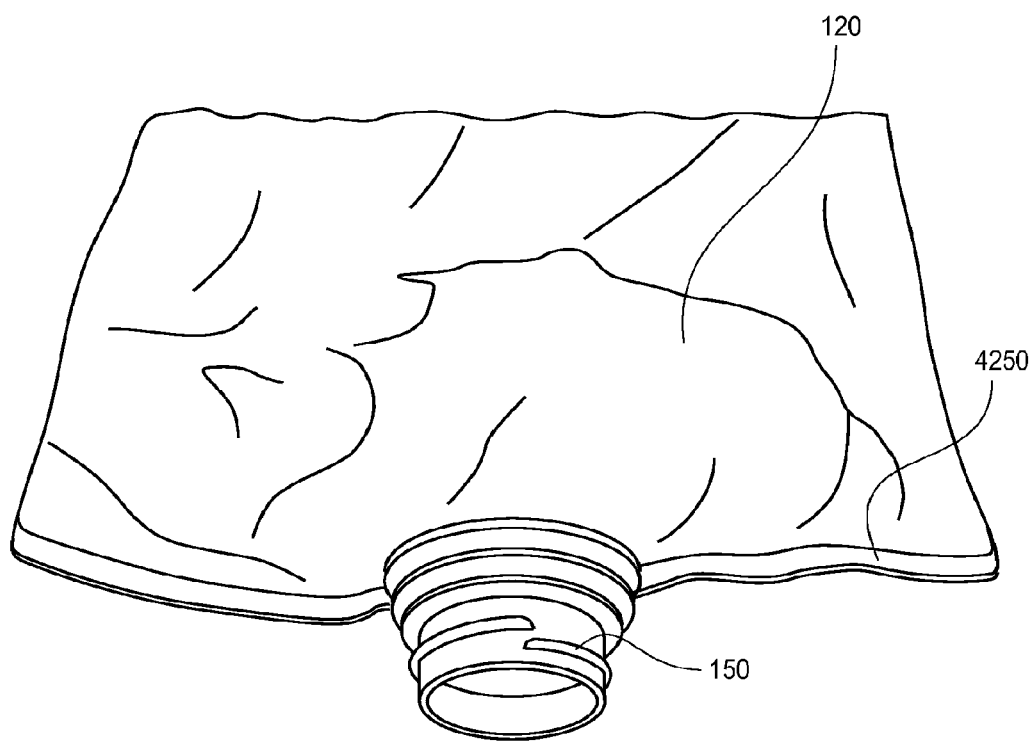
FIG. 42 is an illustration of a liner with an edge mounted fitment.

Referring briefly to FIGS. 40 and 41, the retention device 600 may have a cut out 1010 that allows the spout to fit into the retention device 600 without interference. The retention feature 600 may be easily removed and a new retention feature 600 specific to other fitments may be installed in the assembly unit 110. In another embodiment as illustrated in FIGS. 13-17, retention feature 500 is shaped for a specific fitment and also a specific to the shape of the container that goes with that fitment. This larger replaceable part allows the assembly device 110 to be quickly reconfigured for the assembly of different container including the fitments and profile changes. Other filled materials and fitment 150 details are possible and are contemplated. Face-mounted fitments are described in U.S. Pat. Nos. 6,237,308, 5,288, 531,4,709,528, 7,076,935, 6,874,299, 6,826,892, 6,794,053, 6,237,308, 5,363,966, and U.S. Patent Application No. 20060111224, which are incorporated herein by reference in their entirety. As illustrated in FIG. 42, in another embodiment, the fitments 150 may be mounted to an edge 4250 of the liner 120 and these liners 120 may also be accommodated.

As mentioned previously, there could also be force controlling features 500 (FIG. 15) to lock the assembly unit 110 closed for the period of time required for glue curing. There could also be a force controlling feature 500 to ensure a specific pressure is applied to the glue surfaces. The force controlling features 500 can include a latch system to provide pressure upon the flanges 120 130 during a period of time required to obtain a sufficient bond. Depending on the adhesive used or the mechanical connection method used, the time and pressure required could vary widely. In an embodiment, force controlling feature may be a cam-style latch 500 that is employed to give the operator flexibility in the amount of pressure exerted on the joint and in the amount of time the pressure is applied. It could be momentary, or last until the fixture 110 is opened and the container 90 removed. The force controlling feature 500 may be manually operated or operated by a computer controlled device. Different forces could be applied to local areas.

In addition, the force controlling feature 500 may have a variety of designs, depending on how the container 90 is being handled. For example, if the container is being created primarily by an operator, the force controlling feature 500 may be hand operated. As yet another example, when the containers 90 are created using a high speed automated manufacturing line, the force controlling feature 90 may be part of the line. As one example, one stop in the production line may be a press that may apply the desired force in a high speed manner. In another example the press is limited by mechanical stops ensuring a final thickness. FIG. 26 may be an illustration of some sample mechanical stops. The stops may be adjusted based on the material used as some containers may be thicker than others, some may be stronger than others, difference tolerances may be desired, etc.

Figure 46A:
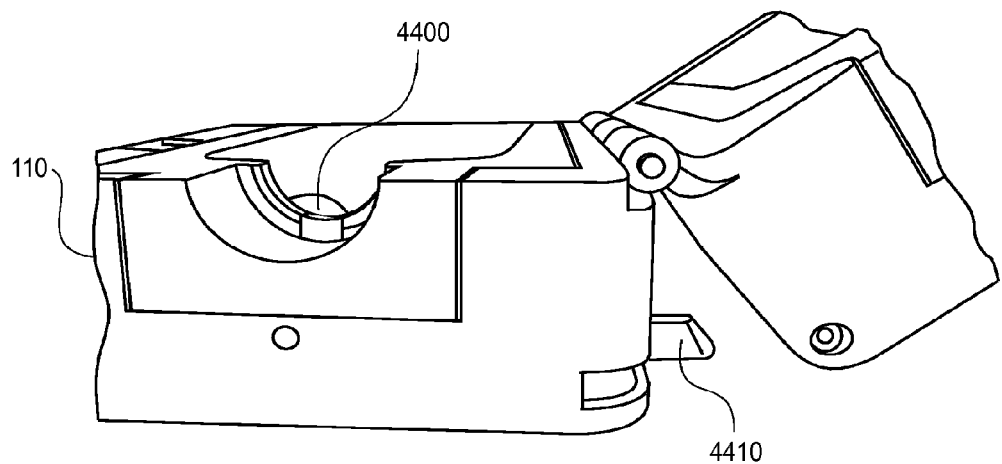
FIG. 46a is an illustration of an eject lever that has not been engaged.
Figure 46B:
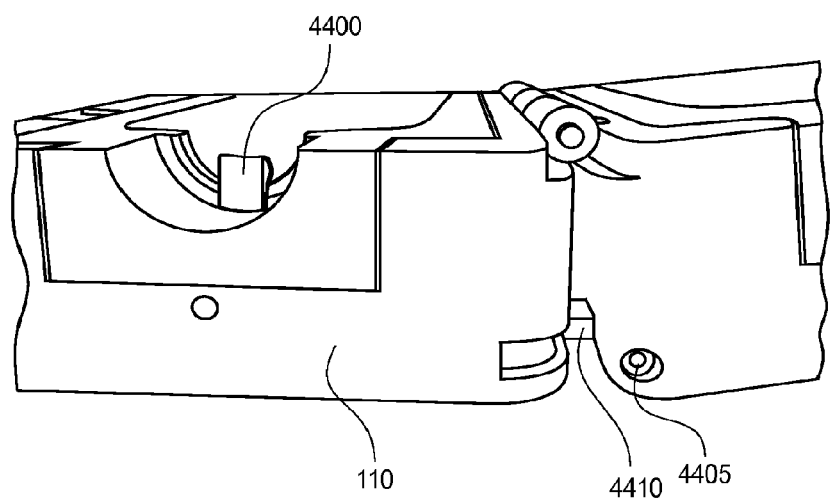
FIG. 46b is an illustration of an eject lever that has been engaged and the ejection device being engaged.
Figure 47:
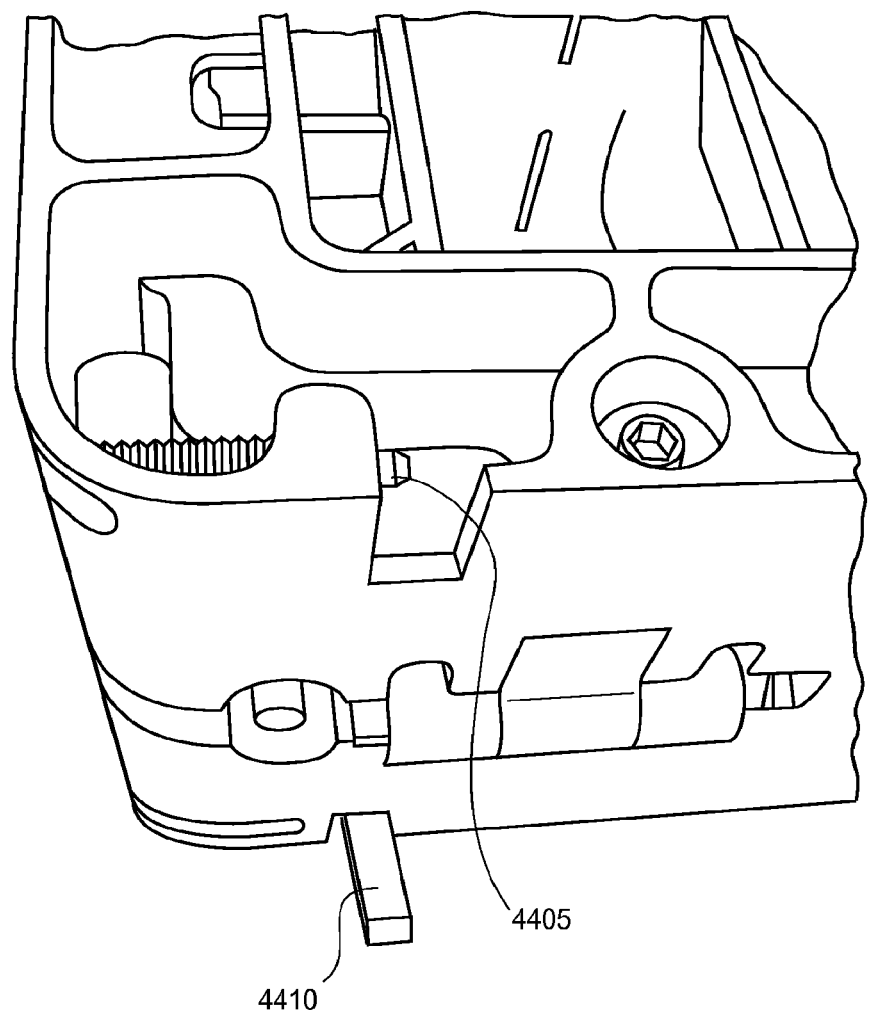
FIG. 47 is an illustration of the eject lever and an ejection adjustment pin.
Figure 48:
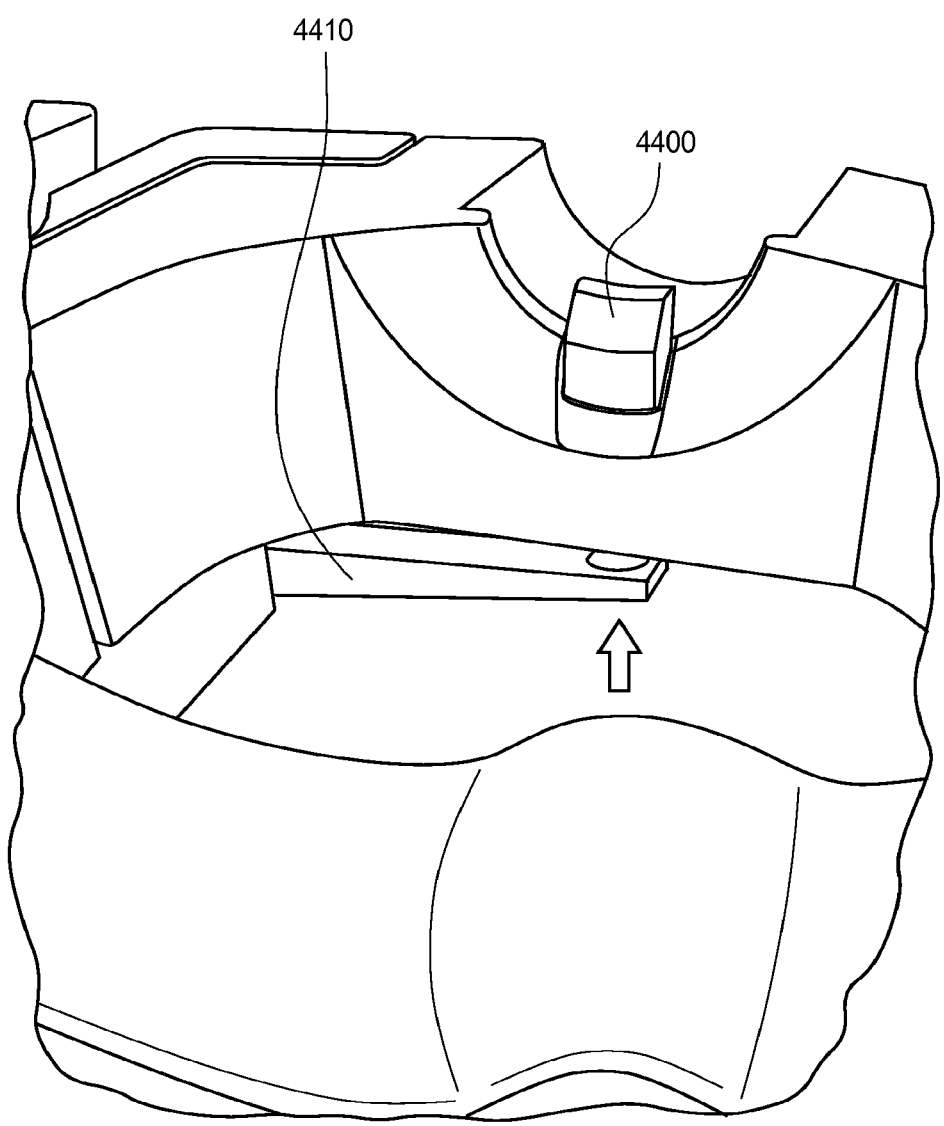
FIG. 48 is an illustration of the eject lever engaging the ejection device.
Figure 49:
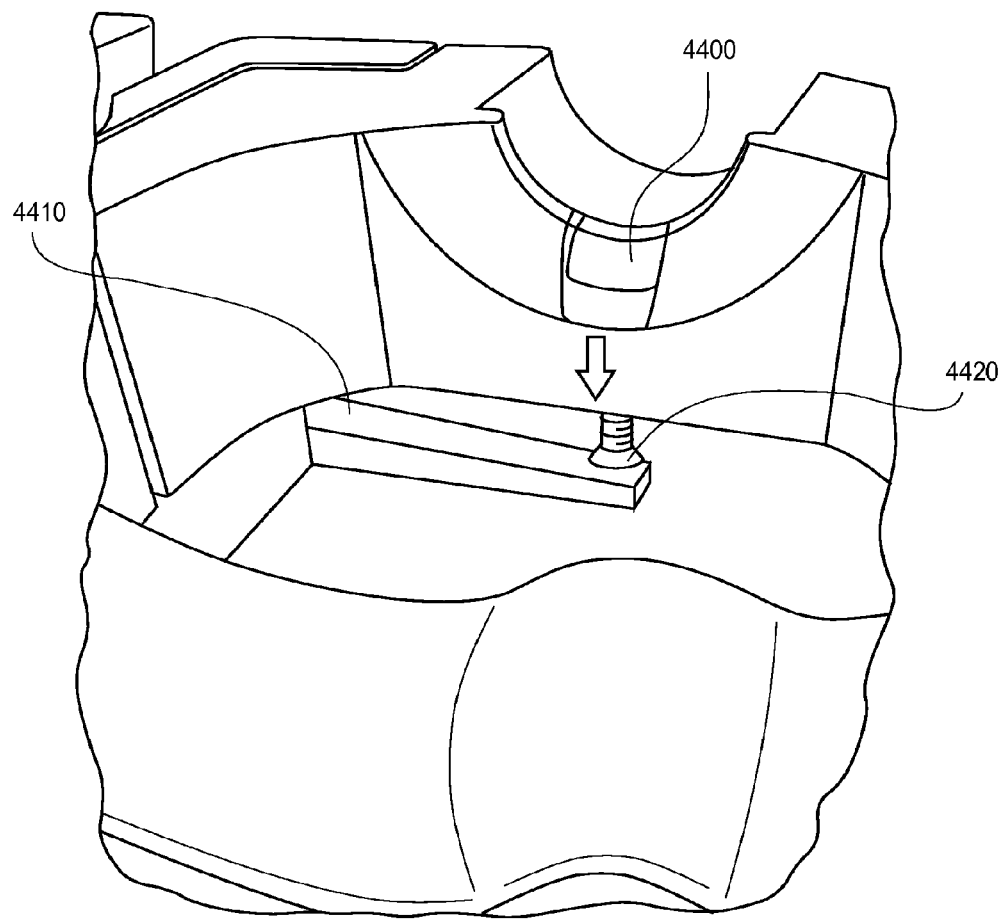
FIG. 49 is an illustration of the eject lever being in an unengaged state and the ejection device being at rest.
Figure 50:
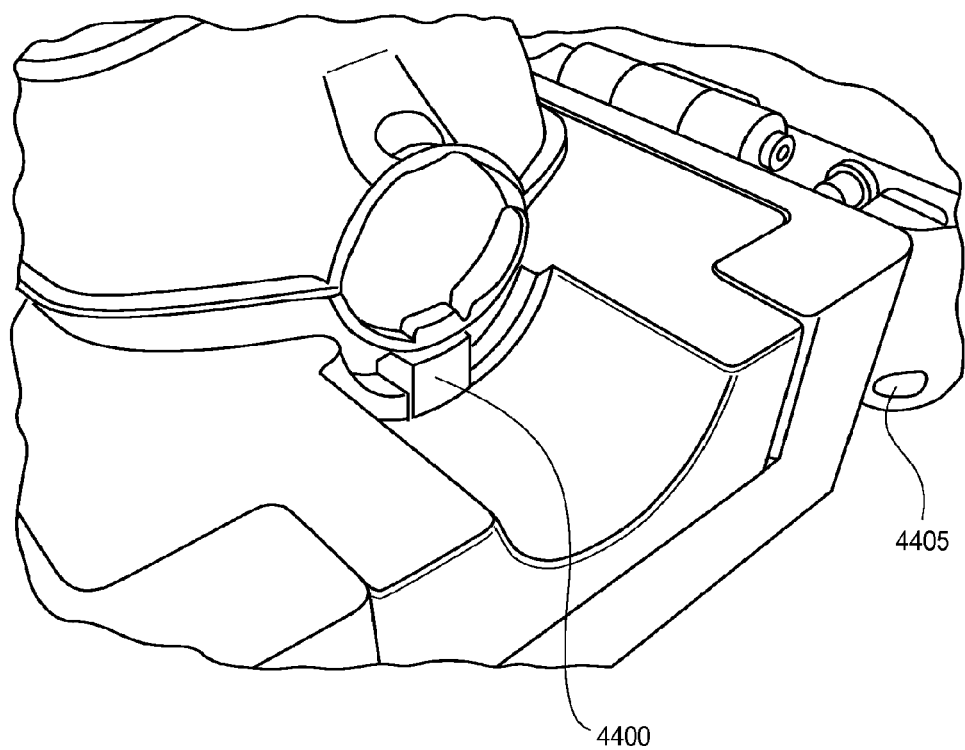
FIG. 50 is an illustration of the ejection device ejecting a completed container.

The assembly unit 110 may also have holes 800 (FIG. 45) to allow the assembled container 90 to be easily removed from the assembly unit 110. For example, an operator could use a hand or other poking device to force the container 90 from the assembly unit 110. FIGS. 46-50 may be illustrations of a sample ejection 4400 device that may be part of the assembly unit 110 or part of the insert 1310 or the insert 1310 and assembly unit 110 may work in concert. When the assembly unit 110 is opened, the ejection device 4400 may operate to poke or eject the container 90 from the assembly unit 110 or insert 1310. The ejection device may work in a mechanical manner as illustrated in FIG. 46 where an adjustable pin 4405 comes in contact with a tapered lever 4410 which lifts the ejection device 4400 when the assembly unit 110 and insert 1310 are placed into an open position. The ejection device 4400 may have an adjustment such as a screw 4420 which may adjust the height of the ejection device 4400.

In other embodiments, the ejection device 4400 may be an electro-mechanical device. For example, there may be a switch that is activated by a user that may actuate a hydraulic device that may act as an ejection device 4400. In yet another device, a sensor may be used to determine when the assembly unit 110 has been opened and once it has been determined that the assembly unit 110 has been opened, the ejection device 4400 may be actuated. Of course, the ejection device 4400 may also be a blast of air, a vacuum of air, mechanical manipulation, robotics or auto picked. In addition, the ejection device 4400 may only operate briefly, thereby "punching" the container loose from the pattern, but shortly thereafter being prepared to receive a new blank container 90 ready to be sealed.

In higher speed semi automated or automated lines a built in mechanical feature can ensure release of the assembled container upon assembly unit 110 opening. Other methods including air ejection, mechanical manipulation, robotics or auto picker as ways to right the container 90 and for them to continue their process.

Figure 51:
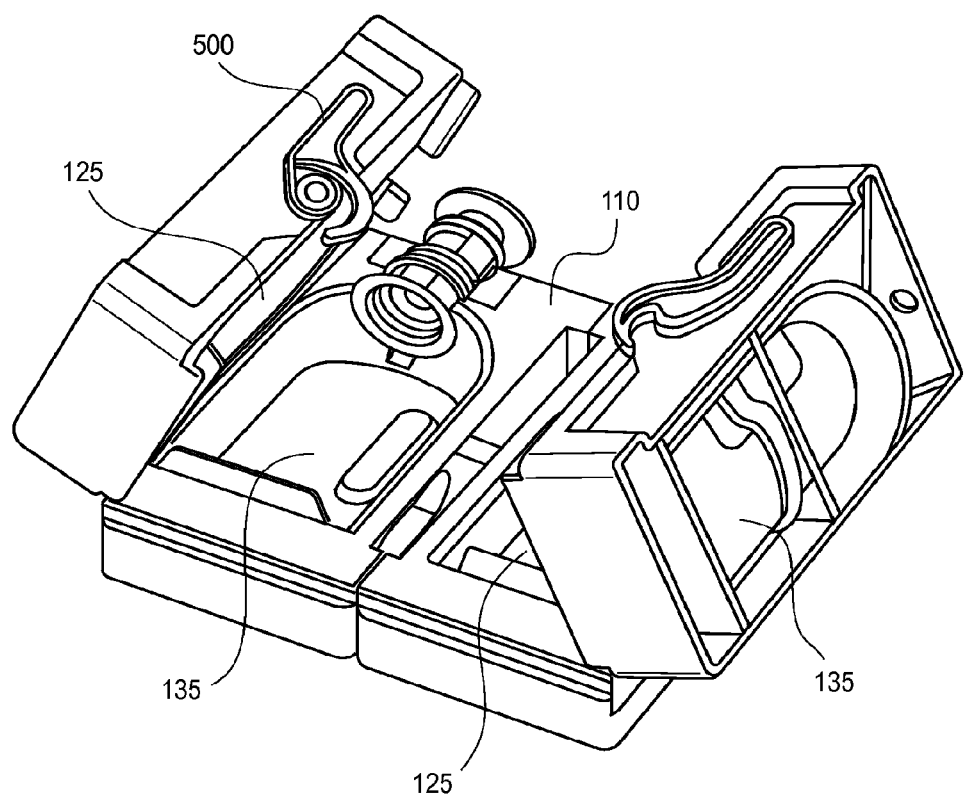
FIG. 51 is an illustration of an assembly unit with a plurality of cavities for a plurality of containers.

There may be a need to reduce the labor intensive nature of container assembly. Increasing the throughput per operator is possible in various ways. FIG. 51 may illustrate an embodiment where additional shells are held in the same device 110. The cavitation 500 of the container assembly unit 110 could hold a single container 90 or be greater so that it holds shells 100 for 2, 3, 4 or more containers. The pressurized air could be distributed to the all cavities. Increased numbers of cavities can improve throughput performance to a point where the container assembly unit 110 is too large for a single operator to manage.

In some embodiments of the invention, as cavitation increases, lifting and closing the moving portion of the assembly unit 110, due to the increased weight and increased arc of the swing can become not feasible from a human factors and ergonomic point of view. An innovation is a multiple hinge version that keeps the size and weight of the individual folding portions of the assembly unit 110 small while the base (non moving part is larger for cavitation). For example there could be a 4 cavity base with 2 or four independently hinged top parts.

A multi-cavity version assembly unit 110 could have a radial relation between the cavities. This assembly unit 110 could rotate so that the operator(s) can move the cavity 400 that they next need to attend to towards them. Similarly a 'lazy susan' surface could hold multiple single cavity assembly units 110. It is conceived that air pressure for inflation of liners could be made available to the multiple cavities from a central pivot area, or could be external to the outer circumference. There are a range of ways to sequence air activation including translation of the cavity into a valve, all of which are contemplated. Rotary tables are common in packaging and fabrication industries, but it non-obvious to use this type of table in the assembly of a multi-component container comprising a molded pulp container shell 100 and a liner 120 assembly comprising a polymer liner and a polymer weldspout.

The closing part or parts of the container assembly unit 110 could be less than co-planar to the base. In effect partly closed, this could reduce the amount of travel that is required to close the assembly unit 110. In some embodiments, only 90, or 100, or 120 degrees may be necessary to close the device. FIG. 51 may illustrate an example where less than 180 degrees may be needed for a two segment container. Less swing may be easier and less energy consuming. However, the assembly unit 110 needs to be open enough to allow for easy access and insertion into the cavity or cavities.

Certain production facilities may be required to run different container 90 sizes and shapes. The mechanical configuration of the assembly unit 110 is envisioned such that it has both standard features and features that are specific to a range of containers 100. Common features could include frame, clasp, receiving features for container shell cavity 400, receiving features for fitment 150 cavities, and the air valve interface. Variable components could be added to the common chassis. Variable features could include specific container cavity 400 shapes, the fitment 150 cavity shape, handle or clasp for different pressure application, items to accommodate for different pulp wall thicknesses. In addition, in some embodiments, the container 90 may have double walls of shells 100. There is a range of variation to the design that could be beneficial to the efficiencies of container 90 production, reduced capital outlay, necessary storage space, etc.

This same sort of assembly unit 110 could be used in higher capacity or increased load carrying containers 100. It is envisioned that molded pulp parts 125 135 could be nested together and glued to create double-walled parts where the effective wall thickness can be increased. Further structural performance can be achieved if the double walls are connected at points but have space between each other in other areas, such as in corrugate cardboard and in hollow-core man-doors. The double walls may increase the effective thickness of the wall to be greater that of the two walls dimensional thickness. The assembly unit 110 could use the above noted principles of registration, alignment, glue application, assistance to facilitate bonding these double walls together. It is understood that these double wall open shells can then go into a container assembly unit 110 for the final steps of unifying the container 90. Or, it is the same assembly unit 110 that help forms double walls has an ensuing sequence where to container 90 is then closed. Alternately, a single wall container 90 may be assembled about a fitment 150 using an assembly device A. Another assembly device B could have an outer shell inserted and connection facilitator applied. Into the assembly device B, the container of assembly device A may be inserted but at a 90 degree (or other) orientation relative to the Device B. Upon closing of device B, the container of Device A receives an outer wall thereby creating a double wall container. The reorientation ensures that the mating flanges between the shells of the inner container are not proximate to the mating flanges of the outer walls. This offsetting of joining features creates a more robust container where an impact damaging a glued area on the external wall may not result in damage to the inner shell's glued area.

Inspecting and Trimming the Shell Flanges

At block 248, the inspection apparatus may review the complete containers 90. The inspection apparatus may review the containers in a manner that is appropriate to the manner in which the containers 90 are manufactured. In embodiment where much of the manufacturing is by hand, the inspection apparatus may review the completed containers 90. In embodiments where the containers 90 are manufactured on a high speed manufacturing line, the inspection apparatus may be broken into several parts and the inspection may occur after one or more stations in the assembly line.

The inspection apparatus may review many aspects of creating the containers 90. For example and not limitation, the inspection apparatus may review the application of the connection facilitator 140 to ensure the container shell 100 is prepared for closure, whether the shell surfaces 120 130 are prepared for the connection facilitator 140, whether the liner is in an acceptable condition, shape, state of readiness for installation, whether the fitment 150 orientation is correct, whether the fitment 150 to container shell 100 alignment is acceptable, whether the liner 120 has been properly deployed, whether the parts of the container 90 are in the proper position, etc. The inspection apparatus may take on several forms, again depending on which of embodiments of the type of assembly device 1200 is being used.

Trimming

At block 251, the assembly equipment 1200 may be configured to include a trimming operation at a functional station. The trimming operation could remove extra material from the exterior edge of the contact flanges of the container shells 100. The trimming operation may create one or more cut-outs or holes in the container shell 100. The trimming operation may remove features that are only required for assembly or part manipulation. These could include de-nesting lugs, machine registration features, or grab features. The trimming equipment may be suitable for trimming paper-based materials such as molded pulp, as well as other similar materials, such as polymer sheetstock, or polymer film, etc. The trimming operation could be caused by principles found in shears, scissors, punches, rotary trimmers, lasers, high-pressure water jets, die-cutting, steel rule dies, multi axis CNC trimming, etc. Other trimming methods are possible and are contemplated.

The trimming equipment could be configured to automatically remove any trimmed material from the area to prevent buildup of extraneous waste material that may impede proper operation of the assembly machinery 1200. The removed waste material may be recycled. The removal may be facilitated by gravity, vacuum, pressurized gas, mechanical means, robotic pickers, etc.

Locking Collar

In some embodiments, a locking collar may be used to lock the liner 120 and fitment 150 to the container shell 100. In such embodiments, at block 254, the locking collar 3600 may be installed after the container shell 100 is closed. The locking collar 3600 may be placed manually or a specific locking collar 3600 apparatus may be used to place the collar 3600 on the fitment 150. The apparatus may use a vision technology and robotic technology to align and place the collar 3600 onto the fitment 150 and to set the collar 3600.

In some embodiments, a solid connection may be created between the fitment 150 and the container shell 100. For example, the fitment 150 may be ultrasonically welded to the container shell 100. In another embodiment, the fitment 150 may be locked to the container shell 100 using a connector such as a screw on collar 3600 or a locking collar 3600. In yet another embodiment, the collar 3600 may be attached to the container shell 100 using an adhesive. In such cases, the solid connection may be created, affixing the collar 3600 to the container shell 100.

In some embodiments, a shrink sleeve 2700 may be used to wrap the container shell 100 in a visually attractive sleeve. If a shrink sleeve 2700 is to be used, it may be applied at block 257. In some embodiments, the sleeve 2700 may also provide additional strength to the container 90. The sleeve 2700 (FIG. 10) may initially be larger than the container 90 but when sufficient heat is supplied, the sleeve 2700 may shrink and envelope the container 90. The sleeve 2700 may be placed around the container shell 100 by hand or by machine. Similarly, heat may be applied by hand or by a machine or a combination of the two (user and machine).

Sanitizing

Many containers 90 used for packaging food or beverage items require a certain level of cleanliness of the interior, contact surfaces of the container 90. The assembly device 1200 may produce composite containers for the food or beverage industries. There may be standards specifying, for example and not limitation, maximum levels of microbial contaminants or biological organisms allowable on the contact surfaces of containers 90. Accordingly, at block 260, the containers 90 may be sanitized.

In a configuration of the assembly device 1200, a preparation device or set of devices with an ability to render a package compliant with standards may be included in a functional station. Some examples of methods used by the preparation device may include irradiation, gas sterilization, washing, rinsing with chemicals, heating, etc. Other methods are possible and are contemplated. A functional station may include features such as enclosures, nozzles, heating elements, insulated cavities, pressurized gas supply and removal orifices, sensing or measuring devices. A functional station may be configured with sensing or measuring capacity to immediately and spontaneously test for or identify compliance with a given standard or measurement of a characteristic. The preparation device may be equipped with a means to reject or accept a measured or sampled package on the basis of bio-burden.

Closures or Temporary Closures

In a type of composite container 90 destined for a food-packaging application, it may be necessary to supply a sanitary container. A composite container 90 may be assembled from an exterior shell 100 and a polymer liner 120, where the liner 120 has been treated or sanitized. To maintain the sanitary condition of the inside of the liner 120 until the package can be filled, it may be advantageous to prevent ingress of foreign material into the liner 120.

A method for contamination prevention could be the application of a closure onto the opening in the liner 120 assembly's fitment 150. The installed closure could be considered temporary, since it may need to be removed prior to filling the container 90. The temporary closure could be configured to maintain functionality throughout all handling and shipping operations from container 90 assembly though to removal in a sanitary filling facility. As examples and not limitations, the closures could comprise film, adhesive, molded polymer, press fit caps, press fit plugs, etc. The equipment may install a temporary closure or a permanent closure.

Testing the Container Shell 100

At block 263, the equipment may be configured to include testing functions on some or all of the components or assemblies, during any stage of completion. Testing could be undertaken to determine if there are breaches in the integrity of the liner 120 system. This testing may be configured to incorporated pressurized gas at a measurable pressure and a sensor that would determine if the liner 120 held the correct pressure for a predetermined length of time. The testing protocol could identify a breach in the integrity of the liner 120 material or connections between the various components of the liner 1200 assembly.

Other testing could be performed that determines if the integrity of the assembly process and materials meets certain pre-defined criteria. The criteria for conforming packages could include resistance to applied forces (as an example and not limitation: top loading), integrity of adhesive application and compression, integrity of installation of locking features (such as the locking collar or other locking means), adherence to critical dimensions and tolerances, etc. The equipment may be configured to test for the presence of microbial contamination above a certain pre-determined level. Other printing on the container may be required including an optical targets that indicated test results and the need for removable of specific containers for the line at a later location.

Label Application

Typically, containers and packages carry information such as text, graphics or images to communicate production information, ingredients, compliance with applicable standards, membership in applicable groups, directions for use, warnings, volume, capacity, manufacturing dates, points of origin, material-type indication, count or weight information. In some cases this information is located on a separate label part 5250 (FIG. 54) that is applied to a surface of the container. In some cases of container assembly, it would be useful for a label 5250 to be applied to the container while the container is being controlled by the assembly equipment or machine.

At block 266, labeling equipment may apply one or more labels 5450 to one or more surfaces of the container shell 100. In another package configuration, the information is situated directly on a surface of the container shell 100. In the case of a composite pulp container shell 100 with a polymer liner 120, an outer pulp surface 100 could serve as a label 5450 surface. An embodiment of a functional station could include a labeling device for direct application of label information onto a surface of the package shell 100. As examples and not limitations, devices such as inkjet printers, laser printers, lasers, pad printers, silkscreens, transfer dies, dot matrix printers, and mechanical engravers are contemplated. Of course, other methods of direct application of information, text, graphics, or images are possible and are contemplated.

Presenting the Container to the Packaging Function

The assembly equipment 110 may be operating within the context of a typical co-packing or manufacturing facility. There is a need to remove completed containers 90 from the machine as they are completed, or as a staging area becomes filled to capacity. At block 269, an assembly machine 110 may have industry-standard equipment or devices to handle the completed containers 90 to prepare the containers 90 for shipping. The containers 90 may be placed into a temporary case, a shipping case, a conveyor system. This placement could be an automatic process or a manual or semi-manual process.

Changing the Insert

As noted previously, the insert 1310 used in the assembly unit may be switched based on the container 90 to be created. Various containers 90 may be used for different products or there may be a desire to have a plurality of sizes for the same product.

Figure 52:
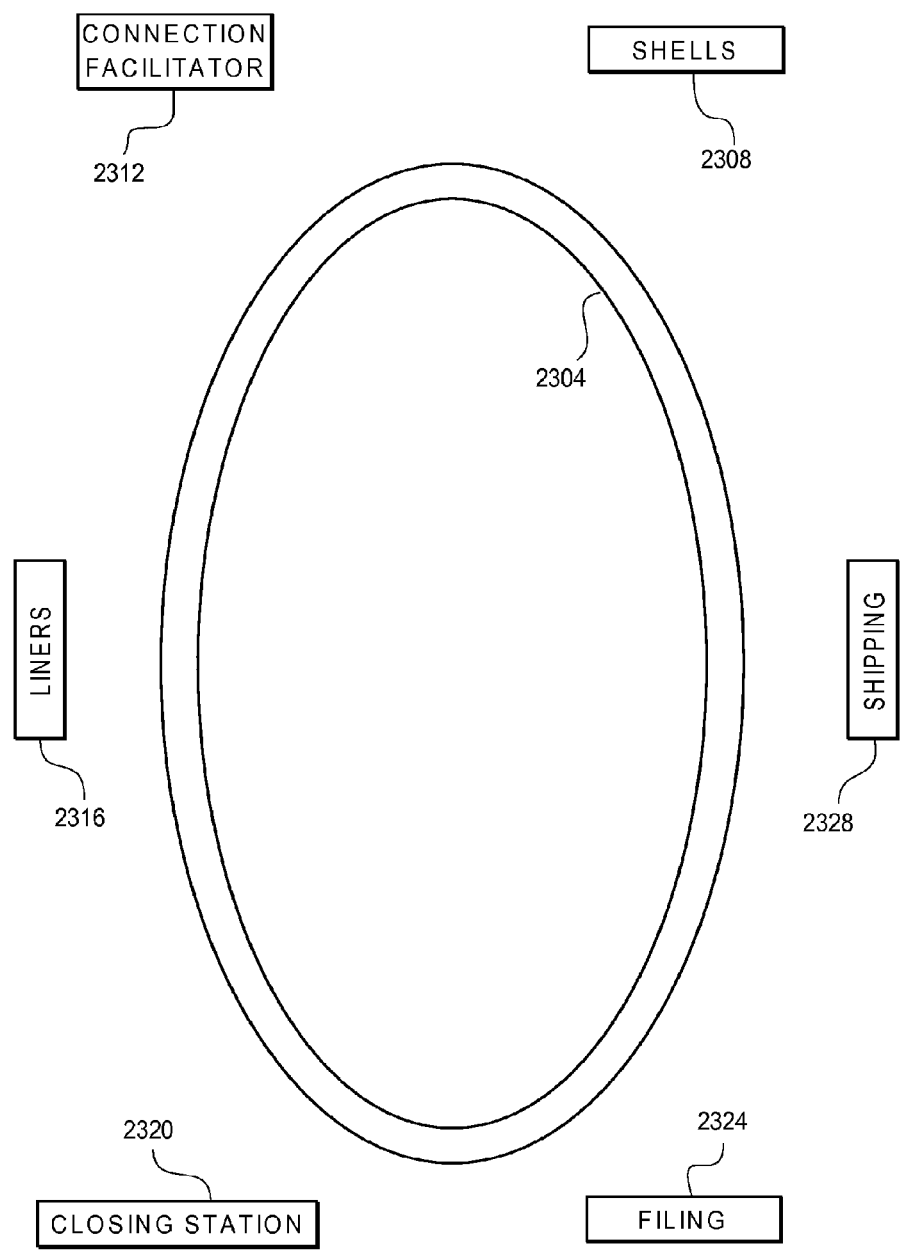
FIG. 52 is a high level illustration of stations that are part of an assembly line.

FIG. 52 may illustrate at a very high level an assembly line 2304 for the containers 90. The containers 90 may move on assembly line at high speed through the various stations or may be created in stages at various plants. At block 2308, a container shell 100 may be opened and added to the assembly line 2304. The container shell 100 may be manufactured at the same location or may be manufactured elsewhere and brought to the assembly line 2304. For a container 90 that have separate shells (not hinged) 100, one shell 100 could be made available at an initial location, and the complementary shell 100 be made available at a later station, once it is required. The container shell 100 may be added by hand or by machine. The shell 100 may be installed in an assembly unit 110 such as a cassette, installed in another holding device or may be added without an assembly unit 110.

The container shell 100 may be moved to an additional station 2312. The container shells 100 may have a connection facilitator 140 applied to them. The connection facilitator 140 may be an adhesive or may be a mechanical locking deformation. The connection facilitator 140 may be inspected and reviewed to ensure the container shells 100 are prepared to receive the liner 120.

At the next station 2316, liners 120 may be prepared for installation. In some situations, the liners 120 may be produced locally and in other situations, the liners 120 may be produced elsewhere. The preparation may entail reducing the size of the liner 120 for easier installation. The reduction of the liners 120 may be accomplished in several ways. In one embodiment, the liners 120 are folded into a smaller shape. In another embodiment, a vacuum is applied to the liners 120 to reduce their size. In some embodiments, the liners 120 will have a fitment and the vacuum may be applied through the fitment 150. A wand 2000 may be inserted into the fitment 150 and the vacuum may be applied through the wand 2000. In addition, wand 2000 may be used to handle the liners 120.

The liners 120 may be added to the assembly line 2304 where they may be placed into the container shells 100. The placement may occur in many ways. In one embodiment, the wand is used to place the reduced size liners 120 into the container shells 100. The wand 120 may move in a channel or other guidance machinery and the container shells 100 may be aligned using an alignment device 2320 which may ensure that the liner 120 aligns with the container shells 100. In some embodiments, the liner 120 positioning is controlled by a user and in another embodiment, the liner 120 positioning is controlled by a machine and in the machine example, the machine may use vision technology in communication with a processor to ensure that the alignment is correct. Automated transport of pouches or liners 120 in a connected state is conceived. In this linked format, the liners 120 can be advanced at high speed and be registered to the wand. Separation from other pouches 120 is made through automated means.

Figure 53:
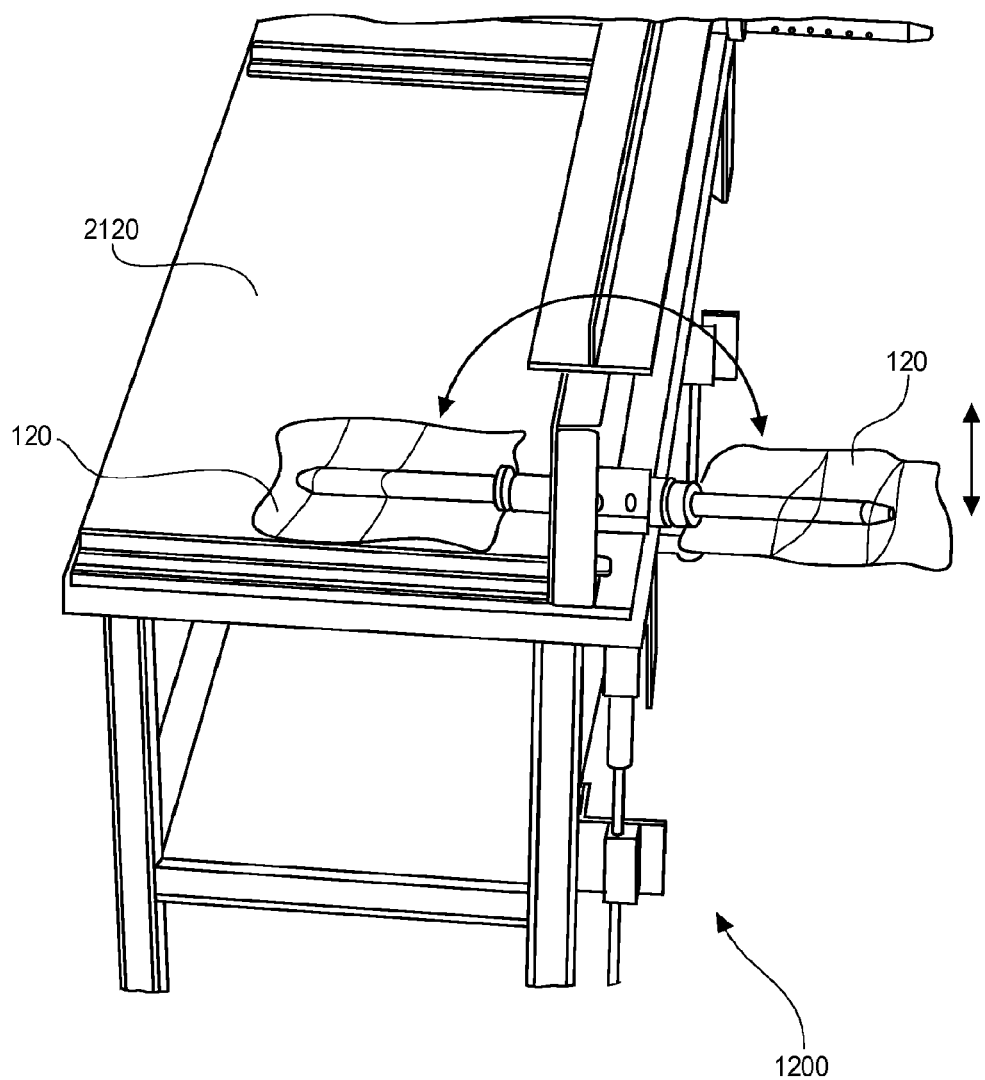
FIG. 53 is an illustration of an assembly device where a wand pivots from a loading side to a placement side.

In some embodiments, there may be a plurality of wand 2000 or liner 120 handling device which may allow many liners 120 to be prepared for installation in a row or at the same time. As illustrated in FIG. 53, the wands 200 or other liner 120 handling devices may move and rotate such that a continuous process may be created. In some additional embodiments, the container shell 100 is moved toward the liner 120 rather than having the liner 120 move into the container shell 100.

The liners 120 may also have fitments 150 that may be attached to the container shell 100. The fitments 150 may also need to be properly registered in the container shell 100 to ensure the fitments 150 do not allow the liner 120 to slip or turn in an undesired way. The container shell 100 may be inspected again to ensure that the liner 120 is properly positioned and that the fitment 150 is properly registered in the container shell 100.

Assuming the inspection analysis is successful, the shell 100 may be closed at another station 2320 in the production line. If the shell 100 is in an assembly unit 110 like a cassette, the cassette may be closed and if the shell is on its own, the shell 100 may be closed. The connection facilitator 140 may then engage and the container shell 100 may be sealed shut.

At another station (not shown), the wand 2000 or another gas delivery device may be used to pressurize the liner 120 inside the container shell 100. The liner 120 may then fill the container shell 100 and be ready for filling. The liner 120 may also be tested to ensure it does not have leaks and the wand 200 or other pressure delivery device may be removed.

At an additional station (not shown), in some embodiments, the outer shell 100 may have to be trimmed to its final form. A trimming device 2500 may trim the outer shell automatically or it may be trimmed by a user. At an additional station (not shown), the containers may be inspected again.

At yet another station (not shown), a shrinking sleeve 2700 may be placed in the container 90. The shrinking sleeve 2700 may have a label 5450 and may provide strength to the fitment 150 and the container 90. Additionally, some embodiments apply a locking collar 3600 to the fitment 150 and the container shell 100 to ensure the liner 120 and fitment 150 do not slip or turn in a non-desired way. In some embodiments, the inside of the liner 120 may be sanitized which may be yet another station (not shown). Additionally, some embodiments may apply a label 5450 to the outside of the container shell 100.

Once the container is complete, it may be inspected yet again before it moves to another station where it is prepared to be filled at station 2324. In some embodiments, the containers 90 are filled on the assembly line 2304 and in other embodiments, the containers 90 are filled elsewhere. The containers 90 may then be handled again at another station 2328 to prepare them for efficient shipment.

This assembly device 1200 is anticipated to have a conveyor that moves assembly units 110 sequentially from station to station. The number of stations used could depend on container 90 type or level of assembly/features required. The configuration could be a race track or linear in plan view with other layouts contemplated. It should be noted that the linear configuration could have the empty cassettes return on the underside of the conveyor. The highest efficiency unit may likely be continuous motion with stations travelling with the continual motion bottles or containers.

Of course, the stations are described as being separate but they could easily be combined into multi-function stations. The assembly line 2304 could be completely automated or some of the stations may allow users to be part of the process. Many other deviations from the described method and apparatus are possible and are contemplated.

Figure 54:
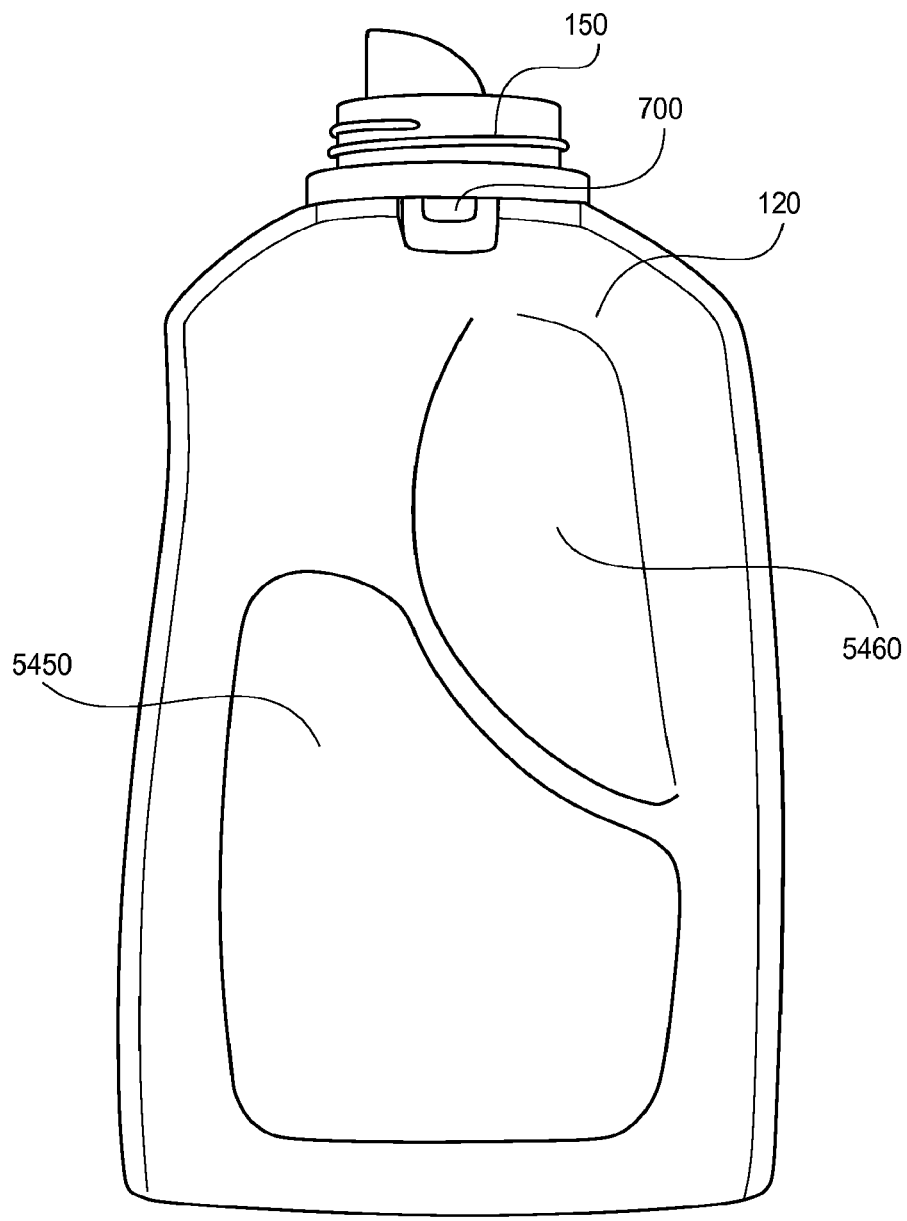
FIG. 54 is an illustration of a sample container with a liner and a fitment.

FIG. 54 illustrates a complete container 90. It may have a fitment 150 and a grabbing area molded into the shell 100. It also may have a label 5450 that is applied to the shell 100, is formed as part of the shell 100, is printed on the shell 100, etc. It also may have the alignment protuberance 700 that may match a complementary receiving area in the fitment 500 which may keep the fitment 500 from spinning. The container 90 may also have a holding feature 5460 molded into the shell 100. Of course, additional embodiments of the container 90 and the associated equipment to manufacture the various components of the container 90 are possible and are contemplated.

The invention claimed is:

1. A method of integrating a liner into a bio-degradable or compostable container shell to create a container comprising:

applying a connection facilitator to a first surface of a first part of a container shell;

placing the container shell in a position to receive a liner;

aligning the container shell perimeter in a desired dimension and shape;

securing the liner to a holding device to assist in placing the liner in the container shell;

placing the liner and a fitment feature into the container shell;

registering the fitment feature into the container shell;

aligning and mating the fitment feature to the container shell; and closing an assembly unit so as to place the first surface of the first part and a second surface of a second part in communication with each other.

2. The method of claim 1, further comprising introducing an expanding agent into the liner through the fitment feature in at least one of pulses or a singular stream.

3. The method of claim 2, further comprising applying a vacuum into the liner for controlled collapse of the liner prior to the introducing of the expanding agent.

4. The method of claim 2, wherein the expanding agent is compressed air.

5. The method of claim 1 further comprising applying the connection facilitator to the second surface of the second part of the container shell.

6. The method of claim 1, further comprising:
separating the container shell from a stacked state; and
modifying the container shell when the container shell requires removal of material prior to assembly.

7. The method of claim 1, further comprising:
selecting and placing a shaped receiving insert to receive and position a similarly shaped shell to facilitate creating containers having alternative shapes.

8. The method of claim 1, further comprising:
inspecting the container to ensure intended assembly quality; and
removing the container when the container fails inspection.

9. The method of claim 1, further comprising:
installing a locking collar onto a receiving feature of the fitment feature after the container shell is closed so as to lock the liner and the fitment feature to the container shell.

10. The method of claim 1, further comprising:
introducing a vacuum into the liner through the fitment feature so as to deflate the liner.

11. The method of claim 1, further comprising actuating an adjustable ejection device in the assembly unit to remove the container from the assembly unit.

12. The method of claim 1, wherein the fitment feature and the liner are integral with one another.

13. The method of claim 1, further comprising blow molding the liner.

14. The method of claim 1, wherein the liner is made from a film.

15. A method of integrating a liner into a bio-degradable or compostable container shell to create a container comprising:
providing a first surface of a first part and a second surface of a second part of a container shell;
placing the container shell in a receiving position;
aligning the container shell perimeter in a desired dimension and shape;
blow molding a liner to be included in the container shell, wherein the liner includes an integral fitment feature;
securing the fitment feature to a holding device to assist in placing the liner in the container shell;
placing the liner with the integral fitment feature into the container shell;
registering the fitment feature into the container shell;
aligning and mating the fitment feature to the container shell; and
closing an assembly unit so as to place the first surface of the first part and the second surface of the second part in communication with each other.

16. The method of claim 15, further comprising applying a connection facilitator to the first surface of the first part of the container shell.

17. The method of claim 15, wherein the liner is blow molded into a shape configured to match at least a portion of an interior volume of the container shell.

* * * * *